US012784020B2

(12) United States Patent
Forutanpour et al.

(10) Patent No.: US 12,784,020 B2
(45) Date of Patent: Nov. 3, 2026

(54) APPARATUSES, SYSTEMS, AND METHODS FOR TURNING OVER ELECTRONIC DEVICES, AND ASSOCIATED KIOSKS FOR USE WITH SAME

(71) Applicant: ecoATM, LLC, San Diego, CA (US)

(72) Inventors: Babak Forutanpour, San Diego, CA (US); Ted Ray Gooding, San Diego, CA (US)

(73) Assignee: ecoATM, LLC, San Diego, CA (US)

( * ) Notice: Subject to any disclaimer, the term of this patent is extended or adjusted under 35 U.S.C. 154(b) by 700 days.

(21) Appl. No.: 18/167,390

(22) Filed: Feb. 10, 2023

(65) Prior Publication Data

US 2023/0259910 A1 Aug. 17, 2023

Related U.S. Application Data

(60) Provisional application No. 63/267,911, filed on Feb. 11, 2022.

(51) Int. Cl.
*G06Q 10/30* (2023.01)
*B25J 9/00* (2006.01)
(Continued)

(52) U.S. Cl.
CPC ............ *G06Q 20/18* (2013.01); *B25J 9/0096* (2013.01); *B25J 9/102* (2013.01); *B25J 9/1682* (2013.01);
(Continued)

(58) Field of Classification Search
CPC .... G06Q 20/18; G06Q 10/30; G07F 17/0014; G07F 7/069; H04M 1/0287
See application file for complete search history.

(56) References Cited

U.S. PATENT DOCUMENTS 1,327,315 A 1/1920 Davies
1,730,015 A 10/1929 Rooke
(Continued)

FOREIGN PATENT DOCUMENTS

CA 2760863 11/2010
CA 2818533 A1 5/2012
(Continued)

OTHER PUBLICATIONS

2006 Florida Statutes Title XXXIII, Chapter 538, Sections 538.03 and 538.04, 7 pages.
(Continued)

*Primary Examiner* — Dennis W Ruhl
(74) *Attorney, Agent, or Firm* — Ashurst Perkins Coie US LLP

(57) ABSTRACT

Various embodiments of apparatuses to turn a mobile phone over in, for example, a kiosk, and associated embodiments of kiosks are disclosed herein. Embodiments of such apparatuses can enable the kiosk to visually inspect both the front and back sides of the mobile device on an inspection surface with an inspection system (e.g., one or more imaging devices, lighting devices, etc.) positioned above the inspection surface, and can eliminate the need to position a second inspection system below a transparent inspection surface to visually inspect, e.g., the back side of the mobile device through the transparent inspection surface.

20 Claims, 19 Drawing Sheets

(51) Int. Cl.
*B25J 9/10* (2006.01)
*B25J 9/16* (2006.01)
*B25J 11/00* (2006.01)
*G06Q 20/18* (2012.01)

(52) U.S. Cl.
CPC .......... *B25J 9/1697* (2013.01); *B25J 11/008* (2013.01); *G06Q 10/30* (2013.01)

(56) References Cited

U.S. PATENT DOCUMENTS 2,817,725 A 12/1957 Rochfort
3,808,439 A 4/1974 Renius
4,248,334 A 2/1981 Hanley et al.
4,519,522 A 5/1985 McElwee
4,593,820 A 6/1986 Antonie
4,715,709 A 12/1987 Sekine et al.
4,821,118 A 4/1989 Lafreniere
4,845,636 A 7/1989 Walker
4,870,357 A 9/1989 Young et al.
4,878,736 A 11/1989 Hekker et al.
4,893,789 A 1/1990 Novorsky
4,927,051 A 5/1990 Falk et al.
4,951,308 A 8/1990 Bishop et al.
5,025,344 A 6/1991 Maly et al.
5,027,074 A 6/1991 Haferstat
5,077,462 A 12/1991 Newell et al.
5,091,773 A 2/1992 Fouche et al.
5,105,149 A 4/1992 Tokura
5,159,560 A 10/1992 Newell et al.
5,216,502 A 6/1993 Katz
5,280,170 A 1/1994 Baldwin
5,319,459 A 6/1994 Mochizuki et al.
5,339,096 A 8/1994 Beaufort et al.
5,413,454 A 5/1995 Movesian
5,419,438 A 5/1995 Squyres et al.
5,436,554 A 7/1995 Decker
5,482,140 A 1/1996 Moore
5,533,645 A 7/1996 Wittern
5,570,920 A 11/1996 Crisman et al.
5,572,444 A 11/1996 Lentz et al.
5,610,710 A 3/1997 Canfield et al.
5,711,530 A 1/1998 Lewis
5,717,780 A 2/1998 Mitsumune et al.
5,747,784 A 5/1998 Walter et al.
5,748,084 A 5/1998 Isikoff
5,775,806 A 7/1998 Allred
5,839,058 A 11/1998 Phillips et al.
5,871,371 A 2/1999 Rothenberger et al.
5,920,338 A 7/1999 Katz
5,937,396 A 8/1999 Konya
5,949,901 A 9/1999 Nichani et al.
5,965,858 A 10/1999 Suzuki et al.
5,966,654 A 10/1999 Croughwell et al.
5,987,159 A 11/1999 Nichani
5,988,431 A 11/1999 Roe
5,988,971 A * 11/1999 Fossey .............. H01L 21/67778 414/941
6,029,851 A 2/2000 Jenkins et al.
6,041,229 A 3/2000 Turner
6,055,512 A 4/2000 Dean et al.
6,100,986 A 8/2000 Rydningen
6,170,702 B1 1/2001 Zettler et al.
6,181,805 B1 1/2001 Koike et al.
6,216,890 B1 4/2001 Rathmer
6,228,008 B1 5/2001 Pollington et al.
6,234,812 B1 5/2001 Ivers et al.
6,259,827 B1 7/2001 Nichani
6,264,104 B1 7/2001 Jenkins et al.
6,283,475 B1 9/2001 Stubben
6,323,782 B1 11/2001 Stephens et al.
6,330,354 B1 12/2001 Companion et al.
6,330,958 B1 12/2001 Ruskin et al.
6,393,095 B1 5/2002 Robinson
6,462,644 B1 10/2002 Howell et al.
6,529,837 B1 3/2003 Kang
6,535,637 B1 3/2003 Wootton et al.
6,573,886 B1 6/2003 Lehtinen et al.
6,587,581 B1 7/2003 Matsuyama et al.
6,595,684 B1 7/2003 Casagrande et al.
6,597,552 B1 7/2003 Griepentrog et al.
6,606,154 B1 * 8/2003 Oda .................. G01N 21/9501 356/244
6,633,377 B1 10/2003 Weiss et al.
6,667,800 B1 12/2003 Larsson et al.
6,679,499 B2 1/2004 Jeon
6,687,679 B1 2/2004 Van Luchene
6,741,731 B1 * 5/2004 Yamamoto ......... G01N 21/9508 382/141
6,748,296 B2 6/2004 Banerjee et al.
6,754,637 B1 6/2004 Stenz
6,758,370 B2 7/2004 Cooke et al.
6,758,394 B2 7/2004 Maskatiya et al.
6,795,201 B2 9/2004 Rangarajan et al.
6,798,528 B1 9/2004 Hartman
6,822,422 B2 11/2004 Sagawa
6,842,596 B2 1/2005 Morii et al.
6,847,393 B2 1/2005 Ashe
6,854,656 B2 2/2005 Matsumori
6,874,932 B2 4/2005 Devitt et al.
6,882,269 B2 4/2005 Moreno
6,886,744 B2 5/2005 Ichihara et al.
6,947,941 B1 9/2005 Koon
D512,964 S 12/2005 Kissinger et al.
6,983,067 B2 1/2006 Cox
7,001,038 B2 2/2006 Bock et al.
7,027,031 B2 4/2006 Kawasaki et al.
7,039,609 B2 5/2006 Aoki
7,062,454 B1 6/2006 Giannini et al.
7,066,767 B2 6/2006 Liao
7,069,236 B1 6/2006 Tsunenari
7,076,449 B2 7/2006 Tsunenari et al.
7,086,592 B2 8/2006 Wagner et al.
7,109,293 B2 9/2006 Hwang et al.
7,142,335 B2 11/2006 Tesavis
7,153,086 B2 12/2006 Kauppila et al.
7,158,170 B2 1/2007 Gustavsson
7,164,518 B2 1/2007 Yang
7,166,856 B2 1/2007 Cho et al.
7,178,720 B1 2/2007 Strubbe et al.
7,200,497 B2 4/2007 Wang et al.
7,201,125 B2 4/2007 Evans
7,205,529 B2 4/2007 Andersen et al.
7,213,754 B2 5/2007 Eglen et al.
7,213,766 B2 5/2007 Ryan et al.
7,234,609 B2 6/2007 DeLazzer et al.
7,251,458 B2 7/2007 O'Connell
7,268,345 B2 9/2007 Schultz
7,334,729 B2 2/2008 Brewington
7,343,319 B1 3/2008 Jen
7,348,884 B2 3/2008 Higham
7,388,977 B2 6/2008 Wang et al.
7,407,392 B1 8/2008 Cooke et al.
7,408,674 B2 8/2008 Moro et al.
7,431,158 B2 10/2008 Yamada et al.
7,455,226 B1 11/2008 Hammond et al.
7,520,666 B2 4/2009 Pevzner et al.
7,529,687 B1 5/2009 Phan
7,567,344 B2 7/2009 LeBlanc et al.
7,584,269 B2 9/2009 Moore et al.
7,635,131 B2 12/2009 Fukazawa
7,642,687 B2 1/2010 Kageyama et al.
7,646,193 B2 1/2010 Suzuki et al.
7,649,450 B2 1/2010 Campion et al.
7,702,108 B2 4/2010 Amon et al.
7,735,125 B1 6/2010 Alvarez et al.
7,761,331 B2 7/2010 Low et al.
7,783,379 B2 8/2010 Beane et al.
7,848,833 B2 12/2010 Li
7,881,965 B2 2/2011 Bowles et al.
7,890,373 B2 2/2011 Junger
D640,199 S 6/2011 Wilson
8,010,402 B1 8/2011 Sharma et al.
8,019,588 B1 9/2011 Wohlberg et al.

(56) References Cited

U.S. PATENT DOCUMENTS

| | | | |
|---|---|---|---|
| 8,025,229 | B2 | 9/2011 | Hammond et al. |
| 8,031,930 | B2 | 10/2011 | Wang et al. |
| 8,107,243 | B2 | 1/2012 | Guccione et al. |
| 8,112,325 | B2 | 2/2012 | Foy et al. |
| 8,142,199 | B1 | 3/2012 | Almouli |
| 8,156,008 | B2 | 4/2012 | Bae et al. |
| 8,195,511 | B2 | 6/2012 | Bowles et al. |
| 8,200,533 | B2 | 6/2012 | Librizzi et al. |
| 8,200,736 | B2 | 6/2012 | Shi |
| 8,215,546 | B2 | 7/2012 | Lin et al. |
| 8,234,185 | B2 | 7/2012 | Davis |
| 8,239,262 | B2 | 8/2012 | Bowles et al. |
| 8,254,883 | B2 | 8/2012 | Uchida |
| 8,266,008 | B1 | 9/2012 | Siegel et al. |
| 8,340,815 | B2 | 12/2012 | Peters et al. |
| 8,369,987 | B2 | 2/2013 | Claessen |
| 8,401,914 | B1 | 3/2013 | Kim |
| 8,417,234 | B2 | 4/2013 | Sanding et al. |
| 8,423,404 | B2 | 4/2013 | Bowles et al. |
| 8,429,021 | B2 | 4/2013 | Kraft et al. |
| 8,463,646 | B2 | 6/2013 | Bowles |
| 8,536,472 | B2 | 9/2013 | Wu et al. |
| 8,543,358 | B2 | 9/2013 | Trabona |
| 8,566,183 | B1 | 10/2013 | Bonar et al. |
| 8,606,633 | B2 | 12/2013 | Tarbert et al. |
| 8,718,717 | B2 | 5/2014 | Vaknin et al. |
| 8,743,215 | B1 | 6/2014 | Lee |
| 8,755,783 | B2 | 6/2014 | Brahami et al. |
| 8,781,622 | B2 | 7/2014 | Mockus |
| 8,806,280 | B2 | 8/2014 | Stephenson |
| 8,823,794 | B2 | 9/2014 | Suzuki et al. |
| 8,824,136 | B1 | 9/2014 | Interian et al. |
| 8,922,643 | B2 | 12/2014 | Ji et al. |
| 9,010,627 | B1 | 4/2015 | Prasad et al. |
| 9,043,026 | B2 | 5/2015 | Lien et al. |
| 9,075,781 | B2 | 7/2015 | Matthews |
| 9,081,477 | B2 | 7/2015 | Kang |
| 9,124,056 | B1 | 9/2015 | Lewis, Jr. |
| 9,147,063 | B1 | 9/2015 | Florissi |
| 9,153,089 | B1 | 10/2015 | Hewett |
| 9,189,911 | B2 | 11/2015 | Kavli et al. |
| 9,195,979 | B2 | 11/2015 | Geller |
| 9,256,863 | B2 | 2/2016 | Chayon et al. |
| 9,283,672 | B1 | 3/2016 | Matthews |
| 9,317,989 | B2 | 4/2016 | Grow et al. |
| 9,355,515 | B2 | 5/2016 | Brahami et al. |
| 9,367,436 | B2 | 6/2016 | Matthews |
| 9,367,982 | B2 | 6/2016 | Chayun et al. |
| 9,378,606 | B2 | 6/2016 | Chayun et al. |
| 9,390,442 | B2 | 7/2016 | Lyle |
| 9,469,037 | B2 | 10/2016 | Matthews |
| 9,497,563 | B2 | 11/2016 | Hornung et al. |
| 9,549,316 | B2 | 1/2017 | Ben-Harosh et al. |
| 9,578,133 | B2 | 2/2017 | Matthews |
| 9,582,101 | B2 | 2/2017 | Chang et al. |
| 9,595,238 | B2 | 3/2017 | Won |
| 9,621,947 | B1 | 4/2017 | Oztaskent |
| 9,641,997 | B2 | 5/2017 | Vratskides |
| 9,668,298 | B1 | 5/2017 | Pearl et al. |
| 9,697,548 | B1 | 7/2017 | Jaff et al. |
| 9,704,142 | B2 | 7/2017 | Ahn |
| 9,718,196 | B2 | 8/2017 | Matthews |
| 9,792,597 | B1 | 10/2017 | Abbott |
| 9,818,160 | B2 | 11/2017 | Bowles et al. |
| 9,858,178 | B2 | 1/2018 | Matthews |
| 9,866,664 | B2 | 1/2018 | Sinha et al. |
| 9,881,284 | B2 | 1/2018 | Bowles et al. |
| 9,885,672 | B2 | 2/2018 | Forutanpour et al. |
| 9,904,911 | B2 | 2/2018 | Bowles et al. |
| 9,911,102 | B2 | 3/2018 | Bowles |
| 9,934,644 | B2 | 4/2018 | Chayun et al. |
| 9,936,331 | B2 | 4/2018 | Matthews |
| 9,972,046 | B2 | 5/2018 | Ackerman |
| 10,032,140 | B2 | 7/2018 | Bowles et al. |
| 10,043,339 | B2 | 8/2018 | Walker et al. |
| 10,044,843 | B2 | 8/2018 | Sinha et al. |
| 10,055,798 | B2 | 8/2018 | Bowles et al. |
| 10,127,647 | B2 | 11/2018 | Forutanpour et al. |
| 10,157,379 | B2 | 12/2018 | Singh |
| 10,157,427 | B2 | 12/2018 | Bowles et al. |
| 10,261,611 | B2 | 4/2019 | Matthews |
| 10,264,426 | B2 | 4/2019 | Matthews |
| 10,269,110 | B2 | 4/2019 | Forutanpour et al. |
| 10,275,813 | B2 | 4/2019 | Fu |
| 10,304,057 | B1 | 5/2019 | Powell |
| 10,325,440 | B2 | 6/2019 | Abdelmalak et al. |
| 10,339,509 | B2 | 7/2019 | Bordeleau et al. |
| 10,401,411 | B2 | 9/2019 | Snook et al. |
| 10,417,615 | B2 | 9/2019 | Bowles et al. |
| 10,438,174 | B2 | 10/2019 | Bowles et al. |
| 10,445,708 | B2 | 10/2019 | Hunt et al. |
| 10,452,527 | B2 | 10/2019 | Matthews |
| 10,475,002 | B2 | 11/2019 | Silva et al. |
| 10,496,963 | B2 | 12/2019 | Silva et al. |
| 10,528,992 | B2 | 1/2020 | Yost |
| 10,529,008 | B1 | 1/2020 | Pritchard |
| 10,565,629 | B2 | 2/2020 | Hartman |
| 10,572,946 | B2 | 2/2020 | Bowles et al. |
| 10,600,095 | B2 | 3/2020 | Ackerman |
| 10,671,367 | B2 | 6/2020 | Matthews |
| 10,679,279 | B2 | 6/2020 | Ward |
| 10,726,542 | B2 | 7/2020 | Nguyen |
| 10,740,891 | B1 | 8/2020 | Chen et al. |
| 10,755,401 | B2 | 8/2020 | Bian et al. |
| 10,803,527 | B1 | 10/2020 | Zankat et al. |
| 10,810,732 | B2 | 10/2020 | Dwivedi et al. |
| 10,824,942 | B1 | 11/2020 | Bhotika et al. |
| 10,825,082 | B2 | 11/2020 | Librizzi et al. |
| 10,834,555 | B2 | 11/2020 | Matthews |
| 10,839,651 | B2 | 11/2020 | Smart |
| 10,846,672 | B2 | 11/2020 | Dion et al. |
| 10,853,873 | B2 | 12/2020 | Bowles et al. |
| 10,860,122 | B2 | 12/2020 | Matthews |
| 10,860,990 | B2 | 12/2020 | Bowles et al. |
| 10,891,669 | B2 | 1/2021 | Glickman et al. |
| 10,909,673 | B2 | 2/2021 | Forutanpour et al. |
| 10,965,862 | B2 | 3/2021 | Weir et al. |
| 10,970,786 | B1 | 4/2021 | Matheson et al. |
| 10,977,700 | B2 | 4/2021 | Bordeleau et al. |
| 10,991,093 | B2 | 4/2021 | Do et al. |
| 11,004,126 | B1 | 5/2021 | Jacobs, II |
| 11,010,841 | B2 | 5/2021 | Bowles et al. |
| 11,014,093 | B1 | 5/2021 | Drexler |
| 11,024,111 | B2 | 6/2021 | Abdelmalak et al. |
| 11,069,141 | B2 | 7/2021 | Wurmfeld et al. |
| 11,079,753 | B1 | 8/2021 | Roy |
| 11,080,662 | B2 | 8/2021 | Bowles et al. |
| 11,080,672 | B2 | 8/2021 | Bowles |
| 11,107,046 | B2 | 8/2021 | Bowles |
| 11,122,034 | B2 | 9/2021 | Cicchitto |
| 11,126,973 | B2 | 9/2021 | Silva et al. |
| 11,164,000 | B2 | 11/2021 | Lee et al. |
| 11,232,412 | B2 | 1/2022 | Hunt et al. |
| 11,249,769 | B2 | 2/2022 | Li et al. |
| 11,257,057 | B1 | 2/2022 | Asmi et al. |
| 11,288,789 | B1 | 3/2022 | Chen et al. |
| 11,302,038 | B2 | 4/2022 | Muendel et al. |
| 11,315,093 | B2 | 4/2022 | Bowles |
| 11,321,768 | B2 | 5/2022 | Beauchamp |
| 11,328,562 | B2 | 5/2022 | Smart |
| 11,341,471 | B2 | 5/2022 | Dion et al. |
| 11,361,599 | B2 | 6/2022 | Herman et al. |
| 11,379,886 | B1 | 7/2022 | Fields et al. |
| 11,386,740 | B2 | 7/2022 | Shah |
| 11,417,068 | B1 | 8/2022 | Burris et al. |
| 11,436,570 | B2 | 9/2022 | Bowles et al. |
| 11,443,289 | B2 | 9/2022 | Bowles et al. |
| 11,462,868 | B2 | 10/2022 | Forutanpour et al. |
| 11,481,754 | B2 | 10/2022 | Priebatsch |
| 11,482,067 | B2 | 10/2022 | Forutanpour et al. |
| 11,526,932 | B2 | 12/2022 | Bowles et al. |
| 11,574,182 | B2 | 2/2023 | Matthews |
| 11,580,627 | B2 | 2/2023 | Johnson et al. |
| 11,599,796 | B2 | 3/2023 | Boa et al. |

(56) References Cited

U.S. PATENT DOCUMENTS 11,623,823 B1 4/2023 Hoshino
11,631,096 B2 4/2023 Schubert et al.
11,657,631 B2 5/2023 Sagnoas
11,687,900 B2 6/2023 Dion et al.
11,688,149 B1 6/2023 Mascarin et al.
11,688,222 B2 6/2023 Dion et al.
11,720,871 B2 8/2023 Dion et al.
11,734,654 B2 8/2023 Silva et al.
11,790,327 B2 10/2023 Bowles et al.
11,790,328 B2 10/2023 Forutanpour et al.
11,798,250 B2 10/2023 Forutanpour et al.
11,803,954 B2 10/2023 Forutanpour et al.
11,836,867 B2 12/2023 Sadalgi
11,843,206 B2 12/2023 Forutanpour et al.
11,900,553 B2 2/2024 Ha
11,907,915 B2 2/2024 Bowles et al.
11,922,467 B2 3/2024 Forutanpour et al.
11,935,138 B2 3/2024 Bowles et al.
11,989,701 B2 5/2024 Hunt et al.
11,989,710 B2 5/2024 Forutanpour et al.
12,008,520 B2 6/2024 Bowles
12,033,454 B2 7/2024 Forutanpour et al.
12,045,973 B2 7/2024 Johnson et al.
12,182,773 B2 12/2024 Bowles
12,198,108 B2 1/2025 Bowles
12,205,081 B2 1/2025 Bowles et al.
12,217,221 B2 2/2025 Silva et al.
12,223,684 B2 2/2025 Silva et al.
12,271,929 B2 4/2025 Forutanpour et al.
12,300,059 B2 5/2025 Forutanpour et al.
12,321,965 B2 6/2025 Forutanpour et al.
12,322,259 B2 6/2025 Forutanpour et al.
2001/0025883 A1 10/2001 Ichihara et al.
2001/0035425 A1 11/2001 Rocco et al.
2001/0039531 A1 11/2001 Aoki
2002/0014577 A1 2/2002 Ulrich et al.
2002/0035515 A1 3/2002 Moreno
2002/0046122 A1 4/2002 Barber
2002/0067184 A1 6/2002 Smith et al.
2002/0087413 A1 7/2002 Mahaffy et al.
2002/0112177 A1 8/2002 Voltmer
2002/0129170 A1 9/2002 Moore et al.
2002/0147656 A1 10/2002 Tam
2002/0157033 A1 10/2002 Cox
2002/0162966 A1 11/2002 Yoder
2002/0186878 A1 12/2002 Hoon et al.
2003/0006277 A1 1/2003 Maskatiya et al.
2003/0018897 A1 1/2003 Bellis, Jr. et al.
2003/0025476 A1 2/2003 Trela
2003/0036866 A1 2/2003 Nair et al.
2003/0061150 A1 3/2003 Kocher et al.
2003/0063527 A1 4/2003 Ostwald
2003/0083983 A1 5/2003 Fisher
2003/0100707 A1 5/2003 Hwang et al.
2003/0146898 A1 8/2003 Kawasaki et al.
2003/0158789 A1 8/2003 Miura et al.
2003/0170529 A1 9/2003 Sagawa
2003/0179371 A1 9/2003 Rangarajan et al.
2003/0191675 A1 10/2003 Murashita
2003/0197782 A1 10/2003 Ashe
2003/0204289 A1 10/2003 Banerjee et al.
2004/0012825 A1 1/2004 Tesavis
2004/0039639 A1 2/2004 Walker
2004/0088231 A1 5/2004 Davis
2004/0114153 A1 6/2004 Andersen et al.
2004/0141320 A1 7/2004 Bock et al.
2004/0150815 A1 8/2004 Sones et al.
2004/0156557 A1 8/2004 Van Der Weij
2004/0184651 A1 9/2004 Nordbryhn
2004/0186744 A1 9/2004 Lux
2004/0189812 A1 9/2004 Gustavsson
2004/0200902 A1 10/2004 Ishioroshi
2004/0205015 A1 10/2004 DeLaCruz
2004/0235513 A1 11/2004 O'Connell
2004/0242216 A1 12/2004 Boutsikakis
2004/0243478 A1 12/2004 Walker et al.
2004/0262521 A1 12/2004 Devitt et al.
2005/0022699 A1 2/2005 Goza
2005/0027622 A1 2/2005 Walker et al.
2005/0043897 A1 2/2005 Meyer
2005/0088379 A1 4/2005 Tsuchida
2005/0109841 A1 5/2005 Ryan et al.
2005/0128551 A1 6/2005 Yang
2005/0135917 A1 6/2005 Kauppila et al.
2005/0137942 A1 6/2005 LaFluer
2005/0139661 A1 6/2005 Eglen et al.
2005/0143149 A1 6/2005 Becker et al.
2005/0167620 A1 8/2005 Cho et al.
2005/0187657 A1 8/2005 Hashimoto et al.
2005/0216120 A1 9/2005 Rosenberg et al.
2005/0222690 A1 10/2005 Wang et al.
2005/0231595 A1 10/2005 Wang et al.
2005/0240958 A1 10/2005 Nguyen et al.
2006/0022827 A1 2/2006 Highham
2006/0038114 A9 2/2006 Cofer et al.
2006/0047573 A1 3/2006 Mitchell et al.
2006/0074756 A1 4/2006 Boykin
2006/0085158 A1 4/2006 Cakiner
2006/0129411 A1 6/2006 Bhatti et al.
2006/0167580 A1 7/2006 Whittier
2006/0184379 A1 8/2006 Tan et al.
2006/0195384 A1 8/2006 Bauer et al.
2006/0215027 A1 9/2006 Nonoyama et al.
2006/0217152 A1 9/2006 Fok et al.
2006/0219776 A1 10/2006 Finn
2006/0229108 A1 10/2006 Cehelnik
2006/0230013 A1 10/2006 Hrle
2006/0235747 A1 10/2006 Hammond et al.
2006/0258008 A1 11/2006 Holler et al.
2006/0261931 A1 11/2006 Cheng et al.
2006/0271431 A1 11/2006 Wehr et al.
2006/0279307 A1 12/2006 Wang et al.
2006/0280356 A1 12/2006 Yamagashi
2006/0287929 A1 12/2006 Bae et al.
2007/0012665 A1 1/2007 Nelson
2007/0013124 A1 1/2007 Graef et al.
2007/0013139 A1 1/2007 Kumagai
2007/0032098 A1 2/2007 Bowles et al.
2007/0050083 A1 3/2007 Signorelli
2007/0057815 A1 3/2007 Foy et al.
2007/0129906 A1 6/2007 Stoecker et al.
2007/0133844 A1 6/2007 Waehner et al.
2007/0140310 A1 6/2007 Rolton et al.
2007/0150403 A1 6/2007 Mock et al.
2007/0205751 A1 9/2007 Suzuki et al.
2007/0258085 A1 11/2007 Robbins
2007/0263099 A1 11/2007 Motta et al.
2007/0269099 A1 11/2007 Nishino et al.
2007/0271194 A1 11/2007 Walker
2007/0276911 A1 11/2007 Bhumkar
2007/0281734 A1 12/2007 Mizrachi
2007/0282999 A1 12/2007 Tu et al.
2008/0004828 A1 1/2008 Mizrachi
2008/0027581 A1 1/2008 Saether et al.
2008/0033596 A1 2/2008 Fausak et al.
2008/0088833 A1 * 4/2008 Yokota ............... G01N 21/9503
356/237.5
2008/0109746 A1 5/2008 Mayer
2008/0111989 A1 5/2008 Dufour et al.
2008/0133432 A1 6/2008 Ramseyer
2008/0149720 A1 6/2008 Colville
2008/0167578 A1 7/2008 Bryer et al.
2008/0177598 A1 7/2008 Davie
2008/0207198 A1 8/2008 Juric
2008/0228582 A1 9/2008 Fordyce
2008/0231113 A1 9/2008 Guccione et al.
2008/0255901 A1 10/2008 Carroll et al.
2008/0256008 A1 10/2008 Kwok
2008/0260235 A1 10/2008 Cai et al.
2008/0277467 A1 11/2008 Carlson
2008/0281691 A1 11/2008 Pearson et al.
2008/0296374 A1 12/2008 Gonen et al.
2008/0303915 A1 12/2008 Omi
2008/0306701 A1 12/2008 Zhong et al.

(56) References Cited

U.S. PATENT DOCUMENTS

2009/0051907 A1 2/2009 Li et al.
2009/0078775 A1 3/2009 Giebel et al.
2009/0079388 A1 3/2009 Reddy
2009/0095047 A1 4/2009 Patel et al.
2009/0108015 A1 4/2009 Kreamer
2009/0114716 A1 5/2009 Ramachandran
2009/0132813 A1 5/2009 Schibuk
2009/0145727 A1 6/2009 Johns
2009/0156199 A1 6/2009 Steenstra et al.
2009/0160668 A1 6/2009 Crowley et al.
2009/0177319 A1 7/2009 Garibaldi et al.
2009/0184865 A1 7/2009 Valo et al.
2009/0187491 A1 7/2009 Bull et al.
2009/0190142 A1 7/2009 Taylor et al.
2009/0191931 A1 7/2009 Peck
2009/0207743 A1 8/2009 Huq et al.
2009/0244285 A1 10/2009 Chathukutty
2009/0247133 A1 10/2009 Holmen et al.
2009/0248883 A1 10/2009 Suryanarayana et al.
2009/0251815 A1 10/2009 Wang et al.
2009/0262341 A1 10/2009 Konopa et al.
2009/0265035 A1 10/2009 Jenkinson et al.
2009/0299543 A1 12/2009 Cox et al.
2009/0312009 A1 12/2009 Fishel
2009/0321511 A1 12/2009 Browne
2009/0322706 A1 12/2009 Austin
2010/0005004 A1 1/2010 Hudak et al.
2010/0051695 A1 3/2010 Yepez et al.
2010/0063894 A1 3/2010 Lundy
2010/0110174 A1 5/2010 Leconte
2010/0115887 A1 5/2010 Schroeder et al.
2010/0147953 A1 6/2010 Barkan
2010/0157280 A1 6/2010 Kusevic et al.
2010/0161397 A1 6/2010 Gauthier et al.
2010/0162359 A1 6/2010 Casey et al.
2010/0174596 A1 7/2010 Gilman
2010/0185506 A1 7/2010 Wolff
2010/0219234 A1 9/2010 Forbes
2010/0235198 A1 9/2010 Fini et al.
2010/0237854 A1 9/2010 Kumhyr et al.
2010/0260271 A1 10/2010 Kapoor
2010/0262481 A1 10/2010 Baker et al.
2010/0268792 A1 10/2010 Butler
2010/0312639 A1 12/2010 Mastronardi
2011/0035322 A1 2/2011 Lively
2011/0043628 A1 2/2011 Yun
2011/0047022 A1 2/2011 Walker
2011/0050164 A1 3/2011 Partovi et al.
2011/0055322 A1 3/2011 Gregersen
2011/0060641 A1 3/2011 Grossman et al.
2011/0066514 A1 3/2011 Maraz
2011/0067520 A1 3/2011 Ihrke et al.
2011/0082734 A1 4/2011 Zhang et al.
2011/0099264 A1 4/2011 Chapin et al.
2011/0113479 A1 5/2011 Ganem
2011/0173576 A1 7/2011 Murphy et al.
2011/0191861 A1 8/2011 Spears
2011/0295417 A1 12/2011 Smith, III
2011/0296339 A1 12/2011 Kang
2011/0296508 A1 12/2011 Os et al.
2011/0313840 A1 12/2011 Mason et al.
2012/0004761 A1 1/2012 Madruga
2012/0016518 A1 1/2012 Saario et al.
2012/0022965 A1 1/2012 Seergy
2012/0026582 A1 2/2012 Okabe et al.
2012/0029985 A1 2/2012 Wilson et al.
2012/0030097 A1 2/2012 Hagan et al.
2012/0030399 A1 2/2012 Ben-Harosh
2012/0054113 A1 3/2012 Jayaraman et al.
2012/0063501 A1 3/2012 Aguren
2012/0078413 A1 3/2012 Baker
2012/0095875 A1 4/2012 Guthrie
2012/0116928 A1 5/2012 Gventer
2012/0116929 A1 5/2012 Gventer
2012/0117001 A1 5/2012 Gventer et al.
2012/0127307 A1 5/2012 Hassenzahl
2012/0146956 A1 6/2012 Jenkinson
2012/0209783 A1 8/2012 Smith et al.
2012/0235812 A1 9/2012 De Mello et al.
2012/0246083 A1 9/2012 Bowles
2012/0254046 A1 10/2012 Librizzi et al.
2012/0263394 A1 10/2012 Fujiwara et al.
2012/0280934 A1 11/2012 Ha
2012/0294490 A1 11/2012 Bowles et al.
2012/0301009 A1 11/2012 Dabic
2012/0303431 A1 11/2012 Phillips et al.
2013/0006713 A1 1/2013 Haake
2013/0034305 A1 2/2013 Jahanshahi et al.
2013/0041508 A1 2/2013 Hu et al.
2013/0046611 A1 2/2013 Bowles et al.
2013/0046699 A1* 2/2013 Bowles ................. G06Q 10/00
705/306
2013/0073376 A1 3/2013 Heath
2013/0112440 A1 5/2013 Alsaif et al.
2013/0124426 A1 5/2013 Bowles et al.
2013/0126741 A1 5/2013 Srivastava et al.
2013/0137376 A1 5/2013 Fitzgerald et al.
2013/0138528 A1 5/2013 McAlhaney
2013/0144797 A1 6/2013 Bowles et al.
2013/0155061 A1 6/2013 Jahanshahi et al.
2013/0159119 A1 6/2013 Henderson et al.
2013/0169413 A1 7/2013 Schuessler
2013/0173430 A1 7/2013 Benjamin
2013/0173434 A1 7/2013 Hartman
2013/0181935 A1 7/2013 McKenzie et al.
2013/0198089 A1 8/2013 Bowles
2013/0198144 A1 8/2013 Bowles
2013/0200912 A1 8/2013 Panagas
2013/0246211 A1 9/2013 Sullivan
2013/0246212 A1 9/2013 Sullivan
2013/0253700 A1 9/2013 Carson et al.
2013/0284805 A1 10/2013 Kraft et al.
2013/0290146 A1 10/2013 West et al.
2013/0297388 A1 11/2013 Kyle, Jr. et al.
2014/0006451 A1 1/2014 Mullis et al.
2014/0012643 A1 1/2014 Behrisch
2014/0028449 A1 1/2014 Sigal et al.
2014/0038556 A1 2/2014 DeSousa
2014/0046748 A1 2/2014 Nagarajan
2014/0046845 A1 2/2014 Dogin et al.
2014/0052329 A1 2/2014 Amirpour
2014/0067710 A1 3/2014 Gventer et al.
2014/0080550 A1 3/2014 Ino et al.
2014/0143161 A1 5/2014 Ahn
2014/0147004 A1 5/2014 Uchida
2014/0149201 A1 5/2014 Abbott
2014/0150100 A1 5/2014 Gupta et al.
2014/0156883 A1 6/2014 Bowles
2014/0178029 A1 6/2014 Raheman et al.
2014/0214505 A1 7/2014 Shuster-Arechiga et al.
2014/0235258 A1 8/2014 Wang et al.
2014/0244315 A1 8/2014 Cahill et al.
2014/0249668 A1 9/2014 Kavli et al.
2014/0267691 A1 9/2014 Humphrey
2014/0273245 A1 9/2014 Ochranek et al.
2014/0278244 A1 9/2014 Humphrey et al.
2014/0295819 A1 10/2014 Chayun et al.
2014/0297368 A1 10/2014 Ferder
2014/0316561 A1 10/2014 Tkachenko
2014/0330685 A1 11/2014 Nazzari
2014/0346185 A1 11/2014 Chayun et al.
2014/0347473 A1 11/2014 Wolff et al.
2015/0006281 A1 1/2015 Takahashi
2015/0046343 A1 2/2015 Martini
2015/0066677 A1 3/2015 Bowles et al.
2015/0073590 A1 3/2015 Garcia
2015/0088698 A1 3/2015 Ackerman
2015/0088731 A1 3/2015 Ackerman
2015/0105901 A1 4/2015 Joshi
2015/0120485 A1 4/2015 Nash
2015/0161714 A1 6/2015 Fainshtein
2015/0170237 A1 6/2015 Powell
2015/0177330 A1 6/2015 Morris
2015/0193797 A1 7/2015 Gerrity

(56) References Cited

U.S. PATENT DOCUMENTS

| | | | | |
|---|---|---|---|---|
| 2015/0206200 | A1 | 7/2015 | Edmondson et al. | |
| 2015/0249353 | A1 | 9/2015 | Hamilton | |
| 2015/0278529 | A1 | 10/2015 | Cho et al. | |
| 2015/0293860 | A9 | 10/2015 | Bowles | |
| 2015/0294278 | A1 | 10/2015 | Nguyen | |
| 2015/0309912 | A1 | 10/2015 | Nguyen et al. | |
| 2015/0317619 | A1 | 11/2015 | Curtis | |
| 2015/0324761 | A1 | 11/2015 | Nguyen et al. | |
| 2015/0324870 | A1 | 11/2015 | Nguyen et al. | |
| 2015/0332206 | A1 | 11/2015 | Trew et al. | |
| 2015/0356637 | A1 | 12/2015 | Graffia et al. | |
| 2016/0019607 | A1 | 1/2016 | Burmester et al. | |
| 2016/0019685 | A1 | 1/2016 | Nguyen et al. | |
| 2016/0055392 | A1 | 2/2016 | Nakano | |
| 2016/0078434 | A1 | 3/2016 | Huxham et al. | |
| 2016/0087381 | A1 | 3/2016 | Wong et al. | |
| 2016/0092849 | A1 | 3/2016 | Cirannek et al. | |
| 2016/0098688 | A1 | 4/2016 | Hunt et al. | |
| 2016/0098690 | A1 | 4/2016 | Silva et al. | |
| 2016/0125367 | A1 | 5/2016 | Bowles et al. | |
| 2016/0125612 | A1 | 5/2016 | Seki et al. | |
| 2016/0171544 | A1 | 6/2016 | Heminger et al. | |
| 2016/0171575 | A1 | 6/2016 | Bowles et al. | |
| 2016/0184990 | A1 | 6/2016 | Song et al. | |
| 2016/0210648 | A1 | 7/2016 | Cirannek et al. | |
| 2016/0253861 | A1 | 9/2016 | Seo | |
| 2016/0269401 | A1 | 9/2016 | Saito et al. | |
| 2016/0269895 | A1 | 9/2016 | Soini et al. | |
| 2016/0275460 | A1 | 9/2016 | Ploetner et al. | |
| 2016/0275518 | A1 | 9/2016 | Bowles et al. | |
| 2016/0292710 | A1 | 10/2016 | Casselle | |
| 2016/0301786 | A1 | 10/2016 | Koltsov et al. | |
| 2016/0327383 | A1* | 11/2016 | Becker | G01B 11/25 |
| 2016/0328684 | A1 | 11/2016 | Bowles et al. | |
| 2016/0335616 | A1 | 11/2016 | Bordeleau et al. | |
| 2016/0379287 | A1 | 12/2016 | Dabiri | |
| 2017/0011374 | A1 | 1/2017 | McDivitt | |
| 2017/0083886 | A1 | 3/2017 | Silva et al. | |
| 2017/0091823 | A1 | 3/2017 | Adinarayan et al. | |
| 2017/0110902 | A1 | 4/2017 | Miller | |
| 2017/0115235 | A1 | 4/2017 | Ohlsson et al. | |
| 2017/0142484 | A1 | 5/2017 | Jeon | |
| 2017/0169401 | A1 | 6/2017 | Beane et al. | |
| 2017/0221110 | A1 | 8/2017 | Sullivan et al. | |
| 2017/0249729 | A1* | 8/2017 | Greene | G01B 11/24 |
| 2017/0256051 | A1 | 9/2017 | Dwivedi et al. | |
| 2017/0278191 | A1 | 9/2017 | Tassone et al. | |
| 2017/0286921 | A1 | 10/2017 | Bowles | |
| 2017/0301010 | A1 | 10/2017 | Bowles et al. | |
| 2017/0301035 | A1 | 10/2017 | Bowles et al. | |
| 2017/0301078 | A1 | 10/2017 | Forutanpour et al. | |
| 2017/0323279 | A1* | 11/2017 | Dion | G07F 19/20 |
| 2017/0330158 | A1 | 11/2017 | Librizzi et al. | |
| 2017/0343481 | A1 | 11/2017 | Jahanshahi et al. | |
| 2017/0356857 | A1* | 12/2017 | Forutanpour | G06Q 10/30 |
| 2017/0372465 | A1 | 12/2017 | Forutanpour et al. | |
| 2018/0084094 | A1 | 3/2018 | Sinha et al. | |
| 2018/0101810 | A1 | 4/2018 | Feng et al. | |
| 2018/0122022 | A1 | 5/2018 | Kelly | |
| 2018/0130136 | A1 | 5/2018 | Bowles et al. | |
| 2018/0157246 | A1 | 6/2018 | Huang et al. | |
| 2018/0157820 | A1 | 6/2018 | Adams et al. | |
| 2018/0160269 | A1 | 6/2018 | Baarman et al. | |
| 2018/0165655 | A1 | 6/2018 | Marcelle et al. | |
| 2018/0240144 | A1 | 8/2018 | Curtis | |
| 2018/0255047 | A1 | 9/2018 | Cicchitto | |
| 2018/0293566 | A1 | 10/2018 | Engles et al. | |
| 2018/0293664 | A1 | 10/2018 | Zhang et al. | |
| 2018/0300776 | A1 | 10/2018 | Yost | |
| 2018/0321163 | A1 | 11/2018 | Casadio | |
| 2018/0322623 | A1 | 11/2018 | Memo et al. | |
| 2018/0342050 | A1 | 11/2018 | Fitzgerald et al. | |
| 2018/0350163 | A1 | 12/2018 | Pofale et al. | |
| 2018/0365744 | A1 | 12/2018 | Lennon | |
| 2019/0017863 | A1 | 1/2019 | Saltzman et al. | |
| 2019/0019147 | A1 | 1/2019 | McCarty et al. | |
| 2019/0051090 | A1 | 2/2019 | Goldberg et al. | |
| 2019/0066075 | A1 | 2/2019 | Lobo et al. | |
| 2019/0066439 | A1 | 2/2019 | Pinkus | |
| 2019/0073566 | A1 | 3/2019 | Brauer | |
| 2019/0073568 | A1 | 3/2019 | He et al. | |
| 2019/0102874 | A1 | 4/2019 | Goja | |
| 2019/0156611 | A1 | 5/2019 | Redhead | |
| 2019/0166278 | A1 | 5/2019 | Hiyama et al. | |
| 2019/0222748 | A1 | 7/2019 | Weir et al. | |
| 2019/0251777 | A1 | 8/2019 | Abdelmalak et al. | |
| 2019/0272628 | A1 | 9/2019 | Tsou | |
| 2019/0279181 | A1 | 9/2019 | Kelly | |
| 2019/0279431 | A1 | 9/2019 | Wurmfeld et al. | |
| 2019/0318465 | A1 | 10/2019 | Nguyen | |
| 2019/0372827 | A1 | 12/2019 | Vasseur et al. | |
| 2019/0375300 | A1 | 12/2019 | Lyon | |
| 2020/0020097 | A1 | 1/2020 | Do et al. | |
| 2020/0042795 | A1 | 2/2020 | Lee et al. | |
| 2020/0042969 | A1 | 2/2020 | Ray | |
| 2020/0066067 | A1 | 2/2020 | Herman et al. | |
| 2020/0090137 | A1 | 3/2020 | Bowles et al. | |
| 2020/0104028 | A1 | 4/2020 | Vats | |
| 2020/0104720 | A1 | 4/2020 | Boa et al. | |
| 2020/0104868 | A1 | 4/2020 | Schubert et al. | |
| 2020/0175481 | A1 | 6/2020 | Pham | |
| 2020/0175669 | A1 | 6/2020 | Bian et al. | |
| 2020/0202319 | A1 | 6/2020 | Forutanpour et al. | |
| 2020/0202405 | A1 | 6/2020 | Glickman et al. | |
| 2020/0202419 | A1 | 6/2020 | Beauchamp | |
| 2020/0241891 | A1 | 7/2020 | Li et al. | |
| 2020/0265487 | A1 | 8/2020 | Forutanpour et al. | |
| 2020/0265666 | A1 | 8/2020 | Yamamiya | |
| 2020/0286030 | A1 | 9/2020 | Hewett | |
| 2020/0342442 | A1 | 10/2020 | Curtis | |
| 2020/0387881 | A1 | 12/2020 | Smith | |
| 2020/0393742 | A1 | 12/2020 | Dion et al. | |
| 2020/0410793 | A1 | 12/2020 | Folco | |
| 2021/0012315 | A1 | 1/2021 | Priebatsch | |
| 2021/0081698 | A1 | 3/2021 | Lindeman et al. | |
| 2021/0081914 | A1 | 3/2021 | Nelms et al. | |
| 2021/0110440 | A1* | 4/2021 | Dion | G06Q 30/018 |
| 2021/0150773 | A1 | 5/2021 | Muendel et al. | |
| 2021/0174312 | A1 | 6/2021 | Bowles et al. | |
| 2021/0192484 | A1 | 6/2021 | Forutanpour et al. | |
| 2021/0209512 | A1 | 7/2021 | Gaddam et al. | |
| 2021/0209746 | A1 | 7/2021 | Johnson et al. | |
| 2021/0217076 | A1 | 7/2021 | Kruper et al. | |
| 2021/0224867 | A1 | 7/2021 | Bordeleau et al. | |
| 2021/0247016 | A1 | 8/2021 | Affentranger | |
| 2021/0254966 | A1* | 8/2021 | Hur | G01B 5/0004 |
| 2021/0255240 | A1 | 8/2021 | McGrath | |
| 2021/0264483 | A1 | 8/2021 | Hirata | |
| 2021/0272208 | A1 | 9/2021 | Leise et al. | |
| 2021/0278338 | A1 | 9/2021 | Jung | |
| 2021/0295494 | A1 | 9/2021 | Forutanpour et al. | |
| 2021/0327203 | A1 | 10/2021 | Shah | |
| 2021/0343030 | A1 | 11/2021 | Sagnoas | |
| 2021/0357545 | A1 | 11/2021 | Sugawara et al. | |
| 2022/0027879 | A1 | 1/2022 | Bowles et al. | |
| 2022/0050897 | A1 | 2/2022 | Gaddam et al. | |
| 2022/0051212 | A1 | 2/2022 | Forutanpour et al. | |
| 2022/0051300 | A1 | 2/2022 | Forutanpour et al. | |
| 2022/0051301 | A1 | 2/2022 | Forutanpour et al. | |
| 2022/0051507 | A1 | 2/2022 | Forutanpour et al. | |
| 2022/0051514 | A1 | 2/2022 | Schmidt | |
| 2022/0067798 | A1 | 3/2022 | Forutanpour et al. | |
| 2022/0068076 | A1 | 3/2022 | Forutanpour et al. | |
| 2022/0084296 | A1 | 3/2022 | Sadalgi | |
| 2022/0114854 | A1 | 4/2022 | Forutanpour et al. | |
| 2022/0164833 | A1 | 5/2022 | Dion et al. | |
| 2022/0172178 | A1 | 6/2022 | Forutanpour et al. | |
| 2022/0187802 | A1 | 6/2022 | Wittenberg et al. | |
| 2022/0198407 | A1 | 6/2022 | Beane et al. | |
| 2022/0254216 | A1 | 8/2022 | Schwarzli | |
| 2022/0262189 | A1 | 8/2022 | Dion et al. | |
| 2022/0277281 | A1 | 9/2022 | Dion et al. | |
| 2022/0284406 | A1 | 9/2022 | Hunt et al. | |
| 2022/0292464 | A1 | 9/2022 | Silva et al. | |

(56) References Cited

U.S. PATENT DOCUMENTS

2022/0318774 A1 10/2022 Bowles
2023/0007937 A1 1/2023 Forutanpour et al.
2023/0051060 A1 2/2023 Nitu
2023/0077844 A1 3/2023 Bowles et al.
2023/0100849 A1 3/2023 Bowles et al.
2023/0188998 A1 6/2023 Zellner et al.
2023/0196865 A1 6/2023 Forutanpour et al.
2023/0215109 A1 7/2023 Ha
2023/0238751 A1 7/2023 Forutanpour et al.
2023/0259910 A1 8/2023 Forutanpour et al.
2023/0264871 A1 8/2023 Williams et al.
2023/0274346 A1 8/2023 Bowles et al.
2023/0297973 A1 9/2023 Bowles et al.
2023/0297974 A1 9/2023 Bowles et al.
2023/0306384 A1 9/2023 Bowles et al.
2023/0371729 A1 11/2023 Williams et al.
2023/0394904 A1 12/2023 Forutanpour et al.
2024/0005289 A1 1/2024 Silva et al.
2024/0087276 A1 3/2024 Silva et al.
2024/0144461 A1 5/2024 Forutanpour et al.
2024/0185317 A1 6/2024 Forutanpour et al.
2024/0249251 A1 7/2024 Bowles
2024/0249321 A1 7/2024 Forutanpour et al.
2024/0265364 A1 8/2024 Forutanpour et al.
2024/0265470 A1 8/2024 Bowles et al.
2024/0289753 A1 8/2024 Bowles
2024/0312284 A1 9/2024 Dion
2024/0321033 A1 9/2024 Forutanpour et al.
2024/0322599 A1 9/2024 Bober
2024/0333032 A1 10/2024 Bober
2024/0346463 A1 10/2024 Hunt et al.

FOREIGN PATENT DOCUMENTS

CA 2866147 9/2013
CA 3069888 1/2019
CA 3069890 1/2019
CA 3152907 A1 * 4/2021 ........... H04N 23/695
CN 1365479 8/2002
CN 1574437 2/2005
CN 2708415 7/2005
CN 1864088 11/2006
CN 1957320 5/2007
CN 2912132 6/2007
CN 200965706 10/2007
CN 101176124 5/2008
CN 101379488 A 3/2009
CN 201956656 U 8/2011
CN 102315630 A 1/2012
CN 102467728 A 5/2012
CN 202351953 7/2012
CN 202353475 U 7/2012
CN 102654927 8/2012
CN 202394296 8/2012
CN 102682597 A 9/2012
CN 202564711 U 11/2012
CN 202585951 U 12/2012
CN 202702438 U 1/2013
CN 202711369 U 1/2013
CN 102930642 2/2013
CN 102976004 3/2013
CN 103198562 7/2013
CN 103226870 7/2013
CN 203242065 10/2013
CN 103440607 12/2013
CN 103514641 1/2014
CN 103544772 1/2014
CN 203408902 1/2014
CN 103662541 3/2014
CN 103679147 A 3/2014
CN 203520502 4/2014
CN 103824387 A 5/2014
CN 203588366 U 5/2014
CN 103843040 6/2014
CN 103954626 7/2014
CN 302944037 S 9/2014
CN 302944252 S 9/2014
CN 302944253 S 9/2014
CN 303042750 S 12/2014
CN 105488702 4/2016
CN 205129815 U 4/2016
CN 205132514 U 4/2016
CN 205140067 U 4/2016
CN 106022379 A 10/2016
CN 303896361 S 10/2016
CN 106203643 A 12/2016
CN 106293734 A 1/2017
CN 106372638 A 2/2017
CN 304051346 S 2/2017
CN 304139831 S 5/2017
CN 106911159 6/2017
CN 304169301 S 6/2017
CN 206440635 U 8/2017
CN 107220640 A 9/2017
CN 206466691 U 9/2017
CN 107514978 A 12/2017
CN 206861374 U 1/2018
CN 207037788 U 2/2018
CN 105444678 B 3/2018
CN 304702339 S 6/2018
CN 304702340 S 6/2018
CN 304747709 S 7/2018
CN 304795309 S 8/2018
CN 108596658 A 9/2018
CN 207854959 9/2018
CN 108647588 A 10/2018
CN 207993120 U 10/2018
CN 207993121 U 10/2018
CN 207995226 U 10/2018
CN 304842785 S 10/2018
CN 108764236 A 11/2018
CN 208086545 U 11/2018
CN 208172834 U 11/2018
CN 208176564 12/2018
CN 304958348 S 12/2018
CN 305014434 S 1/2019
CN 305014435 S 1/2019
CN 208790107 4/2019
CN 109831575 A 5/2019
CN 208819255 U 5/2019
CN 208819289 U 5/2019
CN 208819290 U 5/2019
CN 208969761 U 6/2019
CN 305275610 S 7/2019
CN 110333876 A 10/2019
CN 110347341 A 10/2019
CN 110595361 A 12/2019
CN 110653162 A 1/2020
CN 110675399 A 1/2020
CN 110751002 A 2/2020
CN 110788015 A 2/2020
CN 110796646 A 2/2020
CN 110796647 A 2/2020
CN 110796669 A 2/2020
CN 110827244 A 2/2020
CN 110827245 A 2/2020
CN 110827246 A 2/2020
CN 110827247 A 2/2020
CN 110827248 A 2/2020
CN 110827249 A 2/2020
CN 110880028 A 3/2020
CN 110928730 A 3/2020
CN 305638504 S 3/2020
CN 11080184 A 4/2020
CN 110976302 A 4/2020
CN 111009073 A 4/2020
CN 210348162 U 4/2020
CN 111175318 A 5/2020
CN 111210473 A 5/2020
CN 305767220 S 5/2020
CN 111238430 A 6/2020
CN 111262987 A 6/2020
CN 111272067 A 6/2020
CN 111272388 A 6/2020

(56) References Cited

FOREIGN PATENT DOCUMENTS

| | | | |
|---|---|---|---|
| CN | 111272393 | A | 6/2020 |
| CN | 111273704 | A | 6/2020 |
| CN | 111277466 | A | 6/2020 |
| CN | 111277659 | A | 6/2020 |
| CN | 111277695 | A | 6/2020 |
| CN | 111277696 | A | 6/2020 |
| CN | 111290660 | A | 6/2020 |
| CN | 111290949 | A | 6/2020 |
| CN | 111291661 | A | 6/2020 |
| CN | 111292302 | A | 6/2020 |
| CN | 111294454 | A | 6/2020 |
| CN | 111294459 | A | 6/2020 |
| CN | 111307429 | A | 6/2020 |
| CN | 111311556 | A | 6/2020 |
| CN | 111311687 | A | 6/2020 |
| CN | 111311749 | A | 6/2020 |
| CN | 111314445 | A | 6/2020 |
| CN | 111314535 | A | 6/2020 |
| CN | 111325715 | A | 6/2020 |
| CN | 111325716 | A | 6/2020 |
| CN | 111325717 | A | 6/2020 |
| CN | 111325901 | A | 6/2020 |
| CN | 210666955 | U | 6/2020 |
| CN | 305818424 | S | 6/2020 |
| CN | 111439560 | A | 7/2020 |
| CN | 211149556 | U | 7/2020 |
| CN | 305955503 | S | 7/2020 |
| CN | 211291337 | U | 8/2020 |
| CN | 211296771 | U | 8/2020 |
| CN | 211402187 | U | 9/2020 |
| CN | 211515235 | U | 9/2020 |
| CN | 211538600 | U | 9/2020 |
| CN | 111830293 | A | 10/2020 |
| CN | 111830354 | A | 10/2020 |
| CN | 111860890 | A | 10/2020 |
| CN | 111860891 | A | 10/2020 |
| CN | 211630227 | U | 10/2020 |
| CN | 306113050 | S | 10/2020 |
| CN | 306113051 | S | 10/2020 |
| CN | 306113052 | S | 10/2020 |
| CN | 212023984 | U | 11/2020 |
| CN | 212031269 | U | 11/2020 |
| CN | 306164092 | S | 11/2020 |
| CN | 306164093 | S | 11/2020 |
| CN | 306164094 | S | 11/2020 |
| CN | 306164095 | S | 11/2020 |
| CN | 112098443 | A | 12/2020 |
| CN | 212084259 | U | 12/2020 |
| CN | 212268703 | U | 1/2021 |
| CN | 212314534 | U | 1/2021 |
| CN | 212322247 | U | 1/2021 |
| CN | 212364464 | | 1/2021 |
| CN | 306272538 | S | 1/2021 |
| CN | 306283626 | S | 1/2021 |
| CN | 112348761 | A | 2/2021 |
| CN | 112348808 | A | 2/2021 |
| CN | 112393880 | A | 2/2021 |
| CN | 112395118 | A | 2/2021 |
| CN | 212460662 | | 2/2021 |
| CN | 212586854 | U | 2/2021 |
| CN | 212597202 | U | 2/2021 |
| CN | 306323627 | S | 2/2021 |
| CN | 112433902 | A | 3/2021 |
| CN | 112452935 | A | 3/2021 |
| CN | 112455988 | A | 3/2021 |
| CN | 112456100 | A | 3/2021 |
| CN | 112565505 | A | 3/2021 |
| CN | 212677296 | U | 3/2021 |
| CN | 212681731 | U | 3/2021 |
| CN | 111314537 | | 4/2021 |
| CN | 112613622 | A | 4/2021 |
| CN | 112613914 | A | 4/2021 |
| CN | 112614117 | A | 4/2021 |
| CN | 112614269 | A | 4/2021 |
| CN | 112633194 | A | 4/2021 |
| CN | 112634245 | A | 4/2021 |
| CN | 112634288 | A | 4/2021 |
| CN | 112634301 | A | 4/2021 |
| CN | 112672145 | A | 4/2021 |
| CN | 112735081 | A | 4/2021 |
| CN | 213001252 | U | 4/2021 |
| CN | 213004872 | U | 4/2021 |
| CN | 112777290 | A | 5/2021 |
| CN | 112783702 | A | 5/2021 |
| CN | 112816490 | A | 5/2021 |
| CN | 112822740 | A | 5/2021 |
| CN | 112828842 | A | 5/2021 |
| CN | 112837076 | A | 5/2021 |
| CN | 112837102 | A | 5/2021 |
| CN | 213149008 | U | 5/2021 |
| CN | 213301455 | U | 5/2021 |
| CN | 213301535 | U | 5/2021 |
| CN | 213305483 | U | 5/2021 |
| CN | 112907182 | A | 6/2021 |
| CN | 112991614 | A | 6/2021 |
| CN | 113032198 | A | 6/2021 |
| CN | 113034481 | A | 6/2021 |
| CN | 113034493 | A | 6/2021 |
| CN | 113034529 | A | 6/2021 |
| CN | 113034530 | A | 6/2021 |
| CN | 113034531 | A | 6/2021 |
| CN | 113038012 | A | 6/2021 |
| CN | 113052798 | A | 6/2021 |
| CN | 113110806 | A | 7/2021 |
| CN | 113114794 | A | 7/2021 |
| CN | 113132523 | A | 7/2021 |
| CN | 113160494 | A | 7/2021 |
| CN | 113190215 | A | 7/2021 |
| CN | 113191789 | A | 7/2021 |
| CN | 213765490 | U | 7/2021 |
| CN | 213796595 | U | 7/2021 |
| CN | 213807304 | U | 7/2021 |
| CN | 306700330 | S | 7/2021 |
| CN | 113220647 | A | 8/2021 |
| CN | 113220648 | A | 8/2021 |
| CN | 113237473 | A | 8/2021 |
| CN | 113238680 | A | 8/2021 |
| CN | 113238905 | A | 8/2021 |
| CN | 113252678 | A | 8/2021 |
| CN | 113254292 | A | 8/2021 |
| CN | 113254293 | A | 8/2021 |
| CN | 113254294 | A | 8/2021 |
| CN | 113268162 | A | 8/2021 |
| CN | 113298078 | A | 8/2021 |
| CN | 113301202 | A | 8/2021 |
| CN | 113329222 | A | 8/2021 |
| CN | 213917879 | U | 8/2021 |
| CN | 213933659 | U | 8/2021 |
| CN | 306744667 | S | 8/2021 |
| CN | 306744668 | S | 8/2021 |
| CN | 306786433 | S | 8/2021 |
| CN | 306786434 | S | 8/2021 |
| CN | 113422860 | A | 9/2021 |
| CN | 214160736 | U | 9/2021 |
| CN | 214162705 | U | 9/2021 |
| CN | 214427985 | U | 10/2021 |
| CN | 113591066 | A | 11/2021 |
| CN | 113591963 | A | 11/2021 |
| CN | 113808322 | A | 12/2021 |
| CN | 215246545 | U | 12/2021 |
| CN | 215247165 | U | 12/2021 |
| CN | 215247245 | U | 12/2021 |
| CN | 215247426 | U | 12/2021 |
| CN | 215262785 | U | 12/2021 |
| CN | 215262787 | U | 12/2021 |
| CN | 215266884 | U | 12/2021 |
| CN | 215266954 | U | 12/2021 |
| CN | 215325354 | U | 12/2021 |
| CN | 113887609 | A | 1/2022 |
| CN | 113901996 | A | 1/2022 |
| CN | 113947445 | A | 1/2022 |
| CN | 215555043 | U | 1/2022 |
| CN | 215556081 | U | 1/2022 |
| CN | 215575427 | U | 1/2022 |

(56) References Cited

FOREIGN PATENT DOCUMENTS

| | | | |
|---|---|---|---|
| CN | 215576764 | U | 1/2022 |
| CN | 215576765 | U | 1/2022 |
| CN | 114038114 | A | 2/2022 |
| CN | 114063364 | A | 2/2022 |
| CN | 114066367 | A | 2/2022 |
| CN | 215703219 | U | 2/2022 |
| CN | 215708961 | U | 2/2022 |
| CN | 114155260 | A | 3/2022 |
| CN | 114170419 | A | 3/2022 |
| CN | 114170435 | A | 3/2022 |
| CN | 114186702 | A | 3/2022 |
| CN | 114219105 | A | 3/2022 |
| CN | 114281627 | A | 4/2022 |
| CN | 114298204 | A | 4/2022 |
| CN | 114298345 | A | 4/2022 |
| CN | 114299293 | A | 4/2022 |
| CN | 114299657 | A | 4/2022 |
| CN | 114328051 | A | 4/2022 |
| CN | 114330533 | A | 4/2022 |
| CN | 114330534 | A | 4/2022 |
| CN | 114332016 | A | 4/2022 |
| CN | 114371417 | A | 4/2022 |
| CN | 114374795 | A | 4/2022 |
| CN | 114386629 | A | 4/2022 |
| CN | 114494856 | A | 5/2022 |
| CN | 216612155 | U | 5/2022 |
| CN | 216751854 | U | 6/2022 |
| CN | 216751855 | U | 6/2022 |
| CN | 217133280 | U | 8/2022 |
| CN | 217133770 | U | 8/2022 |
| CN | 217550626 | U | 10/2022 |
| CN | 217589621 | U | 10/2022 |
| CN | 307592104 | S | 10/2022 |
| CN | 217820056 | U | 11/2022 |
| CN | 113870223 | A | 12/2022 |
| CN | 115512480 | A | 12/2022 |
| CN | 218260123 | U | 1/2023 |
| CN | 218313632 | U | 1/2023 |
| CN | 218329991 | U | 1/2023 |
| CN | 218332714 | U | 1/2023 |
| CN | 218336838 | U | 1/2023 |
| CN | 112672145 | B | 2/2023 |
| CN | 218497120 | U | 2/2023 |
| DE | 10031532 | | 10/2001 |
| EP | 0116970 | | 12/1991 |
| EP | 0654003 | | 5/1995 |
| EP | 1168253 | | 1/2002 |
| EP | 1270905 | | 1/2003 |
| EP | 1703436 | | 9/2006 |
| EP | 2701450 | | 2/2014 |
| EP | 3206194 | A1 | 8/2017 |
| EP | 2428072 | | 1/2018 |
| FR | 3047833 | B1 | 3/2018 |
| GB | 2167553 | | 5/1986 |
| GB | 202012494 | | 9/2020 |
| GB | 202209941 | | 7/2022 |
| GR | 20210100761 | | 7/2022 |
| HK | 30014296 | A | 8/2020 |
| JP | H07112801 | | 5/1995 |
| JP | H7334583 | | 12/1995 |
| JP | H11242005 | | 9/1999 |
| JP | H11334851 | | 12/1999 |
| JP | 2000121564 | | 4/2000 |
| JP | 2000171409 | A | 6/2000 |
| JP | 2000180371 | | 6/2000 |
| JP | 3123095 | | 1/2001 |
| JP | 2001312766 | | 11/2001 |
| JP | 2002019147 | | 1/2002 |
| JP | 2002183286 | | 6/2002 |
| JP | 2002259528 | | 9/2002 |
| JP | 2002302252 | | 10/2002 |
| JP | 2002324264 | | 11/2002 |
| JP | 2002358354 | | 12/2002 |
| JP | 2003016179 | | 1/2003 |
| JP | 2003139516 | | 5/2003 |
| JP | 2003230229 | | 8/2003 |
| JP | 2003242243 | | 8/2003 |
| JP | 2003264007 | | 9/2003 |
| JP | 2003267509 | | 9/2003 |
| JP | 2004021569 | | 1/2004 |
| JP | 2004191496 | | 7/2004 |
| JP | 2004226129 | | 8/2004 |
| JP | 2004226328 | | 8/2004 |
| JP | 2004239850 | | 8/2004 |
| JP | 2004288143 | | 10/2004 |
| JP | 2004303102 | | 10/2004 |
| JP | 2004341681 | | 12/2004 |
| JP | 2005063203 | | 3/2005 |
| JP | 2005122059 | | 5/2005 |
| JP | 2005308476 | | 11/2005 |
| JP | 2006127308 | | 5/2006 |
| JP | 2006195814 | | 7/2006 |
| JP | 2006203451 | | 8/2006 |
| JP | 2006227764 | | 8/2006 |
| JP | 2006260246 | | 9/2006 |
| JP | 2007141266 | | 6/2007 |
| JP | 2007155455 | | 6/2007 |
| JP | 2007179516 | | 7/2007 |
| JP | 2007265340 | | 10/2007 |
| JP | 2008045959 | | 2/2008 |
| JP | 2008059403 | | 3/2008 |
| JP | 2008522299 | | 6/2008 |
| JP | 2008293391 | | 12/2008 |
| JP | 2007086725 | | 4/2009 |
| JP | 2009175035 | | 8/2009 |
| JP | 2009245058 | | 10/2009 |
| JP | 2009250971 | | 10/2009 |
| JP | 2009290852 | | 12/2009 |
| JP | 2010177720 | | 8/2010 |
| JP | 2010276896 | | 12/2010 |
| JP | 2011518387 | | 6/2011 |
| JP | 2012032370 | | 2/2012 |
| JP | 2012504832 | | 2/2012 |
| JP | 2012058932 | | 3/2012 |
| JP | 2013033361 | | 2/2013 |
| JP | 2013037441 | | 2/2013 |
| JP | 2014513829 | | 6/2014 |
| JP | 2015505999 | | 2/2015 |
| JP | 2016504900 | | 2/2016 |
| JP | 6050922 | | 12/2016 |
| JP | 2017040957 | | 2/2017 |
| JP | 2017093938 | | 6/2017 |
| JP | 2017142781 | | 8/2017 |
| JP | 2017173902 | | 9/2017 |
| JP | 2017201559 | | 11/2017 |
| JP | 6266065 | | 3/2018 |
| JP | 2018520453 | | 7/2018 |
| JP | 2019012474 | | 1/2019 |
| JP | 2019513262 | | 5/2019 |
| JP | 3223233 | U | 9/2019 |
| JP | 2020526847 | | 8/2020 |
| JP | 2021530786 | | 11/2021 |
| JP | 2022539909 | A | 9/2022 |
| JP | 2022539910 | A | 9/2022 |
| JP | 2022539912 | A | 9/2022 |
| JP | 2022545336 | A | 9/2022 |
| KR | 20000064168 | | 11/2000 |
| KR | 20010074614 | | 8/2001 |
| KR | 20010097567 | | 11/2001 |
| KR | 100581234 | | 5/2006 |
| KR | 100766860 | | 10/2007 |
| KR | 20130085255 | | 7/2013 |
| KR | 101326680 | | 11/2013 |
| KR | 101329949 | | 11/2013 |
| KR | 20140037543 | | 3/2014 |
| KR | 101599251 | | 3/2016 |
| KR | 20180088062 | | 8/2018 |
| KR | 20180088063 | | 8/2018 |
| KR | 1020180086617 | | 8/2018 |
| KR | 20180117278 | | 10/2018 |
| KR | 20190026131 | | 3/2019 |
| KR | 20190107593 | | 9/2019 |
| KR | 20190107595 | | 9/2019 |
| KR | 20190107596 | | 9/2019 |

(56) References Cited

FOREIGN PATENT DOCUMENTS

| | | |
|---|---|---|
| KR | 1020190107594 | 9/2019 |
| KR | 1020200115308 | 10/2020 |
| KR | 20210020717 | 2/2021 |
| KR | 1020210059148 | 5/2021 |
| KR | 1020210107515 | 9/2021 |
| WO | 8503790 | 8/1985 |
| WO | 2001015096 | 3/2001 |
| WO | 2002005176 | 1/2002 |
| WO | 0221090 | 3/2002 |
| WO | 2002025613 | 3/2002 |
| WO | 2002039357 | 5/2002 |
| WO | 2003012717 | 2/2003 |
| WO | 2003014994 | 2/2003 |
| WO | 2004021114 | 3/2004 |
| WO | 2004114490 | 12/2004 |
| WO | 2005008566 | 1/2005 |
| WO | 2005054877 | 6/2005 |
| WO | 2005101346 | 10/2005 |
| WO | 2006021825 | 3/2006 |
| WO | 2006058601 | 6/2006 |
| WO | 2006080851 | 8/2006 |
| WO | 2007066166 | 6/2007 |
| WO | 2009089607 | 7/2009 |
| WO | 2009128173 | 10/2009 |
| WO | 2009128176 | 10/2009 |
| WO | 2009129526 | 10/2009 |
| WO | 2010040116 | 4/2010 |
| WO | 2010128267 | 11/2010 |
| WO | 2010128315 | 11/2010 |
| WO | 2011131016 | 10/2011 |
| WO | 2012073126 | 6/2012 |
| WO | 2013002748 | 1/2013 |
| WO | 2013074819 | 5/2013 |
| WO | 2014033350 | 3/2014 |
| WO | 2014075055 | 5/2014 |
| WO | 2014141180 | 9/2014 |
| WO | 2015022409 | 2/2015 |
| WO | 2015093676 | 6/2015 |
| WO | 2015108864 | 7/2015 |
| WO | 2015146026 | 10/2015 |
| WO | 2016181224 | 11/2016 |
| WO | 2015196175 | 12/2016 |
| WO | 2016196175 | 12/2016 |
| WO | 2017034441 | 3/2017 |
| WO | 2017081527 | 5/2017 |
| WO | 2017156046 | 9/2017 |
| WO | 2018003026 | 1/2018 |
| WO | 2018124669 | 7/2018 |
| WO | 2018133068 | 7/2018 |
| WO | 2018146374 | 8/2018 |
| WO | 2019012305 | 1/2019 |
| WO | 2019012505 | 1/2019 |
| WO | 2019012506 | 1/2019 |
| WO | 2019212513 | 11/2019 |
| WO | 2019212515 | 11/2019 |
| WO | 2019008943 | 4/2020 |
| WO | 2020082991 | 4/2020 |
| WO | 2020204503 | 10/2020 |
| WO | 2021019286 | 2/2021 |
| WO | 2021082918 | 5/2021 |
| WO | 2021082919 | 5/2021 |
| WO | 2021082920 | 5/2021 |
| WO | 2021082921 | 5/2021 |
| WO | 2021082922 | 5/2021 |
| WO | 2021082923 | 5/2021 |
| WO | 2021142009 | 7/2021 |
| WO | 2021147385 | 7/2021 |
| WO | 2021147386 | 7/2021 |
| WO | 2021147387 | 7/2021 |
| WO | 2021147388 | 7/2021 |
| WO | 2021172803 | 9/2021 |
| WO | 2022034298 | 2/2022 |
| WO | 2022090999 | 5/2022 |
| WO | 2022091000 | 5/2022 |
| WO | 2023073248 | 5/2023 |

OTHER PUBLICATIONS

3GPP Organizational Partners, "3rd Generation Partnership Project; Technical Specification Group Terminals; AT command set for GSM Mobile Equipment (ME)," Global System for Mobile Communications, 1998, 124 pages.

Aftermarket Cellular Accessories, "Cellular Phone Model Identification," retrieved from http://web/archive.org/web/20060328064957/http://aftermarketcellular.com/ic/identification.html on Mar. 16, 2014, published Mar. 28, 2006, 3 pages.

Altec Lansing User's Guide 2007, 8 pages.

Anderle, Megan, "Verizon's new app aims to make phone recycling easy and profitable", Internet Article, May 1, 2014, XP093222792, retrieved from the Internet: URL: https://www.theguardian.com/sustainable-business/verizon-mobile-phone-recycling-cell-ecoatm.

Bhule et al., "Environmental and economic trade-offs in consumer electronic products recycling: a case study of cell phones and computers," IEEE International Symposium on Electronics and the Environment, Conference Record, 2004.

Bournique, D.: "Mobile Karma Shuts Down as iCloud and Blacklists Challenge Used Phone Buyers", Prepaid Phone News, Jul. 23, 2014 (Jul. 23, 2014), XP055229747, Retrieved from the Internet <URL:http://www.prepaidphonenews.com/2014/07/mobile-karma-shuts-down-as-icloud-and.html>; accessed Nov. 27, 2017; 2 pages.

Business Wire, "The World's First Office Photography Machine" at CES 2008 Launched by Ortery Technologies, Jan. 7, 2008, 3 pages.

CNET, "Tackling LCD "burn ins", and dead/stick Pixels", published Sep. 2, 2009, retrieved from http://www.cnet.com/news/tackling-lcd-burn-ins-and-deadstuck-pixels/.

Cybercom Group Europe AB, "OMSI Forum," Downloads, 2005, 2 pages.

Cybercom Group Europe AB, "OMSI Provides Easy Service and Maintenance for Mobile Phones," Press Release, 2005, 1 page.

Cybercom Group Europe AB, "The OMSI 2.0 Interface Supports," OMSI 2.0 Description, available at least before Oct. 2008, 1 page.

Cybercom Group, "Leading Telecom Organisations Address Device Management Issues," Press Release, 2007, 1 page.

Evgenii Masunov, Mar. 25, 2010, http://www.appleinsider.ru/news/ipone-obladaet-luchshim-tachskrinom-provereno_robotom.html, 4 pages.

Foster et al., "Automated Visual Inspection: A Tutorial" 1990 Computers Ind. Eng. vol. 18(4): 493-504.

Geekanoids, You Tube Video, "Apple iphone 3GS Unboxing and Review", uploaded on Jun. 19, 2009, retrieved from http://www.youtube.com/watch?v=GCEi9QAeDqk on Sep. 2, 2009.

Geyer et al. "The economics of cell phone reuse and recycling," The International Journal of Advanced Manufacturing Technology, 47(5): 515-525, 2010.

Graffia et al., "Retail Station for E-Device Identification, Assessment, and Trade-In", Jun. 6, 2014 (Drawings and Specification) (Year: 2014).

Grose, Thomas; "New Life for Old Phones," ASE Prism 22.3 (2012): 18.

GSM Arena Glossary, "LCD (Liquid Crystal Display", retrieved from http://www.gsmarena.com/glossary.php3?term=lcd on Apr. 28, 2016, 1 page.

Hassan, et al.; "A Novel Cascaded Deep Neural Network for Analyzing Smart Phone Data for Indoor Localization", Dec. 2019, vol. 101, pp. 760-769, Future Generation Computer Systems.

Hazelwood, et al.; "Life Extension of Electronic Products: A Case Study of Smartphones", Sep. 20, 2021, IEEE Access, vol. 9, pp. 144726-144739, DOI: 10.1109/ACCESS.2021.3121733.

International Numbering Plan. Retrieved on Apr. 5, 2013 at <http://web.archive.org/web/20070322214125/http://www.numberingplans.com/?page+analysis&sub+imeinr>, 2 pages.

International Preliminary Report on Patentability mailed Aug. 6, 2024 in International Application No. PCT/US23/62371.

International Search Report and Written Opinion mailed Jan. 24, 2022 in International Application No. PCT/US2021/071200, 19 pages.

(56) References Cited

OTHER PUBLICATIONS

International Search Report and Written Opinion mailed Jul. 27, 2023 in International Application No. PCT/US2023/062371, 19 pages.
Investopedia: What's the difference between weighted average accounting and FIFO/LIFO accounting methods? Aug. 19, 2010. Accessed via archive.org [https://web.archive.org/web/20100819200402/http://www.investopedia.com/ask/answers/09/weighted-average-fifo-lifo-accounting.asp].
Invitation to Pay Additional Fees & Partial Search Report mailed Jun. 6, 2023 in International Application No. PCT/US2023/062371, 14 pages.
Invitation to Pay Additional Fees & Partial Search Report mailed Nov. 29, 2021 in International Application No. PCT/US2021/071200, 11 pages.
Kanter, James Max, "Color Crack:Identifying Cracks in Glass," dated Dec. 9, 2014; retrieved from the internet http://www.jmaxkanter.com/static/papers/color_crack.pdf on Sep. 22, 2017.
Kuriyan, et al.: "Review of Research on Rural PC Kiosks," Apr. 14, 2007, 22 pages, retrieved at http://research.microsoft.com/research/tem/kiosks.
Lambert, Emily, "Use It Up, Wear It Out", Forbes 175.5 (2005): 77-78. Business Source Complete. Web. Jan. 6, 2015, 3 pages.
Littleton Partners with Donations Ink (Jan. 19, 2006) US Fed News Service, Including US State News. Web. Jan. 6, 2015, 1 page.
MobileGazette.com, "2006 in Review: The Good, The Bad and The Ugly", published Dec. 2006, retrieved from http://www.mobilegazette.com/2006-review-06x12x22.htm on Nov. 11, 2015.
Non-Final Office Action mailed Jul. 14, 2023 in U.S. Appl. No. 17/445,158, 21 pages.
Non-Final Office Action response filed Oct. 13, 2023 in U.S. Appl. No. 17/445,158, 17 pages.
Notice of Allowance mailed Dec. 13, 2023 in U.S. Appl. No. 17/445,158, 9 pages.
Novotny, et al.; "Smart City Concept, Applications and Services," Aug. 26, 2014, Journal of Telecommunications System & Management, vol. 3, Issue 2, pp. 1-8, DOI: 10.4172/2167-0919.1000117.
Oliveira, et al., "Automatic crack detection on road imagery using anisotropic diffusion and region linkage," 18th European Signal Processing Conference (EUSIPCO-2010), Aug. 23, 2010, pp. 274-278.
Park, et. al., "Ambiguous Surface Defect Image Classification of AMOLED Displays in Smartphones", Jan. 26, 2016, IEEE Transactions on Industrial Informatics, vol. 12, Issue 2, pp. 597-607, DOI: 10.1109/TII.2016.2522191.
PC World, "Wipe Your Cell Phone's Memory Before Giving it Away", published Jan. 2006, retrieved from http://www.washingtonpost.com/wp-dyn/content/article/2006/01/30/AR2006013001144.html on Nov. 10, 2015.
Perng et al., "A Novel Vision System for CRT Panel Auto-Inspection", Journal of the Chinese Institute of Industrial Engineers, vol. 24, No. 5, pp. 341-350 (2007).
Perng et al., "A Novel Vision System for CRT Panel Auto-Inspection", Proceedings of the 2005 IEEE International Conference on Mechatronics, Jul. 10-12, 2005, p. 4.
Phifer, "How to Use your 3G Phone as a Wireless Broad Band Modem," Computer Weekly News, 2007, 6 pages.
Rawson, Chris, "TUAW: 25 Ways to Check the Hardware on Your iphone 4", published Aug. 12, 2010, retrieved at http://www.tuaw.com/2010/08/13/hardware-test-your-iphone-4/ on Feb. 28, 2014.
Rehg et al. "Vision for a Smart Kiosk", Jun. 1997, Computer Vision and Pattern Recognition, pp. 690-696.
Restriction Requirement response filed Jun. 20, 2023 in U.S. Appl. No. 17/445,158, 14 pages.
RMS Communications Group, "RMS Communications Group Inc. opens cell phone kiosk at Ocean City Mall in Toms River, N.J.", retrieved from http://www.prweb.com/releases/2004/11/prweb177351.htm, Nov. 12, 2004, 2 pages.
Rolf Steinhilper "Remanufacturing: The Ultimate Form of Recycling", Fraunhofer IRBVerlag, 1998, parts 1-3, http://www.reman.org/Publications_main.htm.
Romano "Recycling a Phone at EcoATM is an Easy Route to Feeling Green," Xconomy, Jan. 22, 2014, pp. 1-3.
Rosebrock, "How to Build a Kick-Ass Mobile Document Scanner in Just 5 Minutes" PyImage Search, Sep. 2014, 19 pages.
Second Notice of Allowance mailed Mar. 26, 2024 in U.S. Appl. No. 17/445,158, 6 pages.
Shotton et al., "Efficiently Combining Contour and Texture Cues for Object Recognition", Proceedings of the British Machine Vision Conference 2008, (Sep. 1, 2008), p. 7.1-7.10 * abstract *.
Sheu, Jiuh-Biing et al. "Extended consumer responsibility: Syncretic value-oriented pricing strategies for trade-in-for-upgrade programs" Transportation Research Part E: Logistics and Transportation Review 122 (2019) 350-367.
SimplySellular, "Get Cash for your Old Cell Phone", published Apr. 2, 2010, retrieved from http://simplysellular.com/conditions.php on Jan. 6, 2015, 2 pages.
Sony Ericsson Mobile Communications AB, "P800/P802," White Paper, 2003, 128 pages.
Sony Ericsson Mobile Communications AB, "T68i/T68ie," White Paper, 2002, 71 pages.
TecAce Software: "Android Smartphone Testing App—Movaluate—TecAce Software | PRLog" Internet Article, May 6, 2013, XP093222769, retrieved from the Internet: URL: https://www.prlog.org/12132313-android-smartphone-testing-app-movaluate.html.
TecAce Software: "Your phone appraisal—Movaluate—Android Apps on Google Play", Android Apps on Google Play, Aug. 12, 2013 (Aug. 12, 2013), XP055230264, Retrieved from the Internet <URL:https://play.google.com/store/apps/details?id=com.tecace.android.app.movaluate&hl=en>; accessed Nov. 27, 2017; 2 pages.
Tech Spurt; Sandisk iXpand Review, Wireless Charger & Auto Photo Backup!, Aug. 21, 2019, 1 page, retrieved at https://www.youtube.com/watch?v=zemKQ6xULww.
Trading devices for dollars, The Economist (US) 405.8813:8 (US), Economist Intelligence Unit N.A. Incorporated, Dec. 1, 2012.
Turner, "5 MP3 Players for Pumping Up Your Workouts," Mashable.com, Nov. 4, 2010, available online at https://mashable.com/2010/11/04/mp3-players-for-sports/ (Year: 2010).
Watson; "Review: SanDisk iXpand Wireless Charger" Sep. 15, 2019, 4 pages retrieved at https://www.whatmobile.net/Reviews/article/review-sandisk-ixpand-wireless-charger.
Waugh, "Phone recycling machine lets you drop in old mobiles—and spits out cash instantly," Daily Mail Online, Jan. 13, 2012, p. 1-2.
Wikipedia, "Machine Vision" Sep. 19, 2009, 6 pages.
Wiley Encyclopedia of Computer Science and Technology, Nov. 2008, 2362 pages, Wiley-interscience, ISBN-10: 0471383937, ISBN-13: 978-0471383932.
Wilson, Doug, "Liquid Crystal Display (LCD) Inspection System", National Instruments Case Study, available May 10, 2009, retrieved from http://sine.ni.com/cs/app/cod/p/id/cs-345 on Jan. 5, 2015, 2 pages.
Wu, "Overview of Wireless Power and Data Communication" WPC/QI Developers Forum, Oct. 29, 2016, 21 pages.
Yahoo Answers, "What is a Clean ESN?" published Jun. 23, 2009, retrieved from http://web.archive.org/web/20090623215042/http://answers.yahoo.com/question/inde,8020US?qid=20080318061012AANFRco on Apr. 3, 2014.
Zhang, Yiyang, "The design of glass crack detection system based on image preprocessing technology," 2014 IEEE 7th Joint International Information Technology and Artificial Intelligence Conference, IEEE, Dec. 20, 2014; pp. 39-42.
Huang et al., "Construction of an Automatic Inspection system using capability of identifying Color Characteristics of Products," 2008, pp. 1-6 (Year 2006).
Nithi et al., "Smart Power Management for Mobile Handsets".
Restriction Requirement mailed Apr. 18, 2023 in U.S. Appl. No. 17/445,158, 6 pages.
Shi, "The LOB Recreation Model: Predicting the Limit Order Book from TAQ History Using an Ordinary Differential Equation Recurrent Neural Network" 548-556. The Thirty-Fifth AAAI Conference

(56) References Cited

OTHER PUBLICATIONS on Artificial Intelligence. 2021; <DOI: 10.48550/arXiv.2103.01670> abstract; p. 551, 2nd column, 1st paragraph; p. 552, 1st column, 1st paragraph; fig. 3.
Tuzun, "Usability testing of a 3D touch screen kiosk system for way-finding," Computers in Human Behavior vol. 61, Aug. 2016, pp. 73-79.

* cited by examiner

APPARATUSES, SYSTEMS, AND METHODS FOR TURNING OVER ELECTRONIC DEVICES, AND ASSOCIATED KIOSKS FOR USE WITH SAME

CROSS-REFERENCE TO RELATED APPLICATIONS

This application claims the benefit of U.S. Provisional Patent Application No. 63/267,911, filed Feb. 11, 2022, the entirety of which is incorporated by reference herein.

TECHNICAL FIELD

The present disclosure is generally related to apparatuses, systems, and methods for turning over electronic devices, and to consumer operated kiosks for purchasing mobile phones and other mobile electronic devices from users.

BACKGROUND

There are more mobile phones in use now than there are people on the planet. The rapid growth of mobile phones is due in part to the rapid pace at which they evolve. Because of the rapid pace of development, a relatively high percentage of mobile phones are replaced every year as consumers continually upgrade to obtain the latest features or a better operating plan. Millions of other outdated or broken mobile phones are simply tossed into junk drawers or otherwise kept until a suitable disposal solution arises.

Although many mobile phone retailers and cell carrier stores now offer mobile phone trade-in or buyback programs, many old phones still end up in landfills or are improperly disassembled and disposed of in developing countries. Unfortunately, mobile phones and similar devices typically contain substances that can be harmful to the environment, such as arsenic, lithium, cadmium, copper, lead, mercury and zinc. If not properly disposed of, these toxic substances can seep into groundwater from decomposing landfills and contaminate the soil with potentially harmful consequences for humans and the environment.

As an alternative to retailer trade-in or buyback programs, consumers can recycle and/or sell their used mobile phones using self-service kiosks located in malls, retail stores, or other publicly accessible areas. Such kiosks are operated by ecoATM, LLC, the assignee of the present application.

DETAILED DESCRIPTION

Figure 2A:
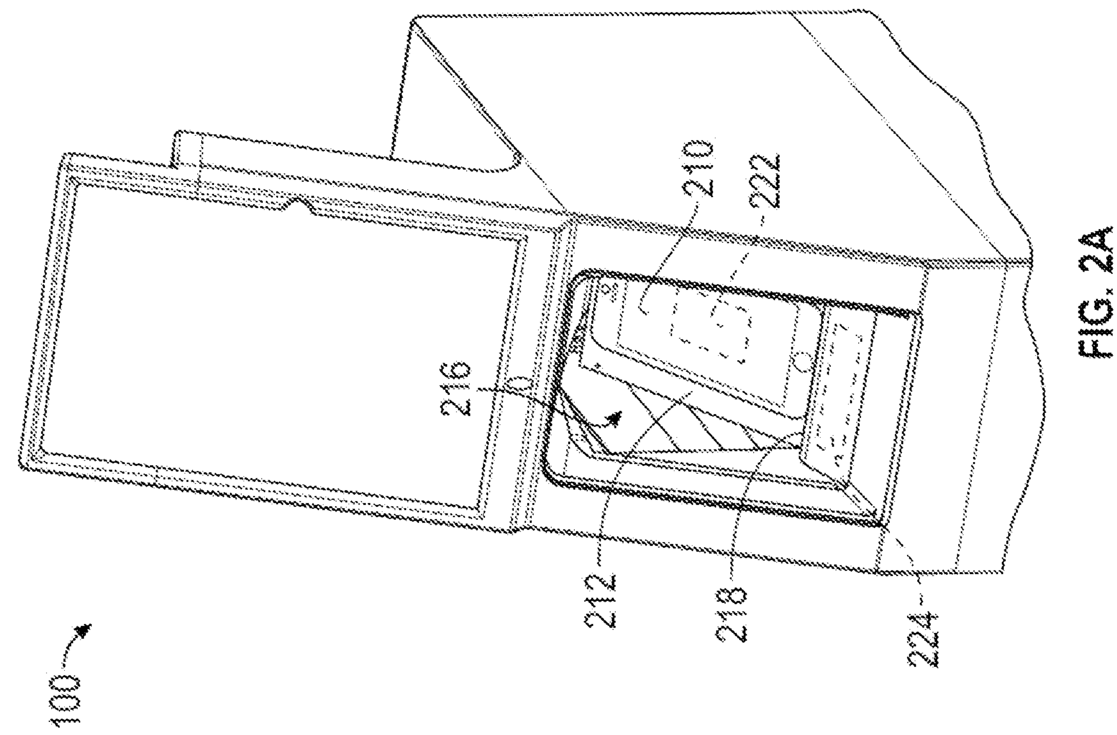
FIGS. 2A-2C are a series of enlarged isometric views illustrating structures and functions associated with an inspection area of the kiosk of FIG. 1, configured in accordance with embodiments of the present technology.

The following disclosure describes various embodiments of apparatuses, systems, and methods for turning mobile phones and/or other electronic devices over in, for example, an inspection area of a consumer operated kiosk that purchases such devices from users. As described in greater detail below, such an apparatus (which can be referred to herein as a "flipping apparatus," a "flipping mechanism," or by similar terms) can enable the kiosk to visually inspect and evaluate one side (e.g., the front side) of a mobile phone with one or more cameras positioned above the phone, and then use the same one or more cameras to visually inspect and evaluate another side (e.g., the back side) of the mobile phone after it has been flipped. In contrast to kiosks that include a flipping apparatus as disclosed herein, some other mobile phone recycling kiosks visually inspect mobile phones placed on a transparent plate positioned between at least one camera positioned above the transparent plate and at least one camera positioned below the transparent plate. The upper camera visually inspects the front side of the mobile phone and the lower camera visually inspects the back side of the mobile phone through the transparent plate. Accordingly, one benefit of some embodiments of the kiosks disclosed herein is that the mobile device flipping apparatus eliminates the need to position cameras both above and below a mobile device for visual inspection. Eliminating the lower camera and associated hardware can reduce the size and cost of the kiosk.

Certain details are set forth in the following description and in FIGS. 1-13C to provide a thorough understanding of various embodiments of the present technology. In other instances, well-known structures, materials, operations and/or systems often associated with smartphones and other handheld mobile electronic devices, consumer electronic devices, computer hardware, software, and network systems, etc. are not shown or described in detail in the following disclosure to avoid unnecessarily obscuring the description of the various embodiments of the present technology. Those of ordinary skill in the art will recognize, however, that the present technology can be practiced without one or more of the details set forth herein, or with other structures, methods, components, and so forth.

The terminology used below is to be interpreted in its broadest reasonable manner, even though it is being used in conjunction with a detailed description of certain examples of embodiments of the technology. Indeed, certain terms may even be emphasized below; however, any terminology intended to be interpreted in any restricted manner will be overtly and specifically defined as such in this Detailed Description section.

The accompanying Figures depict embodiments of the present technology and are not intended to be limiting of its scope. Component details may be abstracted in the Figures to exclude details such as position of components and certain precise connections between such components when such details are unnecessary for a complete understanding of how to make and use the present technology. Many of the details, dimensions, angles and other features shown in the Figures are merely illustrative of particular embodiments of the present technology. Accordingly, other embodiments can have other details, dimensions, angles and features without departing from the spirit or scope of the present disclosure. In addition, those of ordinary skill in the art will appreciate that further embodiments of the present technology can be practiced without several of the details described below. In the Figures, identical reference numbers identify elements that are identical or at least generally similar in structure and/or function. To facilitate the discussion of any particular element, the most significant digit or digits of any reference number refers to the Figure in which that element is first introduced. For example, element 110 is first introduced and discussed with reference to FIG. 1.

Figure 1:
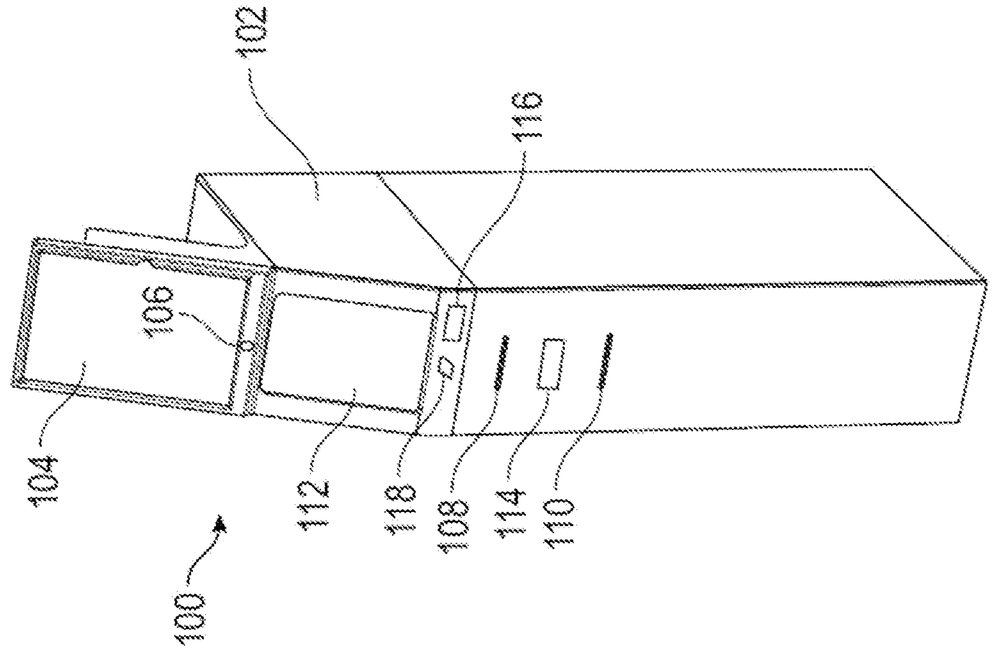
FIG. 1 is an isometric view of an example of a consumer operated kiosk that can include a mobile device flipping apparatus configured in accordance with embodiments of the present technology.

FIG. 1 is an isometric view of a consumer operated kiosk 100 for purchasing, recycling, or otherwise processing mobile phones and other electronic devices from users, configured in accordance with embodiments of the present technology. The kiosk 100 includes an enclosure or housing 102 that supports a display screen 104 positioned above an inspection area access door 112. In some embodiments, the display screen 104 is positioned at an incline relative to a horizontal plane (e.g., at an angle of from about 10 degrees to about 89 degrees, an angle of from about 30 degrees to about 85 degrees, an angle of from about 60 degrees to about 80 degrees, or an angle of about 70 degrees relative to the horizontal plane) to facilitate viewing of the display screen 104 by a user. In other embodiments, the display screen 104 can be positioned in other suitable orientations including, for example, a vertical orientation (e.g., a 90 degree angle relative to the horizontal plane). The access door 112 can be formed from, e.g., one or more polymers (e.g., polyethylene, polycarbonate, etc.), glass, etc. that can be transparent, opaque or solid. The housing 102 can be manufactured from, for example, sheet metal, plastic panels, etc. in a conventional manner.

A plurality of user interface devices are provided on a front portion of the housing 102 for providing instructions and other information to users, and/or for receiving user inputs and other information from users. For example, in some embodiments, the display screen 104 can include a liquid crystal display (LCD) or a light emitting diode (LED) display screen, a projected display (such as a heads-up display or a head-mounted device), and so on, for providing information, prompts, etc. to users. The display screen 104 can also display graphical user interfaces (GUIs), including touch screens, for receiving user input and responses to displayed prompts. Additionally, or alternatively, the kiosk 100 can include a separate keyboard or keypad for receiving user inputs. The kiosk 100 can also include an ID reader or scanner 108 (e.g., a driver's license scanner), a fingerprint scanner 118, and one or more external cameras 106 (e.g., digital still and/or video cameras). The kiosk 100 can additionally include output devices such as a label printer (e.g., a barcode label printer) having an outlet 116, a payment (e.g., cash, voucher, coupon, etc.) dispenser having an outlet 110, and/or a receipt dispenser having an outlet 114. Although not identified in FIG. 1, the kiosk 100 can further include, e.g., a speaker and/or a headphone jack for audibly communicating information to users, one or more lights for visually communicating signals or other information to users, a handset or microphone for receiving verbal input from the user, a card reader (e.g., a credit/debit card reader, loyalty card reader, etc.), as well as other user input and/or output devices. Additionally, the kiosk 100 can also include a barcode reader (for reading, e.g., a barcode displayed on a mobile device), a QR code reader (for reading, e.g., a QR displayed on a mobile device), a package or bag dispenser (e.g., a shipping package dispenser), a digital signature pad, etc. The user interface devices described above are representative of such devices that can be included with some embodiments of the kiosk 100. Depending on the particular use case or commercial application, other embodiments of the kiosks disclosed herein can include other devices, or one or more of the above devices may be omitted. Accordingly, embodiments of the kiosk 100 are not limited to the type or arrangement of user interface devices described above.

Figure 2C:
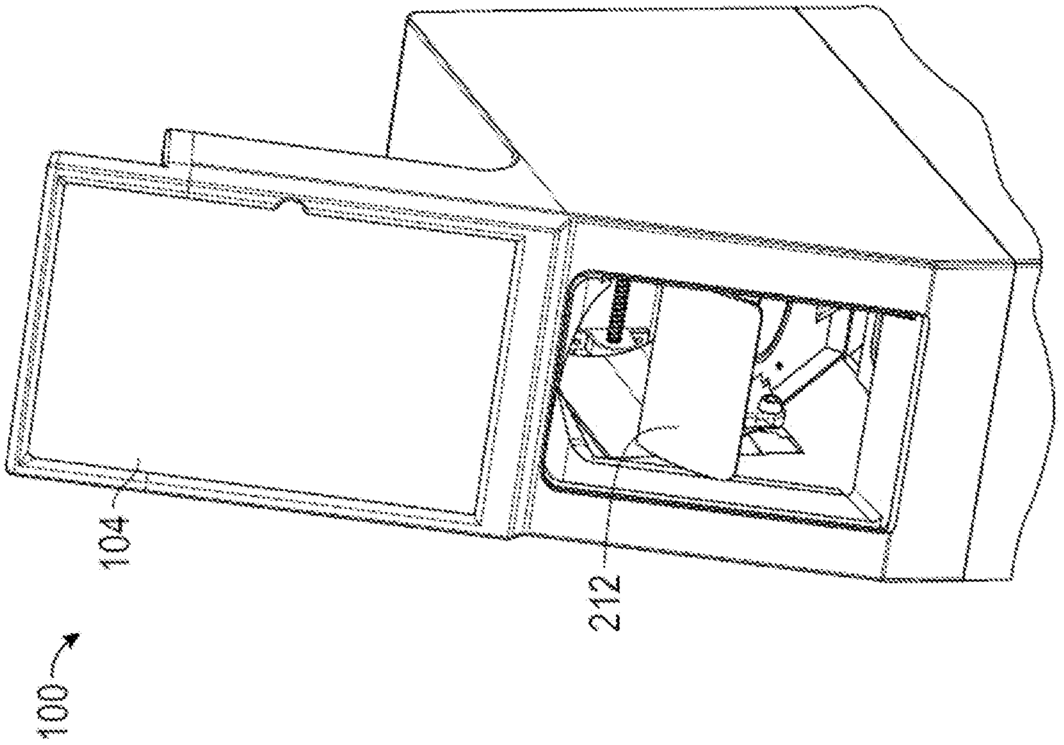
Figure 2B:
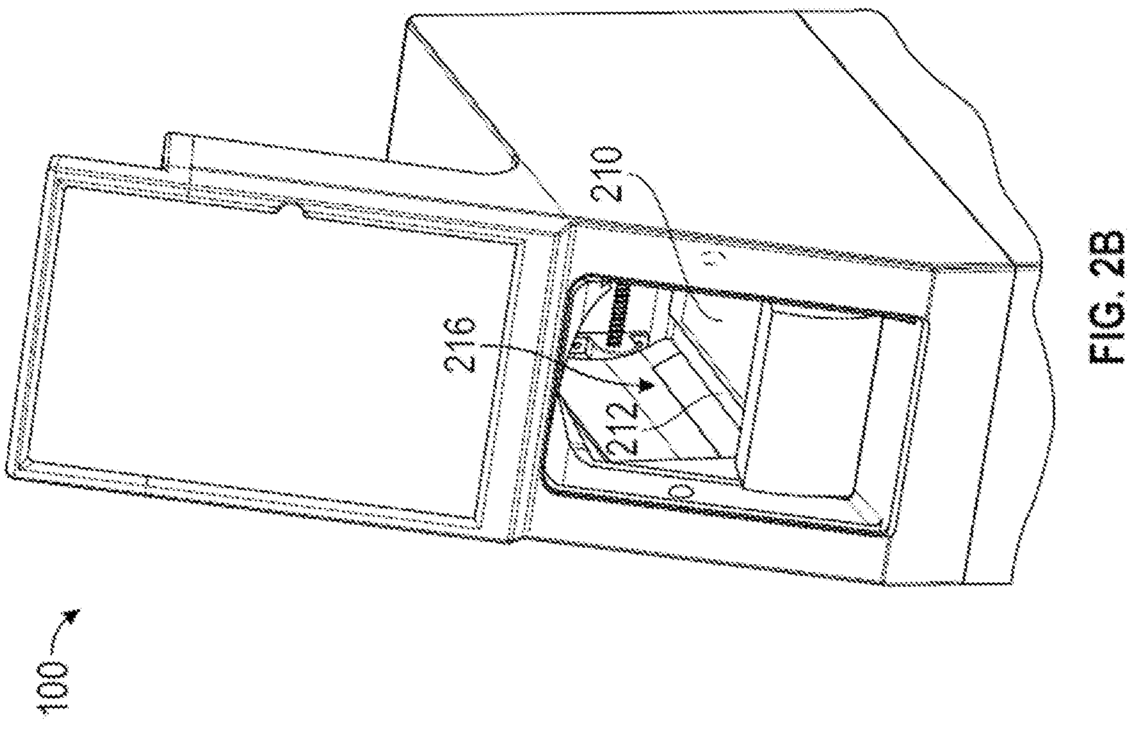

FIGS. 2A-2C are a series of enlarged isometric views illustrating structures and functions associated with an inspection area 216 of the kiosk 100. Referring first to FIG. 2A, in some embodiments, a user wishing to sell a used electronic device (e.g., a mobile phone 210) via the kiosk 100 would first approach the kiosk 100 and follow prompts displayed on the display screen 104. Such prompts, for example, may ask the user what type of phone they wish to sell, who the carrier is, etc., to which the user can respond via a touch screen associated with the display screen 104. To begin the process, the access door 112 (FIG. 1) retracts upwardly behind the display screen 104 to expose the inspection area 216. The inspection area 216 includes an inspection tray 212 that provides a support surface for supporting the mobile phone 210 and includes a shelf 218. The support surface can be a portion of the inspection tray 212 and/or include a plate, a tray, a grate, a grill, and/or another suitable support surface. In other embodiments, the support surface can be provided by one or more other supporting structures within the inspection area 216.

As can be seen in FIG. 2A, in some embodiments the inspection tray 212 is initially positioned at an incline relative to a horizontal plane (e.g., at an angle greater than 0 degrees but less than 90 degrees, an angle of from about 10 degrees to about 85 degrees, an angle of from about 20 degrees to about 70 degrees, an angle of from about 30 degrees to about 60 degrees, or an angle of about 35 degrees relative to the horizontal plane). In other embodiments, however, the inspection tray 212 can initially be positioned in other suitable orientations including, for example, a horizontal orientation (e.g., a non-inclined orientation), etc.

The user is instructed (via, e.g., prompts on the display screen 104) to position the mobile phone 210 in the inspection area on the shelf 218 and/or the support surface of the inspection tray 212, as shown in FIG. 2A. The mobile phone 210 is positioned on the inspection tray 212 so that a first (e.g., display) side of the mobile phone 210 is facing outwardly toward the user with, e.g., the mobile phone's electrical connector receptacle or port facing downwardly toward the shelf 218. In some embodiments the kiosk 100 includes an electrical connector carrier assembly 224 (shown schematically in FIG. 2A) that can automatically extend an appropriate electrical connector (not shown) outwardly from the shelf 218. By positioning the mobile phone 210 on the shelf 218 in this manner, the user can easily connect the mobile phone 210 to the electrical connector. The appropriate electrical connector can be determined by the kiosk 100 in response to, for example, user responses to questions regarding the type of phone presented on the display screen 104. After the user has properly positioned the mobile phone 210 on the inspection tray 212 and the phone is powered on, the user can interact with the touch screen of the mobile phone 210 in response to prompts displayed on the display screen 104. In other embodiments, the electrical connector carrier assembly 224 can be omitted.

In some embodiments, the kiosk 100 can also include a wireless charger 222 positioned in relatively close proximity to the mobile phone 210 when the phone is positioned on the inspection tray 212 as shown in FIG. 2A. For example, in the illustrated embodiment, the wireless charger 222 is mounted to the backside of the inspection tray 212. In operation, the wireless charger 222 can provide a quick charge to the mobile phone 210 if it is placed on the inspection tray 212 without power. Additionally, in operation the wireless charger 222 receives certain information about the mobile phone 210 (e.g., make, model, a unique 32-bit identifier associated with the phone, Qi standard, etc.) as part of the charging process. In other embodiments, the wireless charger 222 can be omitted.

Turning next to FIG. 2B, the inspection tray 212 can be configured to rotate rearwardly into a horizontal position so that the first (e.g., display) side of the mobile phone 210 is facing upwardly in the inspection area 216. Although, in some embodiments, the access door 112 (FIG. 1) would normally be closed during this stage of kiosk operation, the access door 112 is not shown in FIG. 2B (or FIG. 2C) to better illustrate operation of the inspection tray 212 and the inspection area 216. In some embodiments, with the mobile phone 210 in this position (or in the prior position illustrated in FIG. 2A), the kiosk 100 can perform an electrical inspection of the mobile phone 210 via, e.g., the electrical connector to identify the phone and further evaluate the condition of the phone, as well as specific component and operating parameters such as memory, carrier, etc. For example, in some embodiments, the kiosk 100 (e.g., a kiosk CPU or other processing device) can query the mobile phone 210 (by using, e.g., an operating system API) to obtain characteristic information about the mobile phone 210, which can include device identification, make, model, configuration, and/or a unique identifier (e.g., an IMEI number, an MEID, and/or any other suitable unique identifier). In some embodiments, the characteristic information further includes device functionality, including hardware/software configuration, charging capability, memory capacity, etc. In some embodiments, the electrical analysis includes evaluating the condition and/or functionality of the charging circuit of the electronic device. In some embodiments, the kiosk 100 performs the electrical analysis using one or more of the methods and/or systems described in detail in the patents and patent applications identified herein and incorporated herein by reference in their entireties. In some embodiments the electrical connector can be omitted and/or the kiosk 100 can be configured to perform the electrical inspection using one or more other components. For example, in some embodiments the kiosk 100 can include a wireless communication component configured to establish a communication link with the mobile phone 210 (via, e.g., WiFi, Bluetooth, etc.) so that the kiosk 100 can, e.g., wirelessly receive information from the mobile phone 210 via the wireless communication component to, e.g., perform the electrical inspection via the wireless communication component. In some embodiments, the electrical inspection of the mobile phone 210 can be omitted.

In some embodiments, the kiosk 100 can perform a visual inspection of the mobile phone 210 using one or more cameras (not shown) positioned in the inspection area 216. In some embodiments, the visual inspection includes a 3D visual analysis (of, e.g., the shape and/or size of the phone) to confirm the identification of the mobile phone 210 (e.g., make and model) and/or to evaluate or assess the condition and/or function of the mobile phone 210 and/or its various components and systems. The visual analysis can also include an inspection of the mobile phone 210 for cracks or other damage to the display screen (LCD), as well as cracks on other portions of the mobile phone. In some embodiments, the visual inspection can include performing optical character recognition (OCR) to identify printed or displayed patterns, codes, and/or text, and comparing characteristics of the patterns, codes, and/or text (e.g., layout, size, font, color, etc.) to templates to determine the presence of device identifiers such as model number, serial number, IMEI number, etc. As described in greater detail below, the kiosk 100 can include a phone flipping apparatus (not shown in FIG. 2B) operable to turn over, flip, move, or otherwise reorient the mobile phone 210 while the phone is positioned in the inspection area 216, e.g., so that the one or more cameras can be used to visually inspect a first or front surface (e.g., including the display screen) and a second or back surface of the phone. In these and other embodiments, the visual analysis can include one or more of the methods and/or systems described in detail in the patents and patent applications identified herein and incorporated herein by reference in their entireties. In some embodiments, the visual inspection can be omitted.

After the mobile phone 210 has been fully evaluated and the kiosk 100 has determined a purchase price, the purchase price can be offered to the user via the display screen 104. If the user accepts the purchase price offer (by, e.g., making a corresponding selection on a touch screen portion of the kiosk display screen 104), the access door 112 remains closed and the inspection tray 212 rotates further rearwardly as shown in FIG. 2C, so that the mobile phone 210 can slide off the inspection tray 212 and into a storage bin (not shown). (Although the access door 112 would normally be closed during this stage of operation, the access door 112 is omitted from FIG. 2C for purposes of illustrative clarity.) The kiosk 100 can then provide payment of the purchase price to the user. In some embodiments, payment can be made in the form of cash dispensed from the payment outlet 110. In other embodiments, the user can receive remuneration for the mobile phone 210 in various other useful ways. For example, the user can be paid via a redeemable cash voucher, a coupon, an e-certificate, a prepaid card, etc. that is dispensed from the kiosk 100; or via a gift code, redeemable voucher, coupon, e-certificate, etc., that is sent to the user via email, text, or other form of electronic message. Additionally, in some embodiments the user can be paid via a wired or wireless monetary (e.g., cash) deposit to an electronic account (e.g., a bank account, credit account, loyalty account, online commerce account, mobile wallet, etc.) via, e.g., PayPal, Venmo, etc., or with cryptocurrency (e.g., Bitcoin), etc.

Alternatively, if the user declines the purchase price offer, or if the user's identity cannot be verified or the kiosk 100 otherwise determines that the transaction presents a fraud risk, the transaction can be declined and the mobile phone 210 returned to the user. More specifically, the inspection tray 212 rotates forwardly to the position illustrated in FIG. 2A and the access door 112 opens so that the user can retrieve the mobile phone 210 from the kiosk 100.

FIGS. 1-2C illustrate one example embodiment of a kiosk that can utilize the various phone flipping apparatuses, systems, and methods described herein. Accordingly, it will be appreciated that the various embodiments of phone flipping apparatuses, systems, and methods described herein are not limited to use with any particular kiosk or in any other particular environment or application, unless expressly set forth herein. For example, additional embodiments of kiosk configurations which can utilize embodiments of the phone flipping apparatuses, systems, and methods described herein are shown and described below with reference to FIGS. 12A-13C. Additionally, it is expected that embodiments of the phone flipping apparatuses described herein can be used with various embodiments of any of the kiosks described in detail in the patents and patent applications identified herein and incorporated herein by reference in their entireties.

Figure 3A:
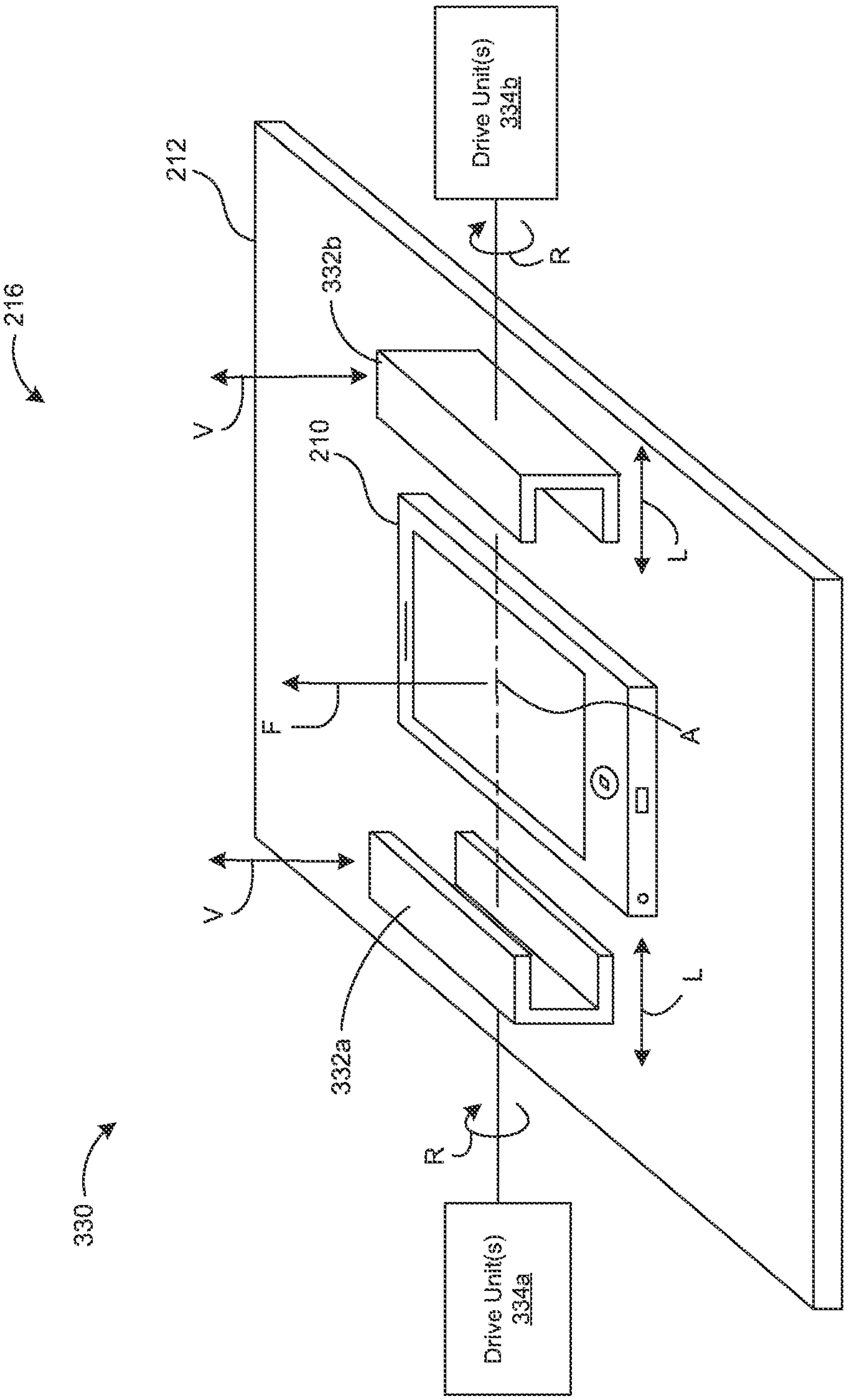
FIG. 3A is a partially schematic, isometric view of a mobile device flipping apparatus configured in accordance with embodiments of the present technology.
Figures 3B, 3C, 3D, 3E, 3F, 3G:
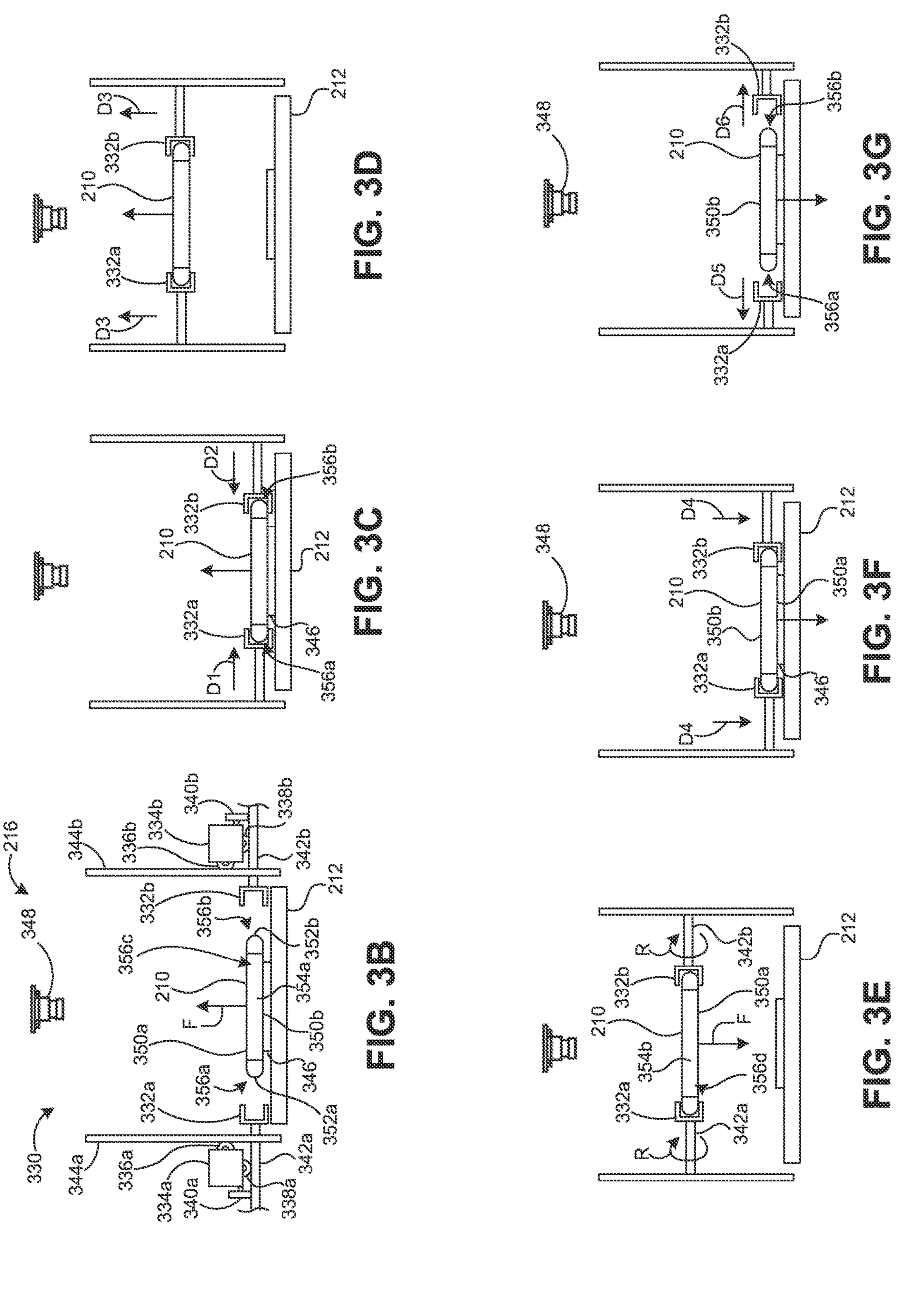
FIGS. 3B-3G are a series of partially schematic front views illustrating operation of the mobile device flipping apparatus of FIG. 3A.

FIG. 3A is a partially schematic, isometric view of a phone flipping apparatus 330 ("apparatus 330") configured in accordance with embodiments of the present technology. FIGS. 3B-3G are a series of corresponding front views illustrating operation of the apparatus 330 in accordance with embodiments of the present technology. In some embodiments, the apparatus 330 can be positioned at least partially within an inspection area of a kiosk, such as the inspection area 216 of the kiosk 100 (FIGS. 1-2C) and/or the inspection area of other kiosks, and/or in other suitable locations. Referring first to FIG. 3A, the apparatus 330 can include one or more device gripping members or grippers 332, each of which can be operably coupled to one or more drive units 334 via, e.g., one or more shafts, arms, and/or linkages. In the illustrated embodiment, for example, the apparatus 330 includes a first gripper 332*a* positioned on a first side of the inspection tray 212 and operably coupled to a first drive unit 334*a*, and a second gripper 332*b* positioned on a second, opposite side of the inspection tray 212 and operably coupled to a second drive unit 334*b*. In other embodiments, the apparatus 330 can include more or fewer grippers and/or drive units. Each of the drive units 334*a,b* can be operable to move the corresponding gripper 332*a,b* relative to the mobile phone 210 and/or the inspection tray 212. For example, in some embodiments, the drive units 334*a,b* can be operable to move the corresponding grippers 332*a,b* in at least in the directions indicated by the arrows L (e.g., laterally and horizontally), the arrows R (e.g., rotationally about a horizontal axis A), and/or the arrows V (e.g., vertically). As described in greater detail below, the apparatus 330 can be configured to turn over or flip the mobile phone 210 from a first orientation in which one side of the mobile phone 210 (e.g., the side with a display screen) faces away from the inspection tray 212 in a direction indicated by arrow F (e.g., upwardly), to a second orientation in which the one side of the mobile phone 210 faces toward the inspection tray 212 in a direction opposite the direction indicated by the arrow F (e.g., downwardly). Additionally or alternatively, the apparatus 330 can be configured to flip the mobile phone 210 from the second orientation back to the first orientation, and/or flip the mobile phone 210 from one side to the other and back again multiple times. Accordingly, those of ordinary skill in the art will understand that the apparatus 330 and/or other flipping apparatuses configured in accordance with the present technology can be configured to flip mobile phones and/or other electronic devices front-to-back, back-to-front, front-to-side, back-to-side, side-to-front, side-to-back, etc. so that, for example, both the front and back sides (and/or the lateral side surfaces or edges) of these devices can be visually evaluated and/or imaged by one or more cameras, e.g., camera 348 (FIG. 3B). Whether the apparatus 330 and/or the other flipping apparatuses flip mobile phones and/or other electronic device front-to-back, back-to-front, etc. can, in some embodiments, be based on the orientation in which the mobile phone/electronic device is placed on the inspection tray 212, e.g., the first orientation in which the display side faces toward the inspection tray 212 or the second orientation in which the display side faces away from the inspection tray 212. Accordingly, it will be understood that embodiments of the flipping apparatuses described herein are not limited to use with mobile phones and/or other electronic devices in any particular starting or ending orientation unless the context clearly requires otherwise.

In the illustrated embodiments, the inspection tray 212 is in a horizontal orientation, e.g., as shown and described with reference to FIG. 2B. In other embodiments, the phone flipping apparatus 330 can be configured to flip the mobile phone 210 when the inspection tray 212 is in a non-horizontal orientation, e.g., as shown and described with reference to FIG. 2A, and/or when the inspection tray 212 is in any other suitable position.

Referring to FIG. 3B, in the illustrated embodiments each of the grippers 332*a,b* can be coupled to a distal end portion of a respective shaft or arm 342*a,b* having, e.g., a cylindrical cross section. Each of the drive units 334*a,b* can include a first drive gear or pinion 336*a,b* operably rotatable to move the respective drive unit 334*a,b* vertically (e.g., the direction indicated by the arrows V in FIG. 3A) relative to the inspection tray 212. In the illustrated embodiment, for example, each of the first pinions 336*a,b* are operably engaged with a respective surface 344*a,b* within the inspection area 216. Individual ones of the surfaces 344*a,b* can be, for example, a side wall of the inspection area 216, or any other suitable surface or surface portion within the inspection area 216 and/or the kiosk 100 (FIG. 1). In some embodiments, each of the surfaces 344*a,b* can include a row of teeth for operably engaging corresponding teeth on the respective first pinions 336*a,b*. Each of the drive units 334*a,b* can further include a respective second drive gear or pinion 338*a,b* operably coupled to the respective arm 342*a,b* and operably rotatable to move or translate the arm 342*a,b* and the associated gripper 332*a,b* laterally (in the horizontal direction indicated by the arrows L in FIG. 3A) relative to the inspection tray 212, e.g., toward and/or away from the mobile phone 210. In some embodiments, each of the arms 342*a,b* can include a row of teeth for operably engaging corresponding teeth on the respective second pinions 338*a, b*. Each of the drive units 334*a,b* can further include a respective third drive gear or pinion 340*a,b* coupled to the respective arm 342*a,b* and operable to engage, e.g., a circumferential arrangement of teeth on the respective arm 342*a,b* and rotate the respective arm 342*a,b* relative to the inspection tray 212 (e.g., in the direction indicated by the arrows R about the axis A in FIG. 3A) to cause a corresponding rotation of the associated gripper 332*a,b*. As described in greater detail below, in some embodiments operation of each of the drive units can be coordinated and/or synchronized to flip the mobile phone 210. In some embodiments, for example, corresponding elements (e.g., the first pinions 336*a* and 336*b*, the second pinions 338*a* and 338*b*, the third pinions 340*a* and 340*b*, etc.) of each drive unit 334*a,b* can be operated in unison and/or simultaneously. In other embodiments, other suitable types of drive units and/or associated components can be used to move the arms 342*a,b* as described herein. For example, in some embodiments the drive units 334*a,b* can include wheels instead of pinions and can rely on friction between the outer wheel surface and the arm to cause the desired arm movement.

In some embodiments, the inspection area 216 can include at least one camera 348 mounted above and directed downwardly toward the inspection tray 212. The camera 348 can be configured to obtain still pictures and/or video images of mobile phones positioned on the inspection tray 212. In some embodiments, the camera 348 can include or be combined with one or more magnification tools, scanners, and/or other imaging components (e.g., other cameras) to view, photograph, and/or otherwise visually evaluate the mobile phone from multiple perspectives. Additionally, in some embodiments, the camera 348 can be movable to facilitate device visual inspection. In addition to the camera 348, the inspection area 216 can also include one or more lights (not shown) directed toward the inspection tray 212 to facilitate the visual inspection of the mobile phone 210.

In the illustrated embodiment, the mobile phone 210 can have a front surface 350*a* (including, e.g., a display screen), a back surface 350*b*, a left side surface 352*a* (which can be referred to as a first side surface 352*a*) extending between the front surface 350*a* and the back surface 350*b*, and a right side surface 352*b* (which can be referred to as a second side surface 352*b*) extending between the front surface 350*a* and the back surface 350*b* and opposite the first side surface 352*a*. The mobile phone 210 can also have a bottom side surface 354*a* (which can also be referred to as a third side surface 354*a*) extending between the front surface 350*a* and the back surface 350*b*, and between the first side surface 352*a* and the second side surface 352*b*; and a top side surface 354*b* (which can also be referred to as a fourth side surface 354*b*; shown in FIGS. 3E-3G) extending between the front surface 350*a* and the back surface 350*b*, and between the first side surface 352*a* and the second side surface 352*b*, opposite the third side surface 354*a*. For ease of reference, the first side surface 352*a* and directly adjacent portions of the front surface 350*a* and the back surface 350*b* (and any corners or edges therebetween) can be collectively referred to herein as a left or first side portion 356*a* of the mobile phone 210, and the second side surface 352*b* and directly adjacent portions of the front surface 350*a* and the back surface 350*b* (and any corners or edges therebetween) can be collectively referred to herein as a right or second side portion 356*b* of the mobile phone 210. Similarly, the third side surface 354*a* and directly adjacent portions of the front surface 350*a* and the back surface 350*b* (and any corners or edges therebetween) can be collectively referred to herein as a bottom or third side portion 356*c* of the mobile phone 210, and the fourth side surface 354*b* and directly adjacent portions of the front surface 350*a* and the back surface 350*b* (and any corners or edges therebetween) can be collectively referred to herein as a fourth side portion 356*d* (shown in FIGS. 3E-3G).

In operation, the mobile phone 210 can be positioned on the inspection tray 212 with a first side or surface, for example, the front surface 350*a* (including, e.g., the display screen) facing upwardly as shown by the arrow F in FIG. 3B. By way of example, in some embodiments this position can correspond to the mobile phone 210 undergoing electrical and/or visual inspection as shown in FIG. 2B. For example, the mobile phone 210 can undergo an electrical inspection and evaluation using the appropriate electrical connector from the electrical connector carrier assembly 224 (FIG. 2A), and the front surface 350*a* of the mobile phone 210 can be visually inspected and evaluated via the camera 348 as described above. Once the mobile phone 210 has been electrically evaluated, the electrical connector is disengaged from the mobile phone 210. Once the electrical connector has been disengaged and the front surface 350*a* has been visually evaluated and/or imaged as needed, the mobile phone 210 can be flipped (i.e., turned over) as described below so that a second surface, e.g., the back surface 350*b*, of the mobile phone 210 can be visually inspected via the camera 348.

Referring next to FIG. 3C, before beginning the flipping process, the camera 348 can verify that there is a mobile phone 210 (or other electronic device) positioned on the inspection tray 212 and that the phone is not too large to flip. After confirming this, the flipping process begins by the drive units 334*a,b* moving the respective grippers 332*a,b* inwardly toward the mobile phone 210. (The drive units 334*a,b* are not shown in FIGS. 3C-3G for purposes of illustration.) In the illustrated embodiment, the first gripper 332*a* moves in a first direction D1 toward the first side portion 356*a* and the second gripper 332*b* moves in a second direction D2 (e.g., opposite the first direction D1) toward the second side portion 356*b*. The motion of the grippers 332*a,b* can cause each of the grippers 332*a,b* to contact, grip, or otherwise engage at least a portion of the respective first and second side portions 356*a,b* of the mobile phone 210. In other embodiments, the mobile phone 210 can be orientated such that the first gripper 332*a* can engage at least a portion of any of the side portions 356*a-d* of the phone (e.g., the third side portion 356*c*), and the second gripper 332*b* can engage the opposite side portion (e.g., the fourth side portion 356*d*). In some embodiments, one or more of the grippers 332*a,b* can be adjustable and/or actuatable to clasp or grasp at least a portion the respective side portion 356*a,b* of the mobile phone 210. In these and other embodiments, each of the grippers 332*a,b* can engage at least a portion the respective side portions 356*a,b* of the mobile phone 210 with sufficient force (e.g., friction) to at least partially prevent the mobile phone 210 from slipping or being dislodged from the grippers 332*a,b* at least during the flipping process.

In the illustrated embodiment, the inspection tray 212 includes a raised platform or spacer 346 configured to raise or elevate the mobile phone 210 relative to the inspection tray 212. The mobile phone 210 can be placed on the spacer 346 and thus spaced above the inspection tray 212 to enable the respective grippers 332*a,b* to slide under the corresponding first and second side portions 356*a,b* of the mobile phone 210. In other embodiments, an upper surface of the inspection tray 212 can include one or more grooves or recesses (not shown) positioned at least partially beneath the mobile phone 210 and configured to slidably receive one or more of the grippers 332*a,b*.

Referring next to FIG. 3D, once the grippers 332*a,b* have engaged the respective side portions 356*a,b* of the mobile phone 210, the drive units 334*a,b* can move the respective grippers 332*a,b* upwardly, e.g., away from the inspection tray 212 in the direction D3. The upward distance travelled by each of the grippers 332*a,b* can be based on one or more dimensions of the mobile phone 210 to provide sufficient clearance for flipping. In the illustrated embodiment, for example, the upward distance can be slightly more than one-half of the length of the mobile phone 210, such that the apparatus 330 can flip the mobile phone 210 without a distal portion of the mobile phone 210 contacting the inspection tray 212 as it rotates about the axis A (FIG. 3A).

Referring next to FIG. 3E, after the mobile phone 210 has been moved upwardly, the drive units 334*a,b* can rotate the arms 342*a,b* about their longitudinal axis (which is aligned with the axis A in FIG. 3A) to rotate the associated grippers 332*a,b* in the direction R (about, e.g., a horizontal axis, such as the horizontal axis A of FIG. 3A) and thereby flip the mobile phone 210 such that the front surface 350*a* is facing at least partially toward the inspection tray 212 (e.g., downwardly), as indicated by the arrow F, and the back surface 350*b* is facing toward the camera 348 (e.g., upwardly). With the mobile phone 210 in this position, each of the grippers 332*a,b* can move toward the inspection tray 212 in the direction indicated by the arrows D4 (e.g., downwardly), to place the front surface 350*a* on the inspection tray 212 (e.g., the inspection tray spacer 346), as shown in FIG. 3F. When the mobile phone 210 is resting on the inspection tray 212, each of the grippers 332*a,b* can retract and disengage or release the respective first and second side portions 356*a,b* and move away from the mobile phone 210, as shown in FIG. 3G. In the illustrated embodiment, for example, the first gripper 322*a* can disengage the first side portion 356*a* and retract from the mobile phone 210 in the direction D5, and the second gripper 332*b* can disengage the second side portion 356*b* and retract from the mobile phone 210 in the direction D6. The mobile phone 210 can then be visually inspected by means of the camera 348 to determine whether, for example, there is any damage to the back surface 350*b* of the mobile phone. Such damage could include, for example, cracks, gouges, damage to the phone camera, etc. Additionally, as discussed above in reference to FIG. 2B, on some mobile phones the IMEI number is printed or otherwise formed on the back surface 350*b* of the mobile phone. In some embodiments, the kiosk 100 can visually inspect such phones (using, e.g., OCR) to read or otherwise obtain the IMEI number off the back surface 350*b* of the mobile phone once the phone has been flipped to the position shown in FIG. 3G. The camera 348 can be used to inspect the back surface 350*b* before, during, and/or after the grippers 332*a,b* disengage the respective first and second side portions 356*a,b*. In some embodiments, if desired for, e.g., further inspection or other processing, the phone 210 can be flipped back the position shown in FIG. 3A by repeating the process described above.

In some embodiments, the mobile phone 210 can be held in a partially flipped state by, for example, the flipping apparatus 320 or the user, to allow the camera 348 to obtain one or more direct images of one or more of the sides of the phone for evaluation. For example, the apparatus 330 can be configured to stop the rotation of the mobile phone 210 part-way between the first orientation (FIG. 3D) and the second orientation (FIG. 3E), e.g., with the third side portion 356*c* or the fourth side portion 356*d* facing toward, or at least generally toward, and/or otherwise positioned within a field of view of the camera 348. With the mobile phone 210 in this position, the camera 348 can be used to obtain one or more images of the third side portion 356*c* or the fourth side portion 356*d* of the mobile phone 210. These images can be used to evaluate, e.g., the location, condition, etc. of any buttons, connector ports, and/or other features on the third side portion 356*c* or the fourth side portion 356*d* of the phone 210. Similarly, one or more steps of the flipping process described above with reference to FIGS. 3A-3G can be repeated to position the other of the third side portion 356*c* or the fourth side portion 356*d* in the field of view of the camera 348. For example, after the mobile phone 210 has been flipped a first time and is in the position shown in FIG. 3G, the arms 342*a,b* can repeat the operations described above to flip the phone over a second time to, e.g., return the mobile phone 210 to the orientation of FIG. 3B. During that process, the other of the third side portion 356*c* or the fourth side portion 356*d* of the mobile phone 210 can face toward and/or otherwise be positioned within a field of view of the camera 348. Accordingly, the camera 348 can obtain one or more images of the other of the third side portion 356*c* or the fourth side portion 356*d*. In some embodiments, the mobile phone 210 can be positioned so that the grippers 332*a,b* engage the third side portion 356*c* and the fourth side portion 356*d* to, e.g., allow one or both of the first and second side portions 356*a,b* to be imaged by the camera 348 when flipping the mobile phone 210.

Figure 4B:
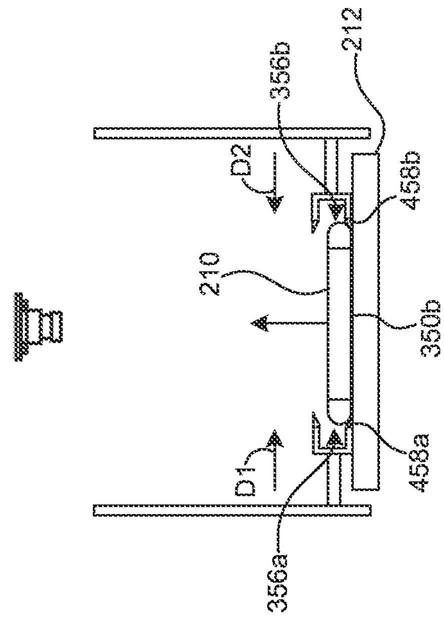
FIGS. 4A-4C are a series of partially schematic front views illustrating operation of a mobile device flipping apparatus configured in accordance with other embodiments of the present technology.
Figure 4A:
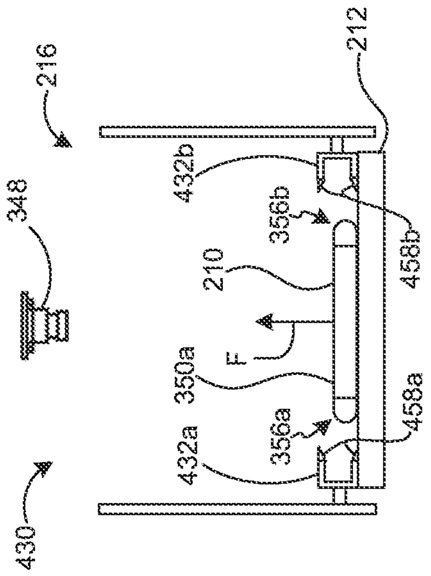
Figure 4C:
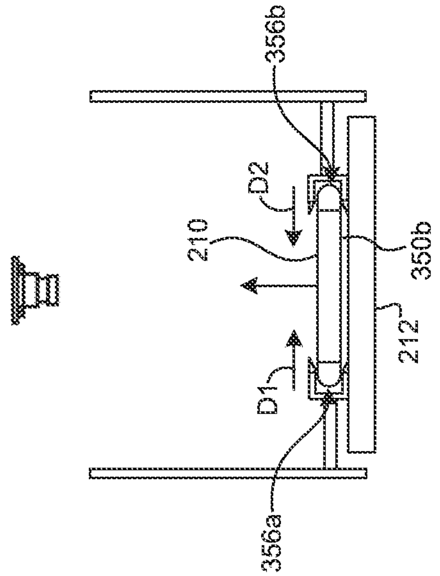

FIGS. 4A-4C are a series of front views illustrating operation of a phone flipping apparatus 430 ("the apparatus 430") configured in accordance with embodiments of the present technology. The apparatus 430 can be generally similar in structure and function to the apparatus 330 of FIGS. 3A-3G, with like reference numbers (e.g., grippers 432*a,b* versus the grippers 332*a,b* of FIGS. 3A-3G) indicating like elements. However, in the illustrated embodiment the mobile phone 210 is placed directly on the upper surface of inspection tray 212 and not on, for example, an elevated platform or spacer. In such embodiments, each of the grippers 432*a,b* can include one or more distal edge portions having ramps or angled surfaces 458*a,b*. In the illustrated embodiment, for example, the first gripper 432*a* includes two (e.g., upper and lower) tapered or angled ramps 458*a* and the second gripper 432*b* includes two (e.g., upper and lower) angled ramps 458*b*. Individual ones of the ramps 458*a,b* can be configured to allow each of the grippers 432*a,b* to engage at least a portion of the respective first and second side portions 356*a,b* of the mobile phone 210 when the mobile phone 210 is resting directly on the inspection tray 212. For example, inward motion of each of the grippers 432*a,b* can drive the associated ramps 458*a,b* (e.g., the lower ramps) under the mobile phone 210 and at least partially between the back surface 350*b* and the inspection tray 212 as the respective first and second side portions 356*a,b* slide upwardly on the ramps 458*a,b*, as shown in FIGS. 4B and 4C. Once the grippers 432*a,b* have gripped the phone 210, the phone can be flipped as described above with reference to FIGS. 3C-3G. Accordingly, the apparatus 430 can be used to flip a mobile phone 210 placed on an inspection tray 212 that does not include a raised platform or spacer (e.g., the spacer 346 of FIGS. 3B-3G). In some embodiments, if desired for, e.g., further inspection or other processing, the phone 210 can be flipped back to the position shown in FIG. 4A by repeating the process described above.

Figures 5A, 5B, 5C, 5D, 5E:
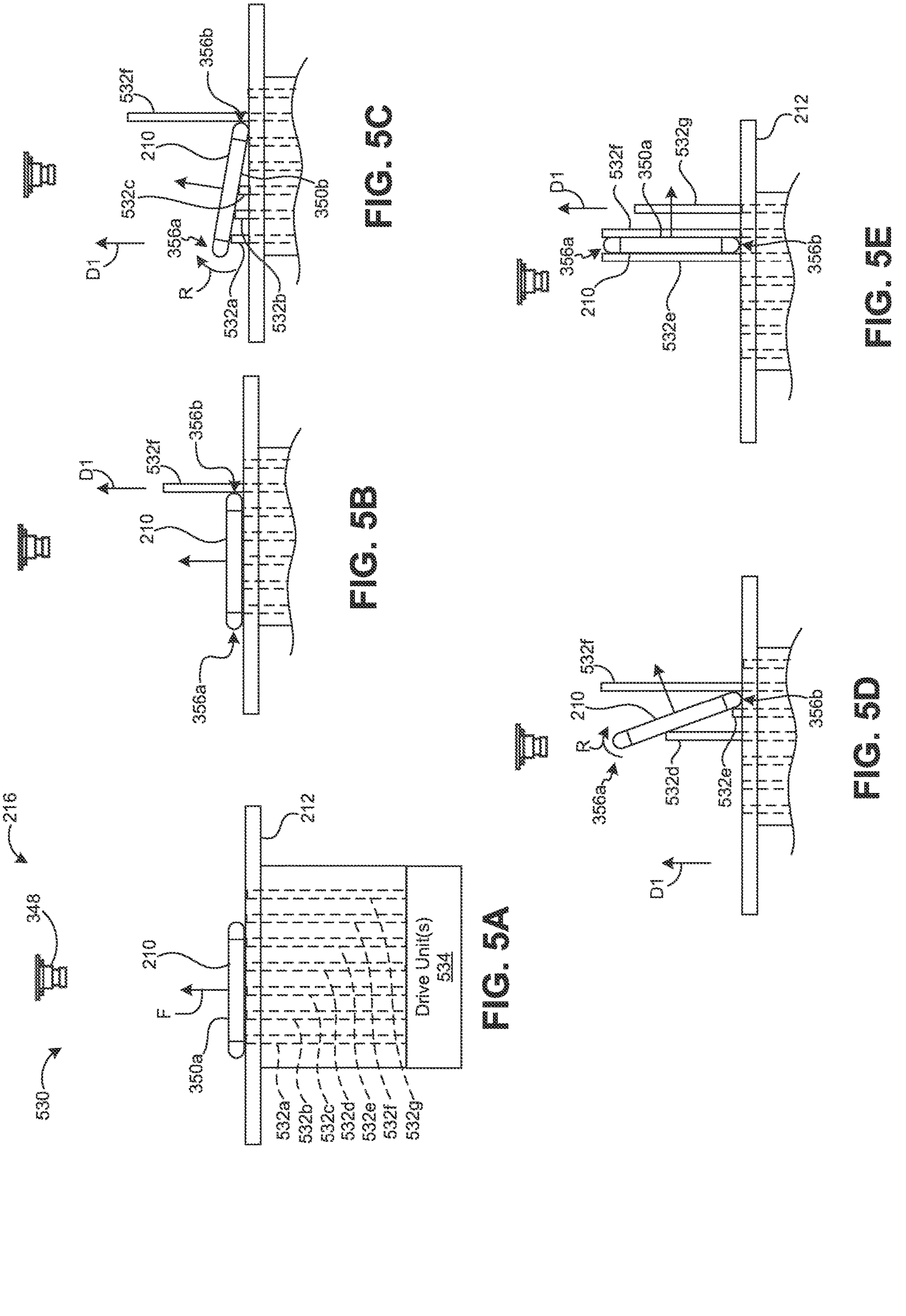
FIGS. 5A-5I are a series of partially schematic front views illustrating operation of a mobile device flipping apparatus configured in accordance with other embodiments of the present technology.

FIGS. 5A-5I are a series of front views illustrating operation of a phone flipping apparatus 530 ("the apparatus 530") configured in accordance with embodiments of the present technology. In some embodiments, the apparatus 530 can be positioned at least partially within an inspection area of a kiosk, such as the inspection area 216 of the kiosk 100 (FIGS. 1-2C) and/or the inspection area of other kiosks, and/or other suitable locations. Referring first to FIG. 5A, the apparatus 530 can include a plurality of elongate pushrods 532, each of which can be operably coupled to one or more drive units 534. Each of the pushrods 532 can be positioned beneath the inspection tray 212 and aligned with a corresponding opening or aperture (not shown) in the inspection tray 212. Accordingly, as described in greater detail below, each of the pushrods 532 can be moved upwardly (e.g., vertically) to extend or protrude at least partially from the inspection tray 212. In the illustrated embodiment, the apparatus 530 includes seven pushrods 532*a*-*g* (e.g., a first pushrod 532*a*, a second pushrod 532*b*, a third pushrod 532*c*, a fourth pushrod 532*d*, a fifth pushrod 532*e*, a sixth pushrod 532*f*, and a seventh pushrod 532*g*). In other embodiments, the apparatus 530 can include more or fewer pushrods 532, such as at least one, two, three, four, five, six, eight, nine, ten, or any other suitable number of pushrods. Additionally, although one row of pushrods 532 is illustrated in FIG. 5A for purposes of illustration, in some embodiments the apparatus 530 can include two or more identical or at least similar rows of pushrods spaced apart from each other a suitable distance (e.g., from about 0.25 inch to about 2 inches) in a direction into the page and at an angle (of, e.g., at least 1, 5, 10, 15, 30, 45, 60, 75, 90, etc. degrees) to the row shown in FIG. 5A. Each of the pushrods can be straight or at least substantially straight, and can have any suitable cross-sectional shape (e.g., triangular, circular, square, etc.). Individual ones of the drive units 534 can include one or more mechanical drive elements such as camshafts, pistons, etc.; electromechanical drive elements such as solenoids; and/or pneumatic, hydraulic, and/or any other suitable drive elements. In some embodiments, each of the pushrods 532 can be operably coupled to the same drive unit 534 (e.g., a single camshaft operably coupled to all of the pushrods 532). In other embodiments, one or more of the pushrods 532 can have a different (e.g., individual and/or specific) drive unit 534 (e.g., an individual solenoid for each of the pushrods 532). In operation, the drive unit(s) 534 can be operable to selectively and/or independently move individual ones of the pushrods 532 to move at least partially away from and/or toward the inspection tray 212.

In operation, the mobile phone 210 is positioned on the inspection tray 212 with, for example, the front surface 350*a* (e.g., the display screen) facing upwardly as shown by the arrow F. By way of example, this position can correspond to the mobile phone 210 undergoing electrical and/or visual inspection as shown in FIG. 2B. As described below with reference to FIGS. 5B-5I, once the mobile phone 210 has been electrically and/or visually evaluated, the mobile phone 210 can be flipped (i.e., turned over) as described below so that the back surface 350*b* of the mobile phone 210 can be visually inspected via the camera 348.

Referring next to FIG. 5B, before beginning the flipping process, the camera 348 can verify that there is a mobile phone (or other electronic device) positioned on the inspection tray 212 and that the phone is not too large to flip. Additionally, the camera 348 can confirm that the phone is in a suitable position and/or orientation for flipping. After confirming this, the flipping process begins by selecting at least one of the pushrods 532 and extending the selected pushrod(s) 532 in the direction D1 via the drive unit(s) (not shown in FIGS. 5B-5I for illustrative purposes). The selected pushrod(s) 532 can include at least a penultimate pushrod (e.g., a pushrod that is next to one of the end pushrods), such that there is at least one additional pushrod on both sides (e.g., left and right) of the selected pushrod 532. In the illustrated embodiment, for example, the sixth (e.g., penultimate, when counting left-to-right) pushrod 532*f* is selected and extended in the first direction D1. In other embodiments, the second pushrod 532*b* (e.g., penultimate, when counting right-to-left) can be selected and extended. When extended, an end portion of the sixth pushrod 532*f* can contact or at least be very close to contacting at least a portion of the second side portion 356*b* of the mobile phone 210. If the sixth pushrod 532*f* does not contact the second side portion 356*b* when extended, one or more of the pushrods 532*a*-*e* can be extended to drive the mobile phone 210 into contact with the sixth pushrod 532*f*.

With at least a portion of the second side portion 356*b* of the mobile phone 210 contacting the sixth pushrod 532*f* and while the sixth pushrod 532*f* remains extended, the drive unit(s) 534 can extend one or more of the pushrods 532*a*-*e* in the first direction D1 (e.g., upwardly) to contact the back surface 350*b* of the mobile phone 210, as shown in FIGS. 5C and 5D. Referring to FIGS. 5C and 5D, the pushrods 532*a*-*e* can move successively in such a way that the first pushrod 532*a* extends higher than one or more of the other pushrods 532*b*-*e* (e.g., the second pushrod 532*b* and/or the third pushrod 532*c*, as shown in FIG. 5C) for at least a portion of the flipping process. Because the sixth pushrod 532*f* contacts at least a portion of the second side portion 356*b* of the mobile phone 210, the extension of the pushrods 532*a*-*e* can cause the first side portion 356*a* of the mobile phone to rotate upwardly about the second side portion 356*b*, e.g., in a direction R. In some embodiments, one or more of the pushrods 532*a*-*e* can be extended in the first direction D1 in sequence, e.g., the first pushrod 532*a* being extended first, followed by the second pushrod 532*b* after the first pushrod 532*a* has extended a first predetermined distance, followed by the third pushrod 532*c* after the second pushrod 532*b* has extended a second predetermined distance, etc. Each of the pushrods 532*a*-*e* can be retracted after a subsequent pushrod 532*a*-*e* has been extended, e.g., the first pushrod 532*a* can be retracted after the second pushrod 532*b* has been extended, the second pushrod 532*b* can be retracted after the third pushrod 532*c* has been extended, etc.

Referring to FIG. 5E, continued extension of the pushrods 532 can rotate the mobile phone 210 into a vertical orientation, e.g., with the mobile phone 210 positioned perpendicular or at least generally or substantially perpendicular relative to the inspection tray 212. In the illustrated embodiment, when the mobile phone 210 is in the vertical orientation, the mobile phone 210 is positioned between the fifth and sixth pushrods 532*e,f* with the front surface 350*a* of the mobile phone 210 at least partially contacting the sixth pushrod 532*f*. With the mobile phone 210 in this position, the seventh pushrod 532*g* (e.g., an ultimate or final pushrod, when counting left-to-right) can be extended in the first direction D1.

Figure 5F:
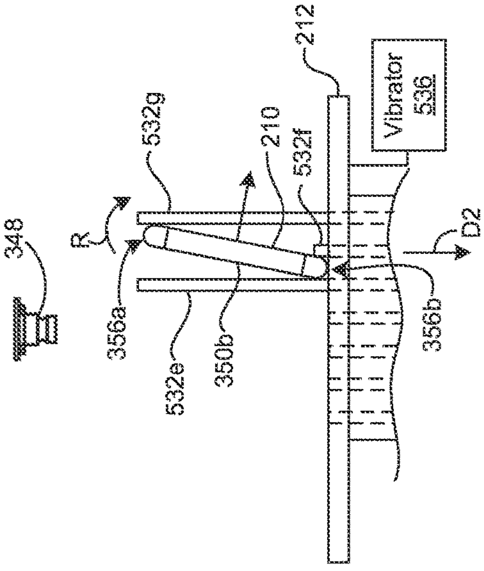

Once the seventh pushrod 532*g* is extended, the sixth (e.g., penultimate) pushrod 532*f* can be lowered or retracted in a second direction D2 opposite the first direction D1, as shown in FIG. 5F. The retraction of the sixth pushrod **532*f* can cause further rotation of the mobile phone 210 in the direction R, e.g., rotation of the first side portion 356*a* toward the seventh pushrod 532*g* about the second side portion 356*b* and/or about, e.g., a horizontal axis, such as the horizontal axis A of FIG. 3A. The rotation of the mobile phone 210 can cause at least part of the first side portion 356*a* of the mobile phone 210 to contact the seventh pushrod 532*g*, such that the mobile phone 210 can assume an over-center position with back surface 350*b* of the phone facing generally toward the camera 348. In some situations, lowering the sixth pushrod 532*f* alone may not cause the mobile phone 210 to rotate toward the seventh pushrod 532*g*. For such situations, the kiosk can include one or more vibrators 536 (e.g., an electromechanical vibrator) that are operably coupled to the inspection tray 212 and, in response to a control signal from the kiosk processor, can vibrate the inspection tray 212 to thereby cause the mobile phone 210 to rotate toward and against the seventh pushrod 532*g***.

Figure 5G:
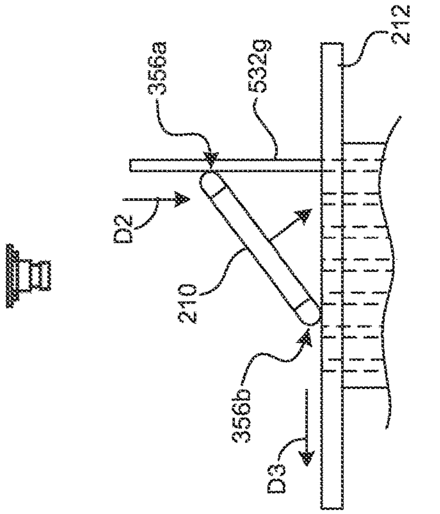
Figure 5H:
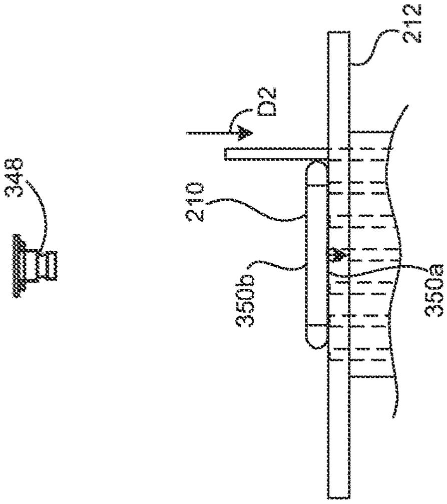
Figure 5I:
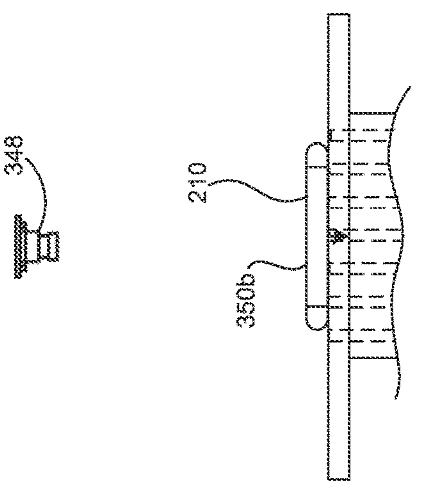

With the back surface **350*b* of the mobile phone 210 facing generally toward the camera 348, the fifth pushrod 532*e* can be retracted in the second direction D2, which can allow and/or cause the first side portion 356*a* of the mobile phone 210 to slide downwardly along the seventh pushrod 532*g* in the second direction D2 and the second side portion 356*b* to slide across the surface of the inspection tray 212 in a third (e.g., lateral) direction D3, as shown in FIG. 5G. The mobile phone 210 can continue sliding along the seventh pushrod 532*g* and/or across the inspection tray 212 until the front surface 350*a* contacts the inspection tray 212, as shown in FIG. 5H. With the mobile phone 210 in this position, the seventh pushrod 532*g* can be lowered in the second direction D2, as shown in FIG. 5I, and the camera 348 can be used to inspect the back surface 350*b***.

It can be appreciated that before, during, and/or after any of the steps illustrated in FIGS. 5A-5I, the camera 348 can be used to verify the position of the mobile phone 210 before proceeding with the flipping process described above. For example, before lowering the fifth pushrod **532*e* (as described regarding FIGS. 5F and 5G), the camera 348 can verify that the mobile phone 210 has rotated toward the seventh pushrod 532*g* and/or that the back surface 350*b* is at least partially visible (e.g., facing generally toward the camera 348). Although in FIGS. 5A-5I the mobile phone 210 is oriented such that the apparatus 530 flips the first side portion 356*a* of the mobile phone 210 about the second side portion 356*b*, it will be appreciated that the apparatus 530 is equally suitable for flipping the mobile phone 210 when the phone is in other orientations (e.g., flipping the fourth side portion about the third side portion, etc.). In some embodiments, if desired for, e.g., further inspection or other processing, the phone 210 can be flipped back to the position shown in FIG. 5A by repeating the process described above. Additionally, it will be understood that the mobile phone 210 can initially be positioned on the inspection tray 212 with the back surface 350*b* facing upwardly and then flipped so that the front surface 350*a*** faces upwardly.

In some embodiments, the apparatus 530 can hold the mobile phone 210 in a partially flipped state shown to allow the camera 348 to obtain one or more direct images of one or more of the sides and/or surfaces of the phone for evaluation. For example, the apparatus 530 can be configured to hold the mobile phone 210 with the first side portion **356*a* or the second side portion 356*b* facing toward, or at least generally toward, and/or otherwise positioned within a field of view of the camera 348, e.g., as shown in FIG. 5E. With the mobile phone 210 in this position, the camera 348 can be used to obtain one or more images of the first side portion 356*a*. These images can be used to evaluate, e.g., the location, condition, etc. of any buttons, connector ports, and/or other features on the first side portion 356*a* of the phone 210. Similarly, one or more steps of the flipping process described above with reference to FIGS. 5A-5I can be repeated to position the second side portion 356*b* in the field of view of the camera 348. For example, after the mobile phone 210 has been flipped a first time and is in the position shown in FIG. 5I, the apparatus 530 can repeat the operations described above to flip the phone over a second time to, e.g., return the mobile phone 210 to the orientation of FIG. 5A. During that process, the second side portion 356*b* of the mobile phone 210 can face toward and/or otherwise be positioned within a field of view of the camera 348. Accordingly, the camera 348 can obtain one or more images of the second side portion 356*b*. In some embodiments, the mobile phone 210 can be positioned so that the apparatus rotates the third (e.g., bottom) side portion 356*c* (FIG. 3D) about the fourth (e.g., top) side portion 356*d* (FIG. 3E) and/or the fourth side portion 356*d* about the third side portion 356*c* to, e.g., allow one or both of the third and fourth side portions 356*c,d* to be imaged by the camera 348 when flipping the mobile phone 210**.

Figure 6B:
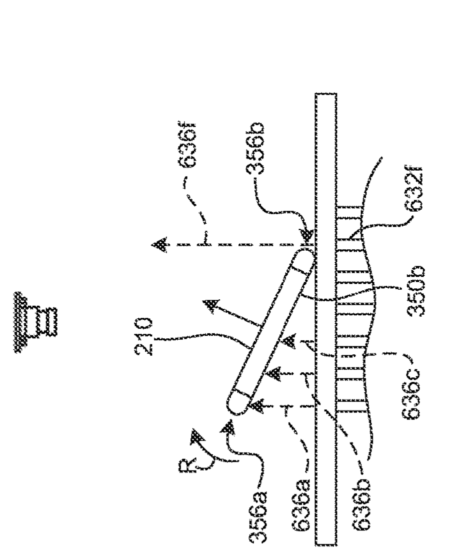
FIGS. 6A-6D are a series of partially schematic front views illustrating operation of a mobile device flipping apparatus configured in accordance with other embodiments of the present technology.
Figure 6D:
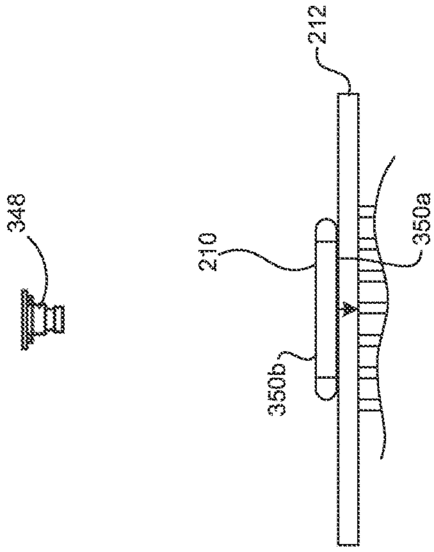
Figure 6A:
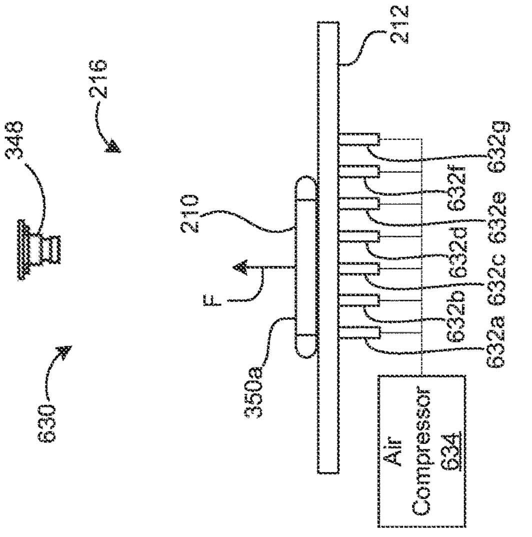
Figure 6C:
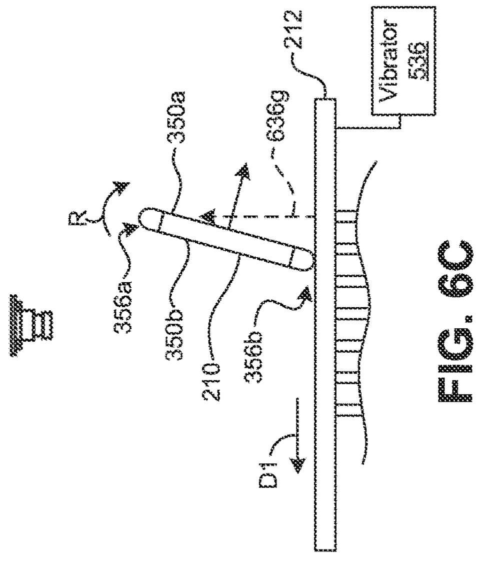

FIGS. 6A-6D are a series of front views illustrating operation of a phone flipping apparatus 630 ("the apparatus 630") configured in accordance with embodiments of the present technology. The apparatus 630 can be positioned at least partially within an inspection area of a kiosk, such as the inspection area 216 of the kiosk 100 (FIGS. 1-2C). In some embodiments, the apparatus 630 can be operable to flip a mobile phone in a manner that is at least generally similar to the manner of operation of the apparatus 530 of FIGS. 5A-5I. However, instead of pushrods, the apparatus 630 includes a plurality of air nozzles **632*a-g* operably coupled to an air compressor or other compressed gas source 634. Each of the air nozzles 632*a-g* can be positioned at least partially beneath the inspection tray 212 and configured to emit a jet of air 636 (e.g., a compressed air jet) upwardly through an opening or aperture (not shown) in the inspection tray 212 aligned with an outlet of the corresponding nozzle 632. For example, the sixth (e.g., penultimate) air jet nozzle 632*f* can emit an air jet 636*f* that can function similarly to the sixth pushrod 532*f* in FIGS. 5A-5I. Specifically, the sixth air jet 636*f* can serve as a high-pressure barrier that can restrict lateral movement of the mobile phone 210 and allow the mobile phone 210 to rotate about its second side portion 356*b*, as described previously. Referring to FIG. 6B, one or more of the other air nozzles 632*a-e* (shown but not labelled in FIG. 6B for illustrative clarity) can emit respective air jets (air jets 636*a-c* corresponding to air nozzles 632*a-c* as shown), each of which can impinge against the back surface 350*b* of the mobile phone 210 and cause the first side portion 356*a* of the mobile phone 210 to rotate in the direction R about the second side portion 356*b*. The rotational inertia of the mobile phone 210 can cause the mobile phone 210 to move into an over-center position in which, once the sixth air jet 636*f* is turned off, the mobile phone 210 is supported by the seventh air jet 636*g*, as shown in FIG. 6C. With the mobile phone 210 in the over-center position, the intensity of the seventh air jet 636*g* can be reduced such that the second side portion 356*b* can slide across the inspection tray 212 in the direction D1 until the front surface 350*a* contacts and/or faces toward the inspection tray 212, as shown in FIG. 6D. Optionally, the inspection tray 212 can be operably coupled to the vibrator 536, and/or one or more of the sixth air jet 632***f*, the fifth air jet 632*e*, etc. can be turned on to aid in rotating the mobile phone 210 into the position shown in FIG. 6D. With the mobile phone 210 in the position shown in FIG. 6D, the camera 348 can be used to inspect the back surface 350*b* of the mobile phone 210. In some embodiments, if desired for, e.g., further inspection or other processing, the phone 210 can be flipped back to the position shown in FIG. 6A by repeating the process described above.

FIGS. 7A-7I are a series of front views illustrating operation of a phone flipping apparatus ("the apparatus 730") configured in accordance with embodiments of the present technology. The apparatus 730 can be positioned at least partially within an inspection area of a kiosk, such as the inspection area 216 of the kiosk 100 (FIGS. 1-2C) and/or other kiosks and/or other suitable locations. The apparatus 730 can include a mechanical (e.g., a robotic) linkage or arm 732 ("the arm 732"). The arm 732 can include one or more links or arm segments 734. In the illustrated embodiment, the arm 732 includes a first arm segment 734*a* and a second arm segment 734*b*. A proximal end portion of the first arm segment 734*a* can be pivotably coupled to the side wall 344*a* (described previously regarding FIG. 3B), and a distal end portion of the first arm segment 734*a* can be pivotably coupled to a proximal end portion of the second arm segment 734*b*. The arm 732 can further include a suction cup 736 pivotally coupled to a distal end portion of the second arm segment 734*b*. The suction cup 736 can be operably coupled to a vacuum source 740 configured to evacuate the suction cup 736 via a vacuum hose 742 to, e.g., generate suction to allow the suction cup to releasably grasp the mobile phone 210. The arm 732, one or more of the arm segments 734*a,b*, and/or the suction cup 736 can each be operably coupled to one or more drive units 738 configured to robotically control the motion of the arm 732, the one or more arm segments 734*a,b*, and/or the suction cup 736 relative to the inspection tray 212 in response to control inputs from, e.g., a kiosk processor executing computer readable instructions stored on non-volatile memory. The drive unit 738 can include one or more motors, servo motors, gears, linkages, pneumatics, hydraulics, solenoids, pistons, and/or any other suitable drive elements.

In operation, the mobile phone 210 can be positioned on the inspection tray 212 with a first surface, for example, the front surface 350*a* (e.g., the display screen) facing upwardly as shown by the arrow F. By way of example, this position can correspond to the mobile phone 210 undergoing electrical and/or visual inspection as described above with reference to FIG. 2B. Once the mobile phone 210 has been electrically and/or visually evaluated, the mobile phone 210 can be flipped (i.e., turned over) as described below so that the back surface 350*b* of the mobile phone 210 can be visually inspected via the camera 348.

Figure 7A:
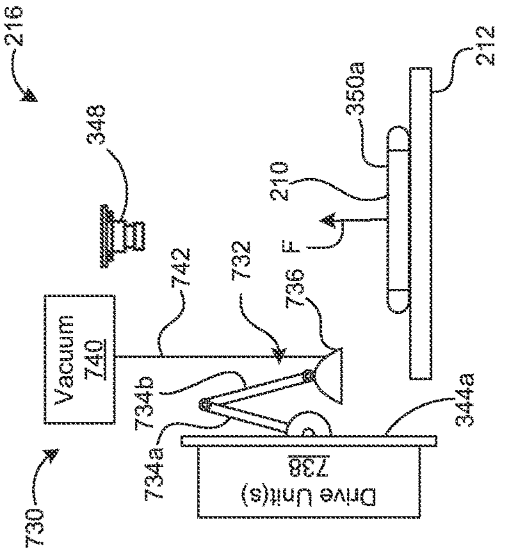
FIGS. 7A-7I are a series of partially schematic front views illustrating operation of a mobile device flipping apparatus configured in accordance with other embodiments of the present technology.
Figure 7B:
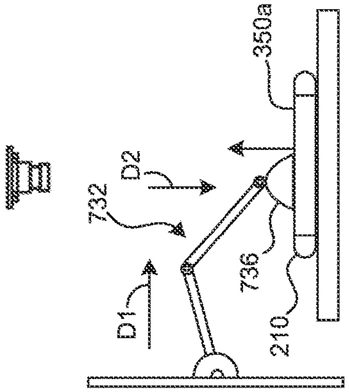
Figure 7C:
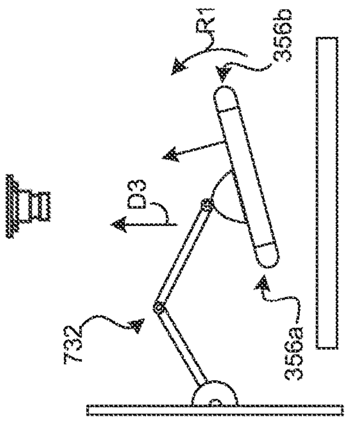
Figure 7D:
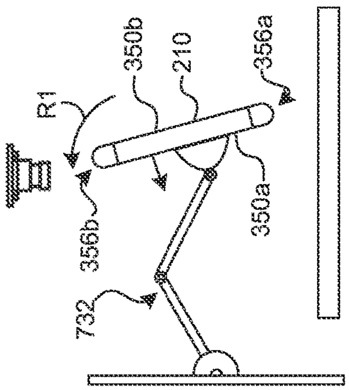
Figure 7E:
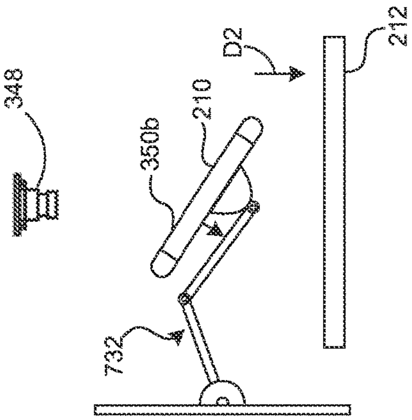
Figure 7F:
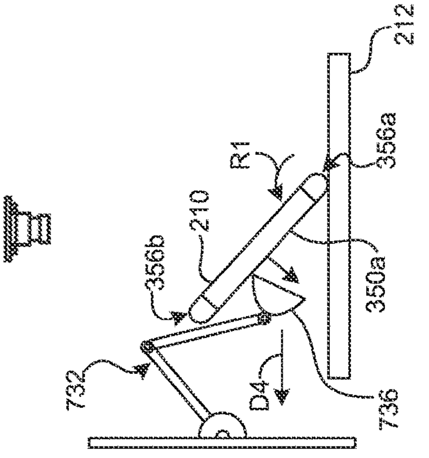
Figure 7G:
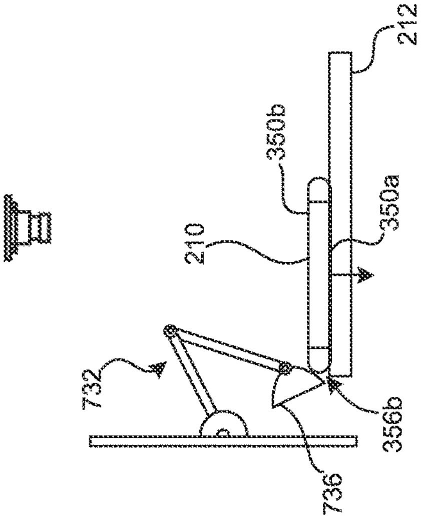

Referring next to FIG. 7B, before beginning the flipping process, the camera 348 can verify that there is a mobile phone 210 (or other electronic device) properly positioned on the inspection tray 212 and that the phone is not too large to flip. If the phone has not been properly positioned, a user can be instructed to move the phone as needed (e.g., with respect to alignment markings on the inspection tray). After confirming this, the flipping process begins by the drive unit(s) 738 (not shown in FIGS. 7B-7I for purposes of illustration) extending the arm 732 in the first direction D1 and/or lowering the arm 732 in the second direction D2, such that the suction cup 736 at least partially contacts the front surface 350*a* (e.g., the display) of the mobile phone 210. With the suction cup 736 contacting the front surface 350*a* so that the rim of the suction cup is completely, or at least substantially, in contact with the front surface 350*a*, the vacuum source 740 (FIG. 7A) can evacuate the suction cup 736 to an internal pressure that is less than the ambient pressure such that the suction cup 736 is releasably coupled to the mobile phone 210. With the suction cup 736 coupled to the mobile phone 210, the arm 732 can lift the mobile phone 210 away from the inspection tray 212 in the third direction D3 and/or can begin to rotate the mobile phone 210 in the direction R1 (about, e.g., a horizontal axis, such as the horizontal axis A of FIG. 3A), as shown in FIG. 7C. The arm 732 can continue to rotate the mobile phone 210, as shown in FIG. 7D, until the back surface 350*b* of the mobile phone 210 is facing upwardly or at least slightly upwardly, e.g., toward the camera 348, as shown in FIG. 7E. With the mobile phone 210 in this position, the arm 732 can lower the mobile phone 210 toward the inspection tray 212, e.g., in the direction D2, until at least a portion of the first side portion 356*a* of the mobile phone 210 contacts the inspection tray 212, as shown in FIG. 7F. When the first side portion 356*a* contacts the inspection tray 212, the pressure in the suction cup 736 can be increased to decouple the suction cup from the front surface 350*a* which, in turn, can allow the second side portion 356*b* of the mobile phone 210 to rotate about the first side portion 356*a* in the direction R1. When the suction cup 736 is decoupled from the front surface 350*a*, the arm 732 can move away from the mobile phone 210, e.g., in the direction D4, to allow for continued downward rotation of the mobile phone 210. The mobile phone 210 can continue to rotate until the front surface 350*a* at least partially contacts the inspection tray 212 and the back surface 350*b* faces toward the camera 348, as shown in FIG. 7G. With the mobile phone 210 in this position, the camera 348 can be used to inspect the back surface 350*b* of the mobile phone 210.

Figure 7H:
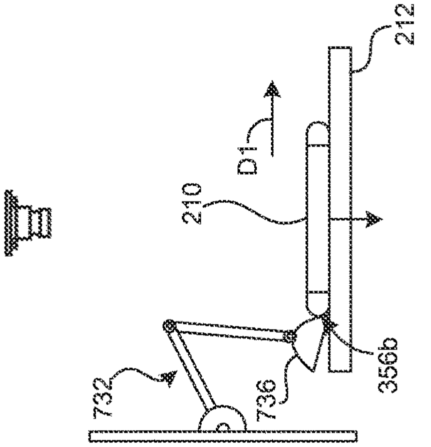
Figure 7I:
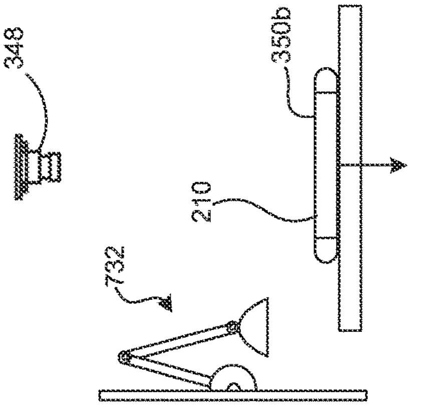

In some embodiments, the arm 732 can additionally be used to center or otherwise position the mobile phone 210 (e.g., the back surface 350*b* of the mobile phone 210) relative to the camera 348. Referring to FIG. 7H, for example, the arm 732 can move in the first direction D1 to bring the suction cup 736 into contact with at least a portion of the second side portion 356*b* of the mobile phone 210, e.g., to push the mobile phone 210 across the inspection tray 212 in the first direction D1. The arm 732 can continue to move the mobile phone 210 until the back surface 350*b* is centered or at least generally centered relative to the camera 348, as shown in FIG. 7I. With the mobile phone 210 centered under the camera 348, the arm 732 can retract out of a field of view of the camera 348, so that the camera 348 can be used to inspect the back surface 350*b* of the mobile phone 210. In some embodiments, if desired for, e.g., further inspection or other processing, the phone 210 can be flipped back to the position shown in FIG. 7A by repeating the process described above with the back surface 350*b*.

Although in FIGS. 7A-7I the mobile phone 210 is oriented such that the apparatus 730 flips the second side portion 356*b* of the mobile phone 210 about the first side portion 356*a*, it will be appreciated that the apparatus 730 is equally suitable for flipping the mobile phone 210 when the phone is in other orientations (e.g., flipping the fourth side portion about the third side portion, etc.).

In some embodiments, the apparatus 730 can hold the mobile phone 210 in a partially flipped state shown to allow the camera 348 to obtain one or more direct images of one or more of the sides of the phone for evaluation. For example, the apparatus 730 can be configured to hold the mobile phone 210 with the second side portion 356*b* facing toward, or at least generally toward, and/or otherwise positioned within a field of view of the camera 348, e.g., as shown in FIG. 7D. With the mobile phone 210 in this position, the camera 348 can be used to obtain one or more images of the second side portion 356*b*. These images can be used to evaluate, e.g., the location, condition, etc. of any buttons, connector ports, and/or other features on the second side portion 356*b* of the phone 210. Similarly, one or more steps of the flipping process described above with reference to FIGS. 7A-7I can be repeated to position the first side portion 356*a* in the field of view of the camera 348. For example, after the mobile phone 210 has been flipped a first time and is in the position shown in FIG. 7I, the apparatus 730 can repeat the operations described above to flip the phone over a second time to, e.g., return the mobile phone 210 to the orientation of FIG. 7A. During that process, the first side portion 356*a* of the mobile phone 210 can face toward and/or otherwise be positioned within a field of view of the camera 348. Accordingly, the camera 348 can obtain one or more images of the first side portion 356*a*. In some embodiments, the mobile phone 210 can be positioned so that the apparatus rotates the third (e.g., bottom) side portion 356*c* (FIG. 3D) about the fourth (e.g., top) side portion 356*d* (FIG. 3E) and/or the fourth side portion 356*d* about the third side portion 356*c* to, e.g., allow one or both of the third and fourth side portions 356*c,d* to be imaged by the camera 348 when the apparatus 730 flips the mobile phone 210.

FIGS. 8A-8G are a series of front views illustrating operation of a phone flipping apparatus 830 ("the apparatus 830") configured in accordance with embodiments of the present technology. The apparatus 830 can be positioned at least partially within an inspection area of a kiosk, such as the inspection area 216 of the kiosk 100 (FIGS. 1-2C) and/or the inspection area of other kiosks, and/or other suitable locations. The apparatus 830 can include a one or more support members, such as one or more plates, grates, grills, rods, and/or generally planar members 832. In the illustrated embodiment, for example, the apparatus 830 includes a first plate 832*a* and a second plate 832*b*. Each of the plates 832*a,b* can be pivotally coupled to a hinge member 834, and can have a width dimension into the page (i.e., at a right angle to the Figures) that can be the same, longer, or shorter than the length dimensions depicted in the Figures. Each of the plates 832*a,b* are also operably coupled to a drive shaft 836 that is in turn operably coupled to a drive unit, such as a motor 838 (e.g., an electric stepper motor). In response to an actuating input from the motor 838, the drive shaft 836 independently and/or selectively rotates the first plate 832*a* and/or the second plate 832*b* about the hinge member 834 (e.g., about a horizontal pivot axis defined, e.g., by the hinge member 834). In the illustrated embodiment, the apparatus 830 is positioned at least partially on the inspection tray 212 (e.g., an upper surface of the inspection tray 212). In other embodiments, the apparatus 830 can be part of (e.g., an integral part of, an upper surface or upper surface portion of, etc.) the inspection tray 212.

In operation, the mobile phone 210 can be positioned (e.g., manually positioned by a kiosk user) on one of the plates 832 with a first surface, for example, the front surface 350*a* (e.g., the display screen) facing upwardly as shown by the arrow F. In the illustrated embodiment, the mobile phone 210 is positioned on the first plate 832*a*. In other embodiments, the mobile phone 210 can be placed on the second plate 832*b*. Either or both of these positions can correspond to the mobile phone 210 undergoing electrical and/or visual inspection as described above with reference to FIG. 2B. Once the mobile phone 210 has been electrically and/or visually evaluated, the mobile phone 210 can be flipped (i.e., turned over) so that a second surface, e.g., the back surface 350*b*, of the mobile phone 210 can be visually inspected via the camera 348.

Figures 8A, 8B, 8C, 8D, 8E:
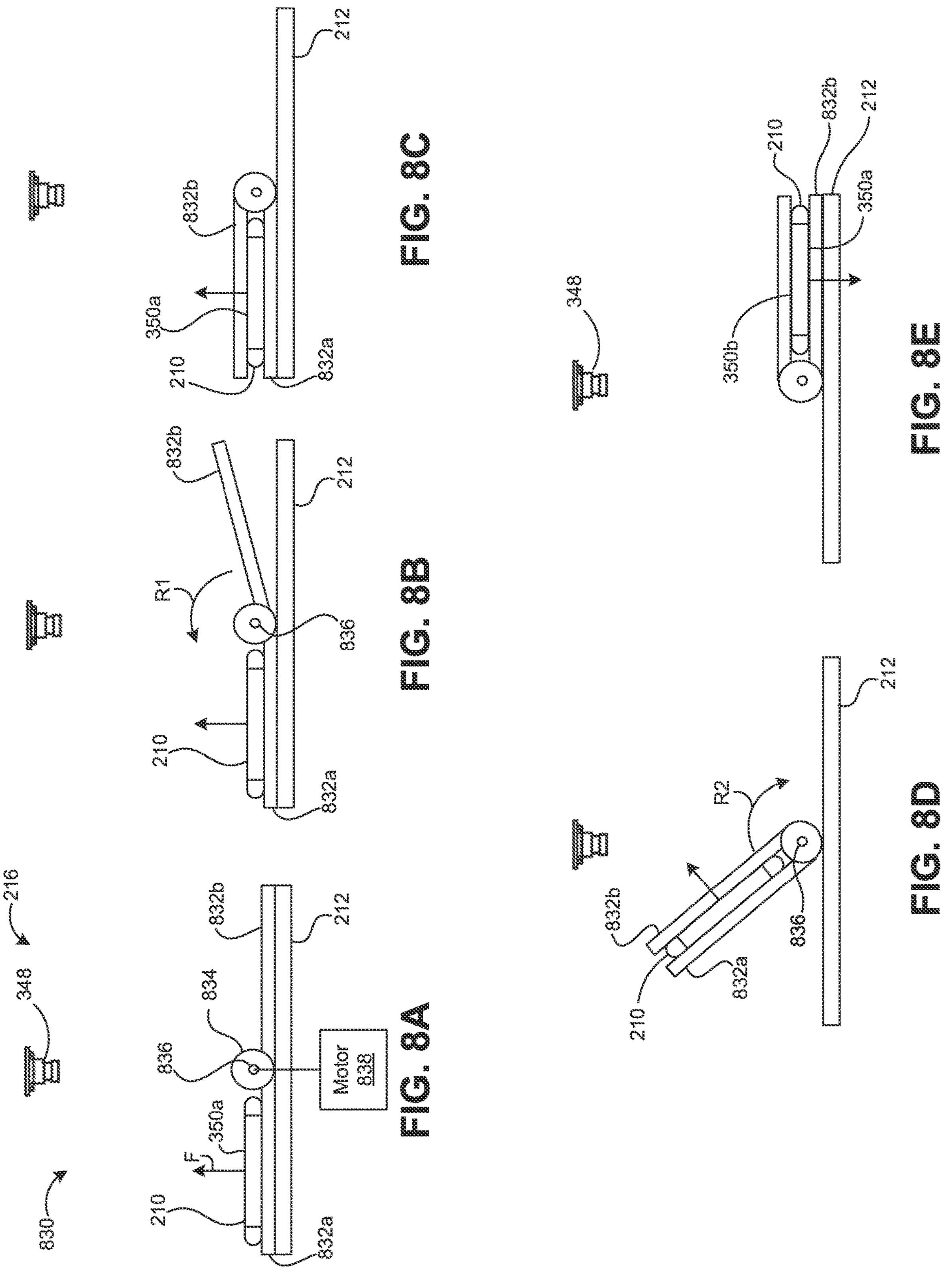
FIGS. 8A-8G are a series of partially schematic front views illustrating operation of a mobile device flipping apparatus configured in accordance with other embodiments of the present technology.

More specifically, referring next to FIG. 8B, before beginning the flipping process, the camera 348 can verify that there is a mobile phone 210 (or other electronic device) correctly positioned on the inspection tray 212 and that the phone is not too large to flip. After confirming this, the flipping process begins by rotating the second plate 832*b* (e.g., the plate on which the mobile phone 210 is not positioned) via the drive shaft 836 in a first direction R1, e.g., toward the mobile phone 210 and/or the first plate 832*a* (e.g., the plate on which the mobile phone 210 is positioned). The second plate 832*b* can rotate until the second plate 832*b* is generally or substantially parallel to the first plate 832*a*, as shown in FIG. 8C. With the second plate 832*b* in this position, the mobile phone 210 can be sandwiched or otherwise captured between the first plate 832*a* and the second plate 832*b*. In the illustrated embodiment, for example, the rotation of the second plate 832*b* can bring at least a portion of the second plate 832*b* into contact with the front surface 350*a* of the mobile phone 210.

Figure 8F:
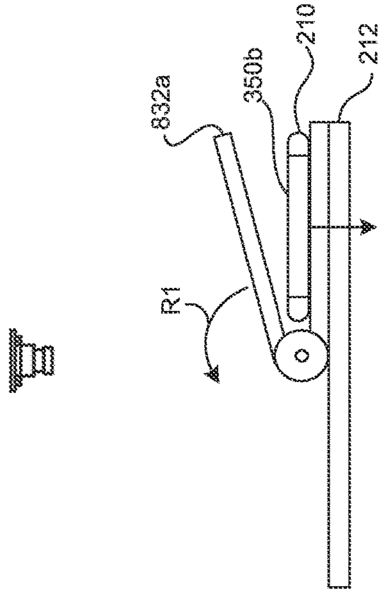
Figure 8G:
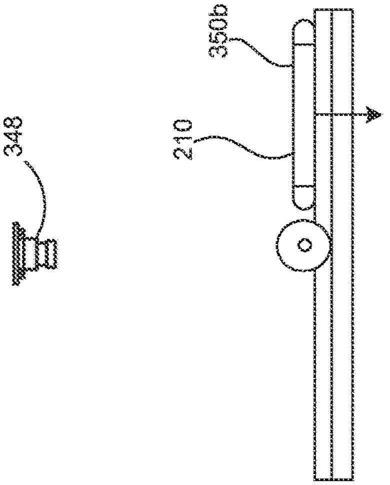

Referring next to FIG. 8D, when the mobile phone 210 is positioned between the first and second plates 832*a,b*, the first and second plates 832*a,b* can be rotated in unison in a second direction R2 about the hinge member 834 (e.g., opposite the first direction R1) via the drive shaft 836 to rotate the mobile phone 210 (about, e.g., a horizontal axis, such as the horizontal axis A of FIG. 3A). The first and second plates 832*a,b* can continue to rotate in the second direction R2 until the second plate 832*b* contacts the inspection tray 212, the front surface 350*a* of the mobile phone 210 faces toward the inspection tray 212, and/or the back surface 350*b* faces toward the camera 348, as shown in FIG. 8E. With the mobile phone 210 in this position, the first plate 832*a* can be rotated back in the first direction R1, as shown in FIG. 8F, until the first plate 832*a* contacts the inspection tray 212, e.g., to return the apparatus 830 to the starting configuration shown in FIG. 8A. Referring to FIG. 8G, continued rotation of the first plate 832*a* can uncover the back surface 350*b* of the mobile phone 210, which is within a field of view of the camera 348, such that the camera 348 can be used to inspect the back surface 350*b* of the mobile phone 210. In some embodiments, if desired for, e.g., further inspection or other processing, the phone 210 can be flipped back to the position shown in FIG. 8A by performing the process described above in reverse.

Although the apparatus 830 is illustrated in FIGS. 8A-8G is shown with a single camera 348 positioned between the first plate 832*a* and the second plate 832*b*, in other embodiments the apparatus 830 can include a first camera positioned above the first plate 832*a* and operable to visually inspect a first side of the mobile phone 210 and a second camera positioned above the second plate 832*b* and operable to visually inspect a second, opposite side of the mobile phone 210.

In some embodiments, the apparatus 830 can hold the mobile phone 210 in a partially flipped state shown to allow the camera 348 to obtain one or more direct images of one or more of the sides of the phone for evaluation. For example, the apparatus 830 can be configured to hold the mobile phone 210 with the first side portion 356*a* or the second side portion 356*b* facing toward, or at least generally toward, and/or otherwise positioned within a field of view of the camera 348. With the mobile phone 210 in this position, the camera 348 can be used to obtain one or more images of the first side portion 356*a* or the second side portion 356*b*.

These images can be used to evaluate, e.g., the location, condition, etc. of any buttons, connector ports, and/or other features on the first side portion 356*a* or the second side portion 356*b* of the phone 210. In some embodiments, the user can rotate the phone 210 and one or more steps of the flipping process described above with reference to FIGS. 8A-8G can be repeated to position the other of the first side portion 356*a* or the second side portion 356*b* in the field of view of the camera 348. In some embodiments, the mobile phone 210 can be positioned so that the apparatus rotates the third (e.g., bottom) side portion 356*c* (FIG. 3D) about the fourth (e.g., top) side portion 356*d* (FIG. 3E) and/or the fourth side portion 356*d* about the third side portion 356*c* to, e.g., allow one or both of the third and fourth side portions 356*c,d* to be imaged by the camera 348 when the apparatus 830 flips the mobile phone 210.

Figure 9A:
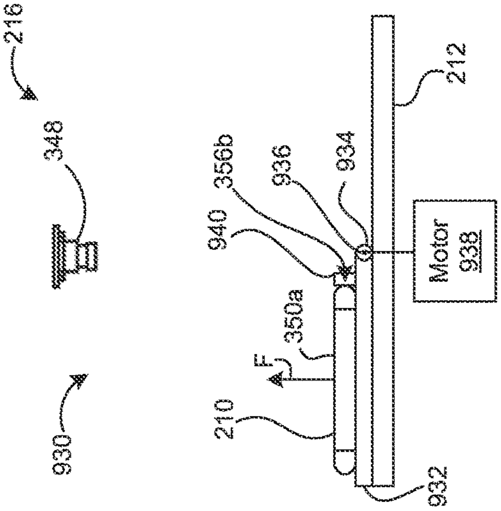
FIGS. 9A-9C are a series of partially schematic front views illustrating operation of a mobile device flipping apparatus configured in accordance with other embodiments of the present technology.
Figure 9B:
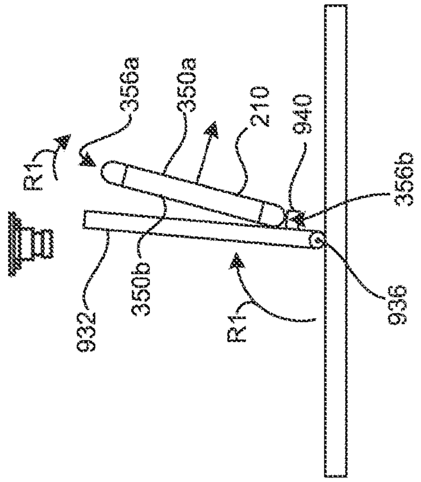
Figure 9C:
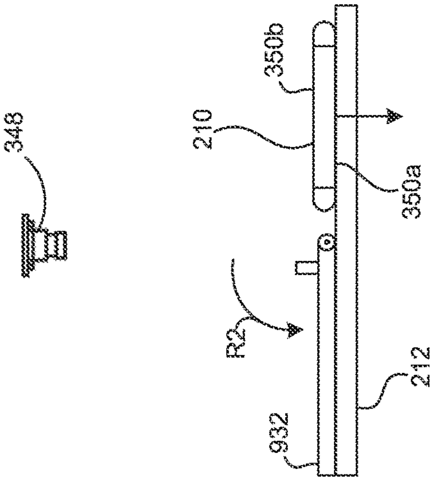

FIGS. 9A-9C are a series of front views illustrating operation of a phone flipping apparatus 930 ("the apparatus 930") configured in accordance with embodiments of the present technology. Portions of the apparatus 930 can be generally similar to the apparatus 830 of FIGS. 8A-8G, with like numbers (e.g., drive shaft 936 versus the drive shaft 836 of FIGS. 8A-8G) indicating like elements. However, in the illustrated embodiment the apparatus 930 includes a single plate 932. The single plate 932 can include a stop or wall 940, or similar feature, extending outwardly from the plate 932 and configured to support the mobile phone 210 during at least a portion of the flipping process.

Referring to FIG. 9A, before the flipping process begins, the mobile phone 210 can be positioned on the plate 932 such that one of the side portions of the mobile phone 210 contacts or nearly contacts the wall 940. In the illustrated embodiment, the second side portion 356*b* contacts the wall 940. Referring next to FIG. 9B, the flipping process can begin by rotating the plate 932 about the hinge member 934 via the drive shaft 936 in the first direction R1. The rotation of the plate 932 carries the mobile phone 210 toward a vertical position. During at least a portion of the rotation, the wall 940 prevents the mobile phone 210 from sliding or slipping off the plate 932. The rotation of the plate 932 can stop once the mobile phone 210 reaches an over-center position (e.g., when the plate 932 rotates past 90 degrees/perpendicular relative to the inspection tray 212, when the back surface 350*b* of the mobile phone 210 faces slightly upward, and/or when the front surface 350*a* faces slightly downward). When the plate 932 is in the over-center position, the mobile phone 210 continues to rotate in the first direction R1 about the wall 940, as shown in FIG. 9B. For example, the wall 940 can support at least a portion of the second side portion 356*b* of the mobile phone 210 such that the first side portion 356*a* can rotate about the second side portion 356*b* in the first direction R1. The rotation of the mobile phone 210 continues (e.g., due to gravity) until the front surface 350*a* of the mobile phone 210 contacts the inspection tray 212, as shown in FIG. 9C. With the mobile phone 210 in this position, the plate 932 rotates back in a second direction D2 (e.g., opposite the first direction D1) to return the apparatus 930 to the starting position shown in FIG. 9A, and the camera 348 can be used to visually inspect the back surface 350*b* of the mobile phone 210.

Although in FIGS. 9A-9C the mobile phone 210 is oriented such that the apparatus 930 flips the first side portion 356*a* of the mobile phone 210 about the second side portion 356*b*, it will be appreciated that the apparatus 930 is equally suitable for flipping the mobile phone 210 when the phone is in other orientations (e.g., flipping the fourth side portion about the third side portion, etc.).

FIGS. 10A-10E are a series of front views illustrating operation of a phone flipping apparatus 1030 ("the apparatus 1030") configured in accordance with embodiments of the present technology. Portions of the apparatus 1030 can be generally similar to the apparatus 830 of FIGS. 8A-8G, with like numbers (e.g., the drive shaft 836 of FIG. 8A and a drive shaft 1036) indicating like or at least generally similar elements. However, in the illustrated embodiment the apparatus 1030 includes a pivotal support member 1032 (e.g., a plate 1032) positioned laterally adjacent to the inspection tray 212, e.g., on a left side of the inspection tray 212, so that an upper surface of the plate 1032 is aligned (e.g., coplanar) with an adjacent upper surface of the inspection tray 212. In other embodiments, the plate 1032 can be positioned on the right side, or any other suitable side of the inspection tray 212. The plate 1032 can be pivotally coupled to or near an edge portion of the inspection tray 212 via a hinge member 1034. In other embodiments, the flipping plate 1032 can be spaced apart from the inspection tray 212 and/or coupled to any other suitable surface or structure within the inspection area 216. The drive shaft 1036 can be operably coupled to a motor 1038 or other driving device such that the motor 1038 can drive rotation of the flipping plate 1032 about the hinge member 1034 and relative to the inspection tray 212. (The motor 1038 is not shown in FIGS. 10B-10E for purposes of illustration.)

The apparatus 1030 can further include a pusher member or pusher 1040 movably positioned on the upper surface of the inspection tray 212. In the illustrated embodiment, for example, the pusher 1040 is initially positioned proximate a right-hand side of the inspection tray 212 opposite the plate 1032. The pusher 1040 can include a first surface 1042 (which can also be referred to as a device-moving or pushing surface) that is perpendicular or at least substantially perpendicular to the inspection tray 212, and a second surface 1044 (which can also be referred to as a device-receiving surface) that extends upwardly from the first surface 1042 at an incline and away from the flipping plate 1032. The first surface 1042 and/or the second surface 1044 can each face at least partially toward the flipping plate 1032.

The pusher 1040 can be movably positioned on (or at least proximate to) the upper surface of the inspection tray 212 and operably coupled to one or more drive units 1046, such that the one or more drive units 1046 can translate the pusher 1040 across the upper surface of the inspection tray 212. (The one or more drive units 1046 are not shown in FIGS. 10B-10E for purposes of illustration.) The one or more drive units 1046 can include a motor (e.g., an electric stepper motor) operably coupled to one or more mechanical drive elements such as worm screws, pistons, ring and pinion sets, etc.; electromechanical drive elements such as solenoids; and/or pneumatic, hydraulic, and/or any other suitable drive elements.

In operation, the mobile phone 210 can be positioned (e.g., manually positioned by a kiosk user) on the inspection tray 212 with, for example, the front surface 350*a* (e.g., the display screen) facing upwardly as shown by the arrow F, and with a side portion of the phone 210 (e.g., the second side portion 356*b*) facing toward the first surface 1042. This position can correspond to the mobile phone 210 undergoing electrical and/or visual inspection as described above with reference to, e.g., FIG. 2B. Once the mobile phone 210 has been electrically and/or visually evaluated, the mobile phone 210 can be flipped (i.e., turned over) so that the back surface 350*b* of the mobile phone 210 can be visually inspected via the camera 348.

Figures 10A, 10B, 10C, 10D, 10E:
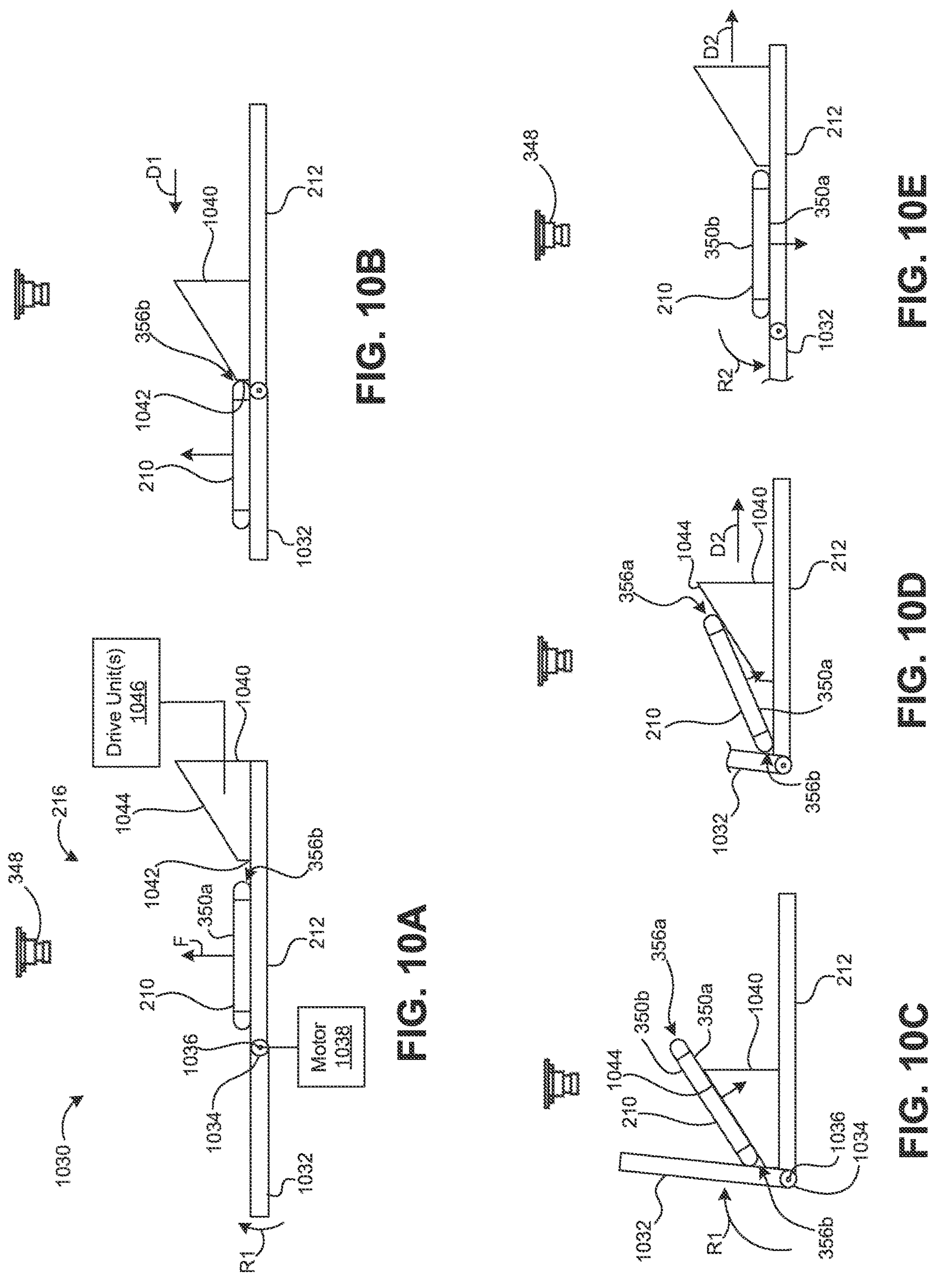
FIGS. 10A-10E are a series of partially schematic front views illustrating operation of a mobile device flipping apparatus configured in accordance with yet other embodiments of the present technology.

Referring next to FIG. 10B, the flipping process can begin by moving the pusher 1040 across the inspection tray in a first direction D1 toward the mobile phone 210 and/or the flipping plate 1032. The movement of the pusher 1040 can bring the first surface 1042 into contact with one of the side portions (e.g., the second side portion 356*b*) of the mobile phone 210. With the first surface 1042 contacting the mobile phone 210, the pusher 1040 can continue to move in the first direction D1 to slide the mobile phone 210 in the first direction D1 across the inspection tray 212. In the configuration shown in FIG. 10B, an upper surface of the inspection tray 212 can be generally or substantially coplanar with an upper surface of the flipping plate 1032, such that at least a portion of the mobile phone 210 can slide across the inspection tray 212 to rest on the flipping plate 1032. The movement of the pusher 1040 can stop when the mobile phone 210 is positioned at least partially on the flipping plate 1032, e.g., when the pusher 1040 is proximate the flipping plate 1032 and/or hinge member 1034 as shown in FIG. 10B. In some embodiments, the camera 348 can obtain an image of the position of the mobile phone 210 and transmit the image to the kiosk processor to, e.g., determine when to stop the pusher's movement.

With the mobile phone 210 and the pusher 1040 in the positions shown in FIG. 10B, the flipping plate 1032 can rotate in the first direction R1, as shown in FIG. 10C. The rotation of the flipping plate 1032 rotates the mobile phone 210 (about, e.g., a horizontal axis, such as the horizontal axis A of FIG. 3A). For example, because the first surface 1042 of the pusher 1040 is proximate (e.g., adjacent to but spaced slightly apart from) the hinge member 1034 and contacting the second side portion 356*b* of the mobile phone 210, the rotation of the flipping plate 1032 rotates the first side portion 356*a* of the mobile phone 210 about the second side portion 356*b*. The flipping plate 1032 can continue to rotate in the first direction R1 until the flipping plate 1032 and/or the mobile phone 210 are in an over-center position. The flipping plate 1032 may stop rotating once it reaches the over-center position (e.g., as shown in FIG. 10C), but the mobile phone 210 can continue to rotate in the first direction D1 until the front surface 350*a* at least partially contacts the second surface 1044 of the pusher 1040, as shown in FIG. 10C.

In some embodiments, the apparatus 1030 can include one or more sensors (not shown) operable to detect whether the mobile phone 210 is stuck or "pinched" between the flipping plate 1032 and the first surface 1042 during the flipping process. For example, the motor 1038 and/or the drive shaft 1036 can be each be coupled to a respective force sensor (e.g., a strain gauge, a torque sensor, etc.) operable to detect one or more forces (e.g., strain, torque, etc.) on the drive shaft 1036 associated with the mobile phone 210 being stuck between the flipping plate 1032 and the first surface 1042. Additionally, or alternatively, the camera 348 can be used to monitor the mobile phone 210 during the flipping process and verify that the mobile phone 210 rotates as described herein. If the mobile phone 210 does become stuck between the flipping plate 1032 and the first surface 1042, the apparatus 1030 can attempt to free the mobile phone 210 by reversing the rotational direction of the flipping plate 1032 (e.g., rotating the flipping plate 1032 in a second direction R2 (FIG. 10E) opposite the first direction R1) and/or moving the pusher 1040 away from the flipping plate 1032 (e.g., moving the pusher 1040 in a second direction D2 (FIG. 10D) opposite the first direction D1). Additionally, or alternatively, the apparatus 1030 can return to the starting position shown in FIG. 10A and/or the kiosk 100 can prompt the user to reposition the mobile phone 210 manually.

When the front surface 350*a* of the mobile phone 210 is contacting the second surface 1044 of the pusher 1040 as shown in FIG. 10C, the flipping process can continue by moving the pusher 1040 in a second direction D2 opposite the first direction D1. The second surface 1044 can be inclined or angled to cause the mobile phone 210 to slide along the second surface 1044 in response to this movement of the pusher 1040, as shown in FIG. 10D. The plate 1032 can remain in the over-center or rotated position of FIG. 10C, e.g., contacting the mobile phone 210 and keeping the mobile phone 210 from sliding back in the direction D1. In the illustrated embodiment, for example, the flipping plate 1032 contacts the second side portion 356*b* of the mobile phone 210 and at least partially or fully prevents the mobile phone 210 from sliding along the second surface 1044 unless or until the pusher 1040 completes its movement in the second direction D2. As the pusher 1040 moves in the second direction D2, the front surface 350*a* and/or the first side portion 356*a* of the mobile phone 210 can slide downwardly across the second surface 1044 and/or the second side portion 356*b* can slide downwardly along the flipping plate 1032. This movement of the mobile phone 210 can continue until the back surface 350*b* is facing toward the camera 348, and/or the front surface 350*a* is contacting and/or facing toward the inspection tray 212, as shown in FIG. 10E. With the mobile phone 210 in this position, the camera 348 can visually inspect the back surface 350*b* of the mobile phone 210. Additionally, the flipping plate 1032 can rotate in a second direction D2 (e.g., opposite the first direction D1) to return the apparatus 1030 to the starting position shown in FIG. 10A. In some embodiments, if desired for, e.g., further inspection or other processing, the phone 210 can be flipped back the position shown in FIG. 10A by repeating the process described above.

Although in FIGS. 10A-10E the mobile phone 210 is oriented such that the apparatus 1030 flips the first side portion 356*a* of the mobile phone 210 about the second side portion 356*b*, it will be appreciated that the apparatus 1030 is equally suitable for flipping the mobile phone 210 when the phone is in other orientations (e.g., flipping the fourth side portion about the third side portion, etc.).

In some embodiments, the apparatus 1030 can hold the mobile phone 210 in a partially flipped state to allow the camera 348 to obtain one or more direct images of one or more of the sides of the phone for evaluation. For example, the apparatus 1030 can be configured to hold the mobile phone 210 with the first side portion 356*a* facing toward, or at least generally toward, and/or otherwise positioned within a field of view of the camera 348. With the mobile phone 210 in this position, the camera 348 can be used to obtain one or more images of the first side portion 356*a*. These images can be used to evaluate, e.g., the location, condition, etc. of any buttons, connector ports, and/or other features on the first side portion 356*a* of the phone 210. Similarly, one or more steps of the flipping process described above with reference to FIGS. 10A-10E can be repeated to position the second side portion 356*b* in the field of view of the camera 348. For example, after the mobile phone 210 has been flipped a first time and is in the position shown in FIG. 10E, the apparatus 1030 can repeat the operations described above to flip the phone over a second time to, e.g., return the mobile phone 210 to the orientation of FIG. 10A. During that process, the second side portion 356*b* of the mobile phone 210 can face toward and/or otherwise be positioned within a field of view of the camera 348. Accordingly, the camera 348 can obtain one or more images of the second side portion 356*b*. In some embodiments, the mobile phone 210 can be positioned so that the apparatus 1030 rotates the third (e.g., bottom) side portion 356*c* (FIG. 3D) about the fourth (e.g., top) side portion 356*d* (FIG. 3E) and/or the fourth side portion 356*d* about the third side portion 356*c* to, e.g., allow one or both of the third and fourth side portions 356*c,d* to be imaged by the camera 348 when the apparatus 1030 flips the mobile phone 210.

FIGS. 11A-11G are a series of side views illustrating operation of a phone flipping apparatus 1130 ("the apparatus 1130") configured in accordance with embodiments of the present technology. The apparatus 1130 can be positioned at least partially within an inspection area of a kiosk, such as the inspection area 216 of the kiosk 100 (FIGS. 1-2C) and/or other kiosks, and/or other suitable locations. In this embodiment, the apparatus 1130 includes a flexible belt 1132 positioned on or slightly above the inspection tray 212. In the illustrated embodiment, the belt 1132 includes a plurality of ribs, ridges, or teeth 1134 configured to grip or otherwise help prevent the mobile phone 210 from slipping or moving on the belt 1132, e.g., to cause the mobile phone 210 to move in response to movement of the belt 1132. In other embodiments, the belt 1132 can be formed from a material (e.g., Teflon) having a coefficient of friction sufficient to at least partially prevent the mobile phone 210 from slipping relative to the belt 1132. The belt 1132 can be operably wound about a first roller 1136*a* positioned toward one end portion of the belt 1132 and a second roller 1136*b* positioned toward an opposite, second end portion of the belt 1132, and each of the rollers 1136*a,b* can include a corresponding drive shaft 1138*a,b* operably coupled to a corresponding motor 1140*a,b*.

The apparatus 1130 can further include a ramp member 1142. The ramp member 1142 can be a positioned toward one side (e.g., a left side, a right side, etc.) of the inspection tray 212. In the illustrated embodiment, the ramp member 1142 includes a concave curved surface 1144 that faces toward the belt 1132. In some embodiments, a lower portion of the ramp member 1142 (e.g., a portion proximate the inspection tray 212) can include a sloped surface 1146 that extends toward the belt 1132. In these and other embodiments, the ramp member 1142 can optionally be configured to rotate about a pivot shaft 1148 located near the lower portion of the ramp member 1142.

In operation, the mobile phone 210 can be placed on the belt 1132 with a first surface, e.g., the front surface 350*a*, of the mobile phone 210 facing upwardly, e.g., in the direction indicated by the arrow F and/or towards the camera 348. In the illustrated embodiment, for example, the mobile phone 210 is placed on the ribs 1134 of the belt 1132. By way of example, this position can correspond to the mobile phone 210 undergoing electrical inspection and/or the front surface 350*a* of the mobile phone 210 undergoing visual inspection, as shown in FIG. 2B. Once the mobile phone 210 has been electrically evaluated and/or the front surface 350*a* has been visually evaluated, the mobile phone 210 can be flipped (i.e., turned over) so that the back surface 350*b* of the mobile phone 210 can be visually inspected via the camera 348. In other embodiments, the phone 210 can initially be placed on the belt 1132 with the front surface 350*a* facing downward and the back surface 350*b* facing upward, and then flipped so that the front surface 350*a* faces upward and the back surface 350*b* faces downward. Accordingly, it will be understood that, in some embodiments, the inspection/flipping process can begin with the front surface 350*a* of the phone 210 facing either direction.

Figure 11B:
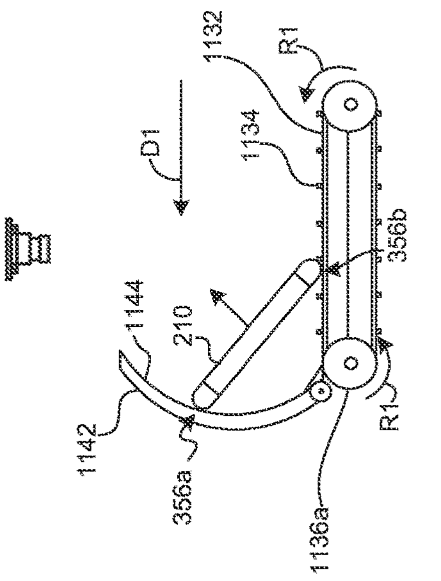
FIGS. 11A-11G are a series of partially schematic front views illustrating operation of a mobile device flipping apparatus configured in accordance with still other embodiments of the present technology.
Figure 11D:
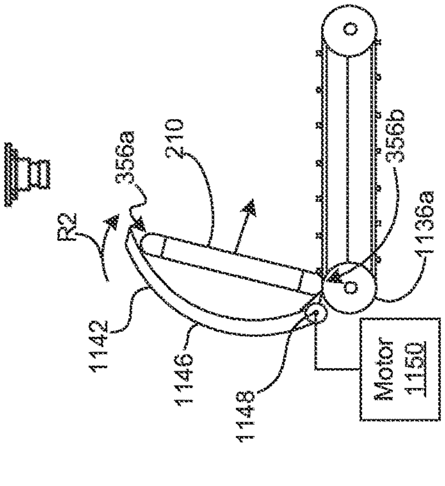
Figure 11A:
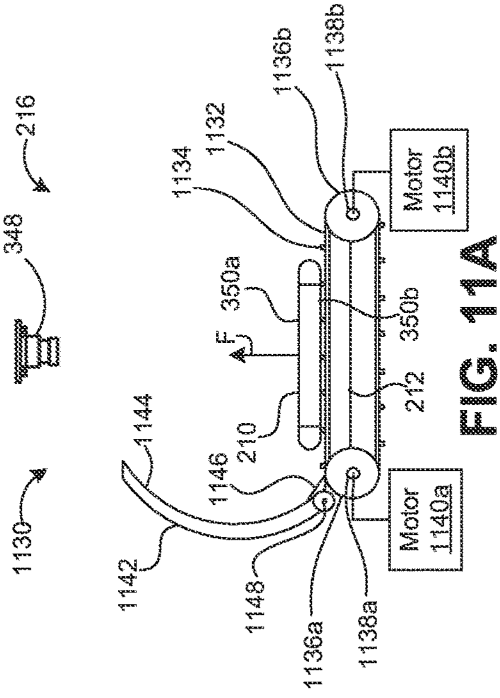
Figure 11C:
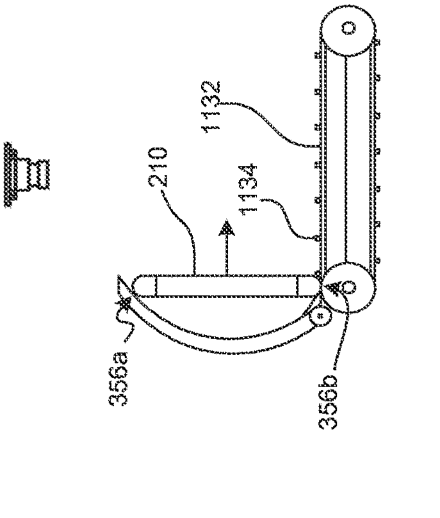

Referring next to FIG. 11B, before beginning the flipping process, the camera 348 can verify that there is a mobile phone 210 (or other electronic device) positioned on the inspection tray 212 in the proper or desired orientation and that the phone is not too large to flip. After confirming this, the flipping process begins by moving the belt 1132 in a first direction D1 toward the ramp member 1142 by rotating the first roller 1136*a* in a first direction R1 by means of the first motor 1140*a*. When the first motor 1140*a* is actively winding the belt 1132 about the first roller 1136*a*, the second motor 1140*b* can be passive (e.g., disengaged) to allow the second roller 1136*b* to payout the belt 1132. As shown in FIG. 11B, the movement of the belt 1132 causes the mobile phone 210 to move toward the ramp member 1142 such that at least a portion of the mobile phone 210 can contact the ramp member 1142. In the illustrated embodiment, for example, belt 1132 (e.g., at least one of the ribs 1134) contacts the second side portion 356*b* of the mobile phone 210 and drives the first side portion 356*a* of the mobile phone 210 upwardly along the curved surface 1144 of the ramp member 1142. The movement of the mobile phone 210 can continue until the mobile phone 210 is in a vertical or near vertical orientation, such as shown in FIG. 11C. In some embodiments, with the mobile phone 210 in this position, the ramp member 1142 can pivot in a second direction R2 about the pivot shaft 1148, as shown in FIG. 11D. In the illustrated embodiment, for example, the pivot shaft 1148 is operably coupled to a motor 1150 configured to drive rotation of the ramp member 1142 (e.g., about the pivot shaft 1148) in the direction R2. This rotation of the ramp member 1142 causes a corresponding rotation of the mobile phone 210 (about, e.g., a horizontal axis, such as the horizontal axis A of FIG. 3A), e.g., rotating the first side portion 356*a* in the second direction R2 and about the second side portion 356*b*. In other embodiments, the ramp member 1142 can remain stationary, and the ramp member 1142 can be shaped and/or positioned (e.g., like that shown in FIG. 11D) such that the belt 1132 can move the mobile phone 210 into an over-center position and cause the phone 210 to rotate about the second side portion 356*b* as shown in FIG. 11D without any movement of the ramp member 1142. Additionally, or alternatively, the belt 1132 can drive at least part of the second side portion 356*b* of the mobile phone 210 onto the sloped surface 1146, and the sloped surface 1146 can be angled so as to cause the first side portion 356*a* of the mobile phone 210 to rotate about the second side portion 356 in the second direction R2, e.g., without rotating the ramp member 1142.

Figure 11E:
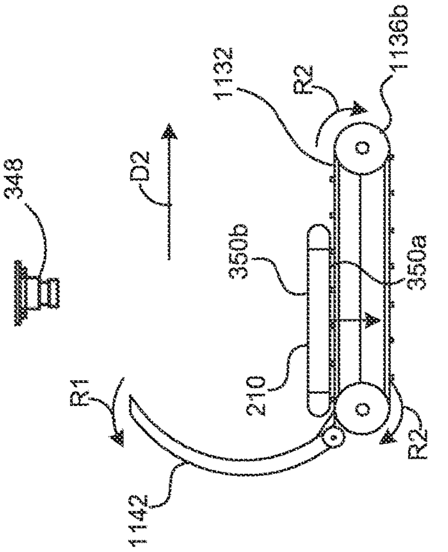

The rotation of the mobile phone 210 in the second direction R2 causes at least a portion of the front surface 350*a* of the mobile phone to contact the belt 1132 (e.g., the belt ribs 1134) such that the back surface 350*b* is facing upwardly and/or toward the camera 348, as shown in FIG. 11E. With the mobile phone 210 in this position, the camera 348 can be used to visually inspect the back surface 350*b* of the mobile phone 210. Additionally, the belt 1132 can be moved if needed to position the phone 210 in a desired field of view for the camera. In embodiments in which the ramp member 1142 is pivotable, the ramp member 1142 can be pivoted in the first direction R1 (e.g., opposite the second direction R2) to return the ramp member 1142 to the starting position shown in FIGS. 11A-C.

Figure 11F:
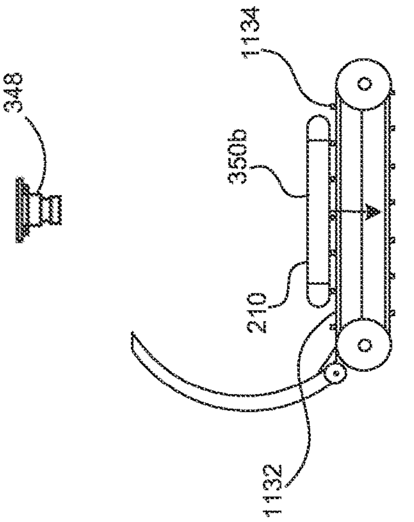
Figure 11G:
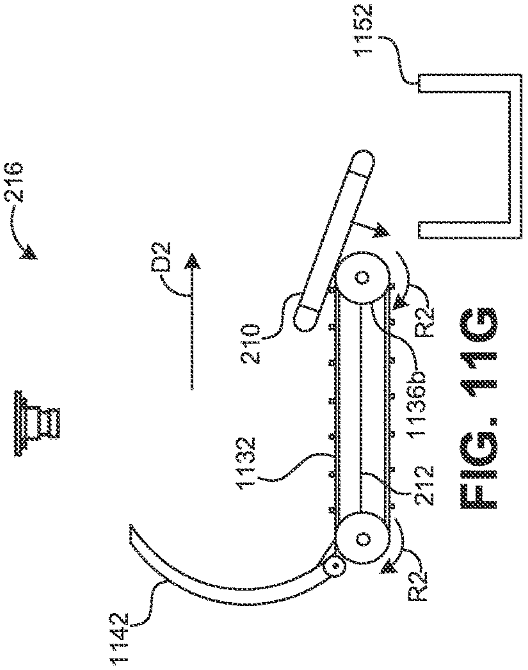

Optionally, the apparatus 1130 can be used to center or otherwise align the back surface 350*b* of the mobile phone 210 relative to the camera 348. Referring to FIG. 11F, the belt 1132 can be moved in the second direction D2 by rotating the second roller 1136*b* in the first direction R2 by means of the second motor 1140*b* (FIG. 11A) to center the back surface 350*b* relative to the camera 348. In some embodiments, if desired for, e.g., further inspection or other processing, the phone 210 can be flipped back to the position shown in FIG. 11A by repeating the process described above.

Additionally, or alternatively, the belt 1132 can optionally be used to bin the mobile phone 210 for storage (e.g., after the back surface 350*b* is evaluated) and/or to otherwise remove the mobile phone 210 from the inspection area 216, in addition to or in lieu of rotating the inspection tray 212 to bin the mobile phone 210, as described regarding FIG. 2C. For example, referring to FIG. 11G, a device bin or receptacle 1152 can be positioned below the inspection tray 212 and toward a side of the inspection tray 212 opposite the ramp member 1142. The second roller 1136*b* can be rotated in the second direction R2 to move the belt 1132 in the second direction D2 until the mobile phone 210 passes over the edge of the inspection tray 212 and falls into the receptacle 1152.

Although in FIGS. 11A-11G the mobile phone 210 is oriented such that the apparatus 1130 flips the first side portion 356*a* of the mobile phone 210 about the second side portion 356*b*, it will be appreciated that, the apparatus 1130 is equally suitable for flipping the mobile phone 210 when the phone is in other orientations (e.g., flipping the fourth side portion about the third side portion, etc.).

Figure 12A:
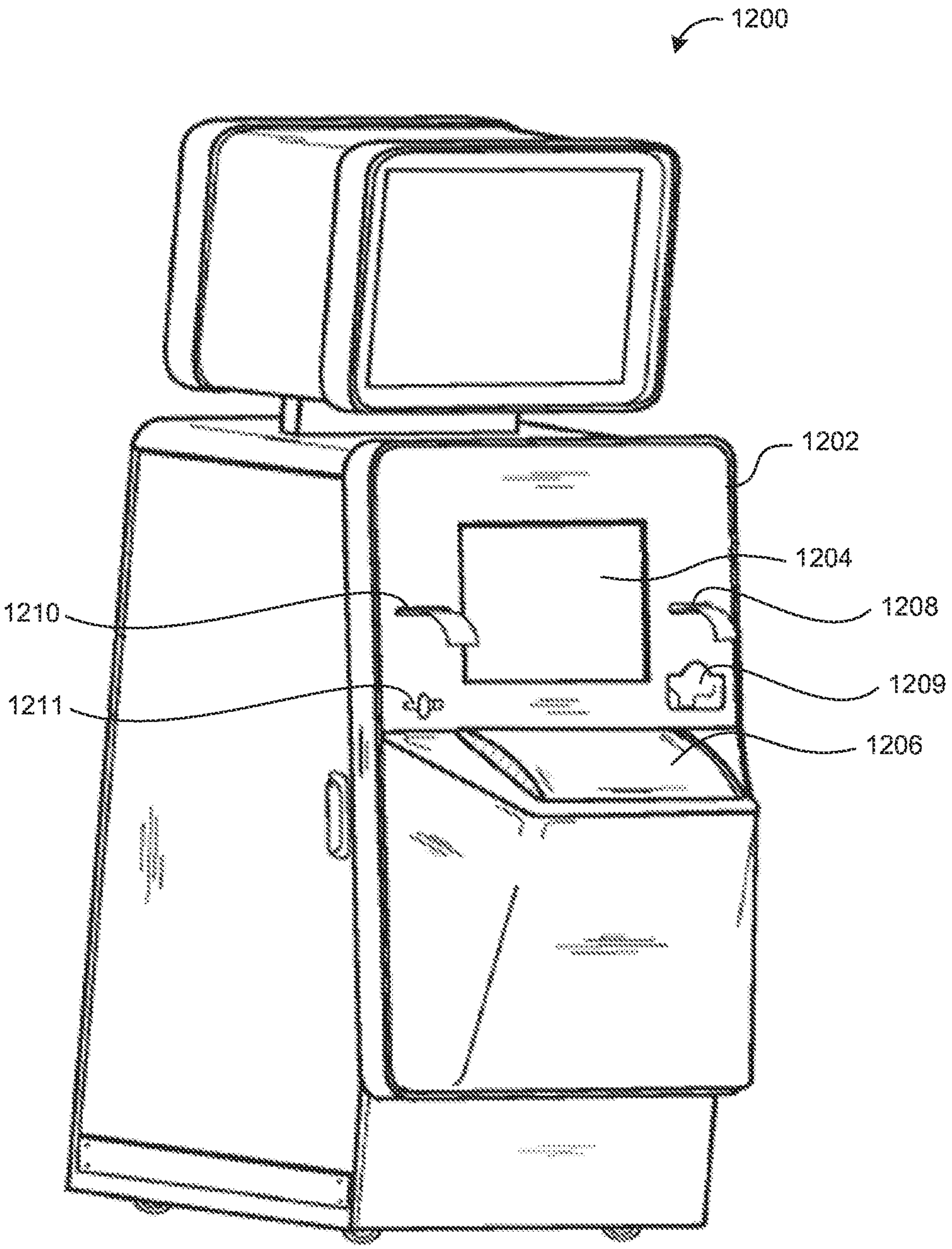
FIG. 12A is an isometric view of another consumer operated kiosk that can include a mobile device flipping apparatus configured in accordance with embodiments of the present technology.
Figure 12C:
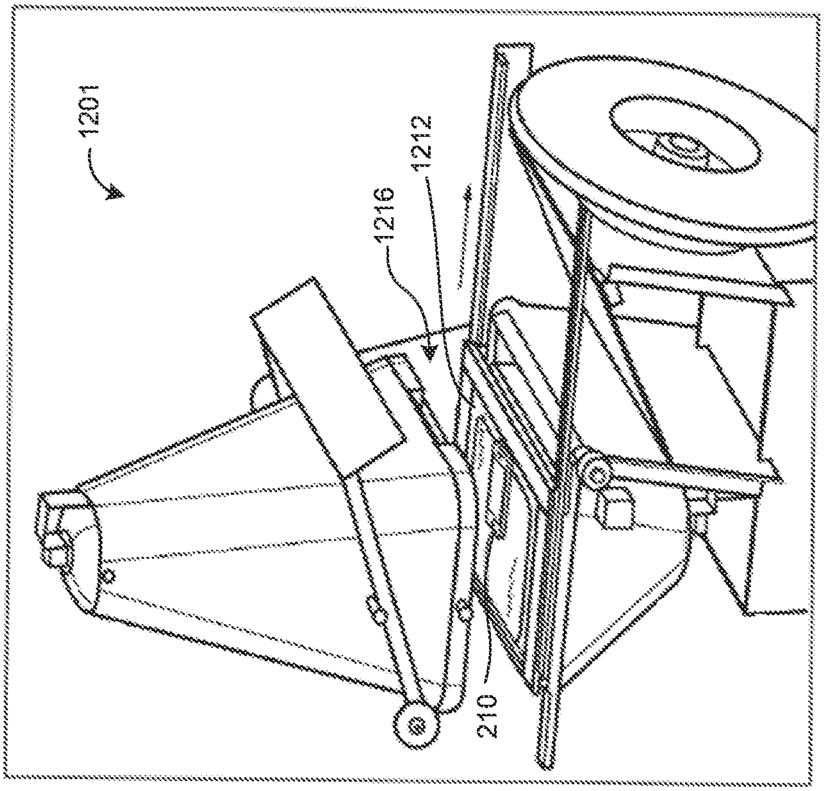
FIGS. 12B and 12C are isometric views of selected internal components and systems of the consumer operated kiosk of FIG. 12A.
Figure 12B:
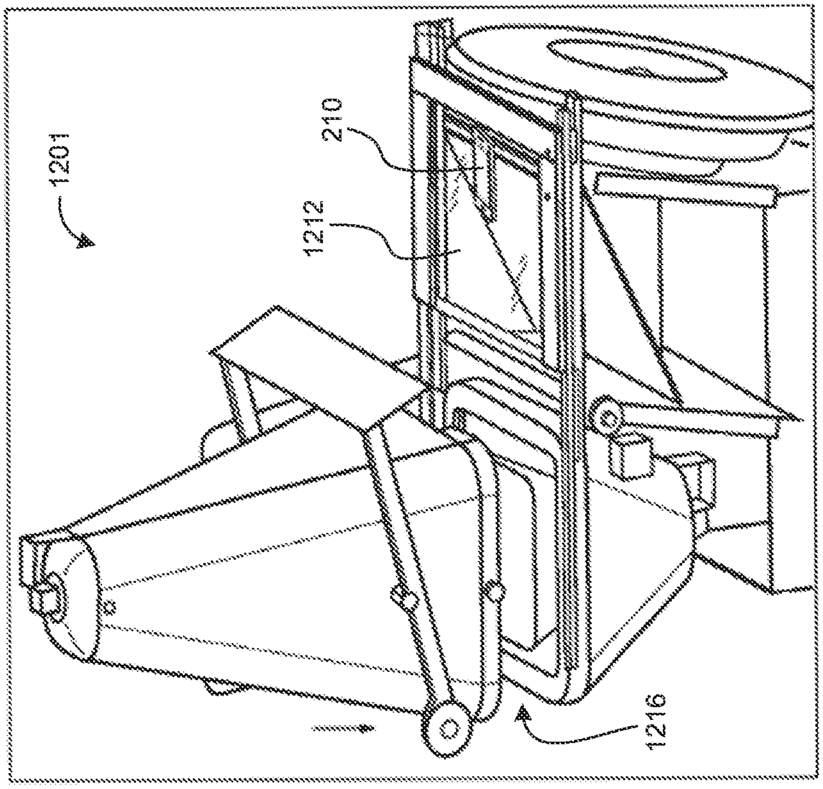
Figure 13A:
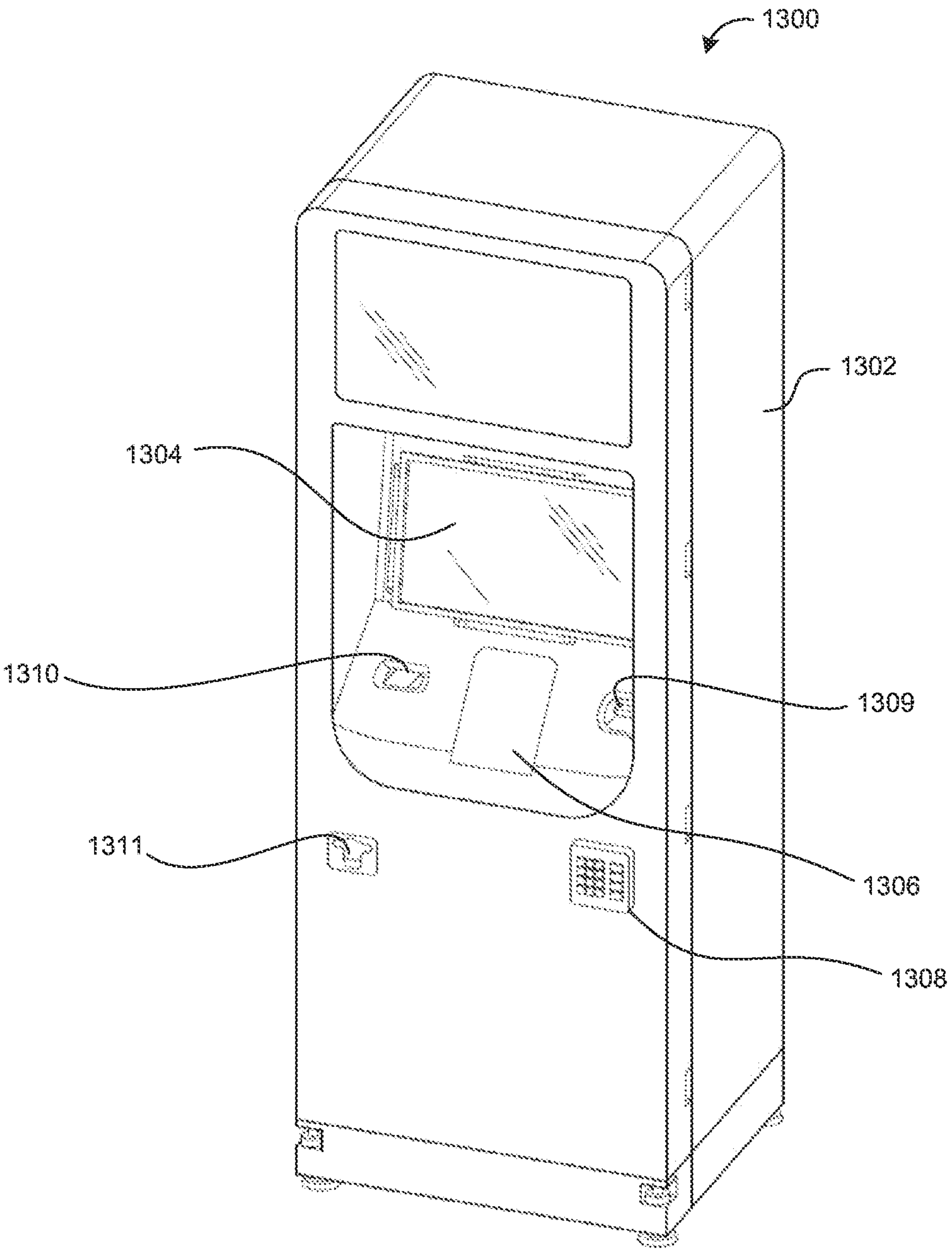
FIG. 13A is an isometric view of yet another consumer operated kiosk that can include a mobile device flipping apparatus configured in accordance with embodiments of the present technology.
Figure 13C:
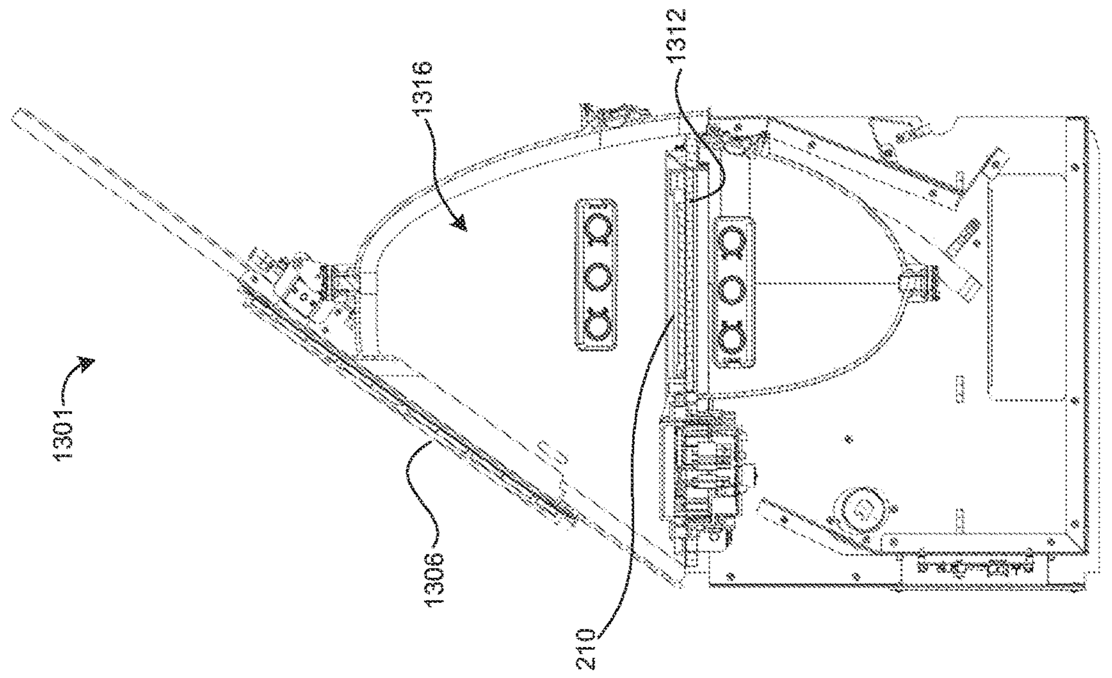
FIG. 13C is a side cross-sectional view of the selected internal components and systems of FIG. 13B.
Figure 13B:
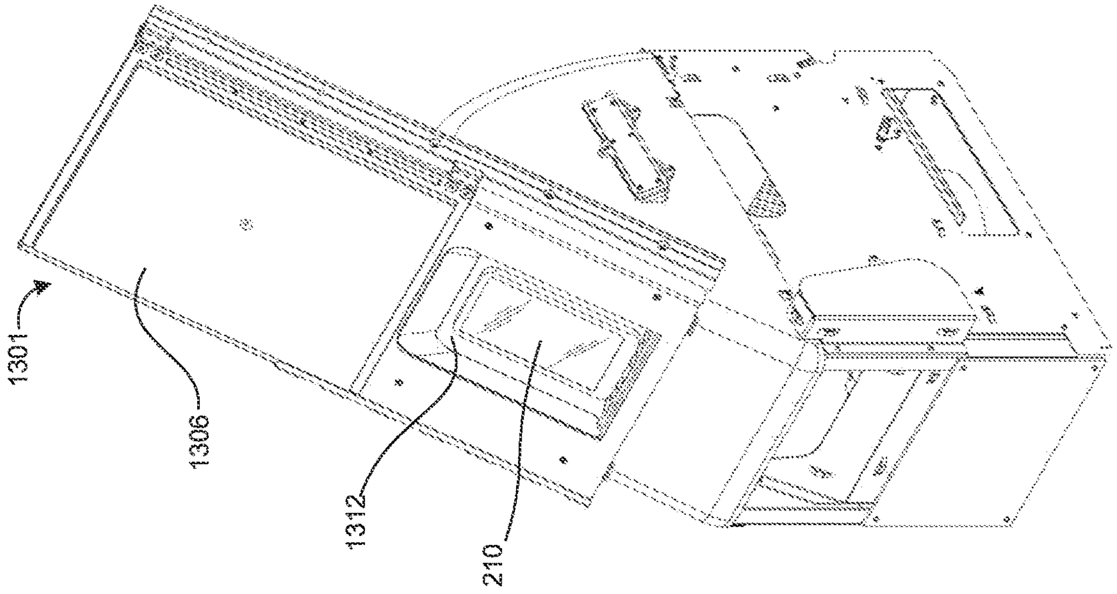
FIG. 13B is an isometric view of selected internal components and systems of the consumer operated kiosk of FIG. 13A.

Although the flipping apparatuses 330, 430, 530, 630, 730, 830, 930, 1030, 1130 are described in the context of an inspection area of a kiosk, e.g., the inspection area 216 of the kiosk 100 (FIGS. 1-2C), it is contemplated that each of the flipping apparatuses 330, 430, 530, 630, 730, 830, 930, 1130 described herein can be used in other suitable kiosks, such as embodiments of the kiosk 1200 of FIGS. 12A-12C, the kiosk 1300 of FIGS. 13A-13C, and/or any of the kiosks described in detail in the patents and patent applications identified herein and incorporated herein by reference in their entireties, and/or any other suitable kiosks and, in some embodiments, in other machines, locations, etc.

FIG. 12A is an isometric view of another consumer operated kiosk 1200 for purchasing, recycling, or otherwise processing mobile phones and other electronic devices received from users, configured in accordance with embodiments of the present technology. In some embodiments, the kiosk 1200 includes an enclosure or housing 1202 that supports a display screen 1204 positioned above an inspection area access door 1206. The access door 1206 provides access to the kiosk's inspection area 216 (FIGS. 12B and 12C). A plurality of user interface devices are provided on a front portion of the housing 1202 for providing instructions and other information to users, and/or for receiving user inputs and other information from users. Additionally, or alternatively, the kiosk 1200 can include a separate keyboard or keypad for receiving user inputs. The kiosk 1200 can additionally include a label printer 1208, a voucher dispenser 1209, a receipt printer 1210, and a cash or card dispenser 1211. The exterior housing may also have a thumbprint reader.

FIGS. 12B and 12C are isometric views of an interior or interior portion 1201 of the consumer operated kiosk 1200 of FIG. 12A. The interior 1201 can include an inspection tray 1212 configured to receive electronic devices, such as the mobile phone 210. The inspection tray 1212 is configured to translate within the interior 1201 of the kiosk 1200. For example, the inspection tray 1212 is movable between a first position (FIG. 12B) for receiving the mobile phone 210 and a second position (FIG. 12C) in which the inspection tray 1212 is positioned at least partially within an inspection area 1216. It is expected and/or contemplated that embodiments of the kiosk 1200 and/or other kiosks having similar configurations can include any of the flipping apparatuses (not shown in FIGS. 12B and 12C) described herein positioned, e.g., on or proximate to the inspection tray 1212, and that the mobile phone 210 can be flipped when the inspection tray 1212 is in the first position, the second position, an intermediate position between the first and second positions, and/or any other suitable position. By way of example, in operation, a user can place the mobile phone 210 on the inspection tray 1212 (via, e.g., the access door 1206 of FIG. 12A) while the inspection tray 1212 is in the first position, and the inspection tray 1212 can be moved to the second position in the inspection area 1216 so that the upward-facing side of the mobile phone 210 can be visually evaluated by one or more cameras positioned above, or at least generally above, the mobile phone 210. In some embodiments, the mobile phone 210 can then be turned over by the flipping apparatus so that the opposite side of the mobile phone 210 is facing upward and can be visually evaluated by the one or more cameras. In some embodiments, turning the mobile phone 210 over in this manner illuminates the need for the inspection tray to be transparent and/or for any additional cameras to be positioned beneath the inspection tray to visually evaluate the downward-facing side of the phone 210.

Additional details regarding embodiments of the kiosk 1200 can be found in one or more of the patents and patent applications identified herein and incorporated herein by reference in their entireties.

FIG. 13A is an isometric view of another consumer operated kiosk 1300 for purchasing mobile electronic devices from users, configured in accordance with an embodiment. In some embodiments, the kiosk 1300 can include a housing 1302 and one or more user interface devices configured to facilitate use of the kiosk 1300. The user interface devices can include a keypad 1308, an ID card reader 1309, a payment dispenser 1310, a receipt dispenser 1311, and/or other user interface devices (e.g., a thumbprint scanner) to facilitate the electronic device purchase process. As illustrated, the kiosk 1300 can also include one or more displays 1304. The one or more displays 1304 can include touch-screen capability for receiving user inputs in response to displayed prompts, etc. The kiosk 1300 can also include an access door 1306 which can retract to permit the user to submit their electronic device (not shown) for evaluation.

FIG. 13B is an isometric view of an interior or interior portion 1301 of the consumer operated kiosk 1300 of FIG. 13A. The mobile phone 210 can be positioned on an inspection tray 1312 so that a display of the mobile phone 210 is facing outwardly toward the user. The access door 1306 can then be lowered over the mobile phone 210, e.g., to prevent the user from accessing the mobile phone 210 during the evaluation process.

FIG. 13C is a side cross-sectional view of the interior 1301 of the consumer operated kiosk 1300 of FIG. 13B. It is expected and/or contemplated that embodiments of the kiosk 1300 and/or other kiosks having similar configurations can include any of the flipping apparatuses (not shown in FIG. 13C) described herein. By way of example, in operation, with the mobile phone 210 positioned on the inspection tray 1312, the inspection tray 1312 can be rotated (e.g., rearwardly) to a horizontal position in which a first side (e.g., the upwardly-facing side) of the mobile phone 210 can be visually evaluated by one or more cameras positioned above, or at least generally above, the phone 210. In some embodiments, the flipping apparatus can then turn the mobile phone 210 over so that a second, opposite side of the mobile phone 210 can be visually inspected by the one or more cameras.

Additional details regarding embodiments of the kiosk 1300 can be found in the patents and patent applications identified herein and incorporated herein by reference in their entireties.

As those of ordinary skill in the art will appreciate, the foregoing apparatuses are but some examples of ways in which a kiosk can be used to purchase, recycle or otherwise process consumer electronic devices such as mobile phones. Additionally, it should be understood that the configuration of the kiosks 100, 1200, 1300 described above are but examples of suitable mobile device evaluation, purchasing, and/or recycling systems that can be used with embodiments of the present technology. Accordingly, other embodiments of the present technology can use other systems without departing from the present disclosure. Although the foregoing examples are described in the context of mobile phones, it should be understood that the apparatuses, kiosks, and various embodiments thereof described herein can also be used in a similar manner for recycling virtually any consumer electronic device, such as MP3 players, tablet computers, laptop computers, e-readers, PDAs, Google® Glass™, smartwatches, and other portable or wearable devices, as well as other relatively non-portable electronic devices such as desktop computers, printers, televisions, DVRs, devices for playing games, entertainment or other digital media on CDs, DVDs, Blu-ray, etc. Moreover, although the foregoing examples are described in the context of use by a consumer, the apparatuses and/or kiosks described herein and various embodiments thereof can similarly be used by others, such as a store clerk, technician, etc. to assist in recycling, selling, exchanging, etc. electronic devices.

Although many embodiments of the present technology are described herein in the context of mobile phones, aspects of the present technology are not limited to mobile phones and generally apply to other consumer electronic devices. Such devices include, as non-limiting examples, all manner of mobile phones; smartphones; handheld devices; personal digital assistants (PDAs); MP3 or other digital music players; tablet, notebook, ultrabook and laptop computers; e-readers all types of cameras GPS devices; set-top boxes; universal remote controls; wearable computers; etc. In some embodiments, it is contemplated that the kiosk 100 can facilitate selling and/or otherwise processing larger consumer electronic devices, such as desktop computers, TVs, game consoles, etc., as well smaller electronic devices such as Google® Glass™, smartwatches (e.g., the Apple Watch™, Android Wear™ devices such as the Moto 360®, or the Pebble Steel™ watch), etc. Embodiments of the kiosk 100 and various features thereof can be at least generally similar in structure and function to the systems, methods and corresponding features described in the following patents and patent applications, which are incorporated herein by reference in their entireties: U.S. Pat. Nos. 11,482,067, 11,462,868, 11,080,672, 10,860,990, 10,853,873, 10,572,946, 10,475,002; 10,445,708; 10,438,174; 10,417,615; 10,401,411; 10,269,110; 10,127,647; 10,055,798; 9,885,672; 9,881,284; 8,200,533; 8,195,511; and 7,881,965; U.S. patent application Ser. Nos. 17/811,548, 17/645,039, 17/445,799; 17/445,821; 17/445,799; 17/445,178; 17/445,158; 17/445,083; 17/445,082; 17/125,994; 16/794,009; 16/719,699; 16/794,009; 16/534,741; 15/057,707; 14/967,183; 14/964,963; 14/663,331; 14/660,768; 14/598,469; 14/568,051; 14/498,763; 13/794,816; 13/794,814; 13/753,539; 13/733,984; 13/705,252; 13/693,032; 13/658,828; 13/658,825; 13/492,835; 13/113,497; U.S. Provisional Application Nos. 63/365,778, 63/267,911, 63/220,890, 63/220,381, 63/127,148, 63/116,020; 63/116,007; 63/088,377; 63/070,207; 63/066,794; 62/950,075; 62/807,165; 62/807,153; 62/804,714; 62/782,947; 62/782,302; 62/332,736; 62/221,510; 62/202,330; 62/169,072; 62/091,426; 62/090,855; 62/076,437; 62/073,847; 62/073,840; 62/059,132; 62/059,129; 61/607,572; 61/607,548; 61/607,001; 61/606,997; 61/595,154; 61/593,358; 61/583,232; 61/570,309; 61/551,410; 61/472,611; 61/347,635; 61/183,510; and 61/102,304. All the patents and patent applications listed in the preceding sentence and any other patents or patent applications identified herein are incorporated herein by reference in their entireties.

EXAMPLES

Several aspects of the present technology are described with reference to the following examples:

1. An apparatus for moving an electronic device in a kiosk, the apparatus comprising:
   a support surface configured to support the electronic device in a first orientation facing a first direction; and
   a gripper operably positioned toward a side of the support surface;
   wherein
   the gripper is operable to engage a side portion of the electronic device, move the electronic device upwardly and away from the support surface, rotate the electronic device to a second orientation in which the electronic device faces a second direction, opposite the first direction, and move the electronic device downwardly and toward the support surface.
2. The apparatus of example 1 wherein the gripper is operable to rotate the electronic device from the first orientation to the second orientation about an axis that is at least generally parallel to the support surface.
3. The apparatus of example 1 or example 2, further comprising a spacer positioned on the support surface, wherein the spacer is configured to position the electronic device above the support surface and define a gap between the side portion of the electronic device and the support surface, and wherein at least a portion of the gripper is positionable in the gap to engage the side portion of the electronic device.
4. The apparatus of any of examples 1-3 wherein the gripper includes an angled ramp portion on a distal edge thereof, wherein the ramp portion is configured to be inserted between the electronic device and the support surface to facilitate engaging the gripper with the side portion of the electronic device.
5. The apparatus of any of examples 1-4 wherein the gripper is configured to move toward the electronic device to engage the side portion of the electronic device.

6. The apparatus of any of examples 1-5, further comprising:
   a drive unit; and
   an arm having a proximal end portion operably coupled to the drive unit and a distal end portion operably coupled to the gripper,
   wherein the drive unit is configured to move the arm relative to the support surface to cause the gripper to engage the side portion of the electronic device.
7. The apparatus of example 6 wherein the drive unit includes a drive gear configured to operably engage the arm, wherein the drive unit is operable to rotate the drive gear in a first rotational direction to move the arm and the gripper in a first linear direction toward the electronic device, and wherein the drive unit is operable to rotate the drive gear in a second rotational direction, opposite the first rotational direction, to move the arm and the gripper in a second linear direction, opposite the first linear direction and away from the electronic device.
8. The apparatus of example 6 or example 7 wherein the drive unit includes a drive gear configured to operably engage the arm, wherein the drive unit is operable to rotate the drive gear to rotate the arm and the gripper and thereby rotate the electronic device from the first orientation toward the second orientation.
9. The apparatus of any of examples 6-8 wherein the drive unit includes a drive gear configured to operably engage a surface positioned toward the side of the support surface, wherein the drive unit is operable to rotate the drive gear in a first rotational direction to move the arm and the gripper in a first linear direction away from the support surface, and wherein the drive unit is further operable to rotate the drive gear in a second rotational direction, opposite the first rotational direction, to move the arm and the gripper in a second linear direction, opposite the first linear direction and toward from the support surface.
10. The apparatus of any of examples 1-9, wherein the gripper is a first gripper, the side of the support surface is a first side of the support surface, and the side portion of the electronic device is a first side portion of the electronic device, and wherein the apparatus further comprises:
   a second gripper operably positioned toward a second side of the support surface opposite the first side of the support surface;
   wherein
      the second gripper is configured to engage a second side portion of the electronic device opposite the first side portion of the electronic device, move the electronic device upwardly and away from the support surface, rotate the electronic device to the second orientation in which the electronic device faces the second direction, and move the electronic device downwardly and toward the support surface.
11. The apparatus of example 10 wherein the first and second grippers are configured to operate in unison to move the electronic device upwardly away from the support surface, rotate the electronic device to the second orientation in which the electronic device faces the second direction, and move the electronic device downwardly toward the support surface.
12. The apparatus of any of examples 1-11 wherein the electronic device is a mobile phone.
13. An apparatus for moving an electronic device in a kiosk, the apparatus comprising:
   a support member configured to receive the electronic device in a first orientation in which the electronic device faces a first direction;
   wherein the support member is configured to rotate about a pivot axis to move the electronic device from the first orientation toward a second orientation in which the electronic device faces a second direction, opposite the first direction.
14. The apparatus of example 13 wherein the pivot axis is a horizontal axis.
15. The apparatus of example 13 or example 14, further comprising:
   a drive shaft, and
   a motor operably coupled to the drive shaft,
   wherein
      the support member is rotatably coupled to the drive shaft, and
      the motor is configured to rotate the drive shaft to cause the support member to rotate about the pivot axis.
16. The apparatus of any of examples 13-15, further comprising:
   a support surface, and
   a hinge member coupled to or at least proximate the support surface,
   wherein the support member is pivotally coupled to the hinge member and configured to rotate the electronic device relative to the support surface about the hinge member toward the second orientation in which the electronic device is supported on the support surface.
17. The apparatus of example 16, further comprising a pusher member movably coupled to the support surface, wherein the pusher member is configured to move toward the support member and push the electronic device at least partially onto the support member.
18. The apparatus of example 17 wherein the pusher member includes
   a first surface configured to contact and push the electronic device toward the support member; and
   a second surface extending upwardly from the first surface at an incline away from the support surface and configured to receive the electronic device after the rotation of the support member about the pivot axis.
19. The apparatus of any of examples 16-19 wherein the hinge member is coupled to an edge portion of the support surface.
20. The apparatus of any of examples 13-16 wherein
   the support member includes a wall portion positioned to contact a first side portion of the electronic device when the electronic device is in the first orientation, and
   the wall portion of the support member is configured to cause a second side portion of the electronic device, opposite the first side portion, to rotate about the first side portion during the rotation of the support member about the pivot axis.
21. The apparatus of example 20 wherein the rotation of the support member moves the electronic device toward an upright orientation in which the second side portion of the electronic device is positioned above the first side portion of the electronic device.
22. The apparatus of any of examples 13-16 wherein the support member is a first support member, the apparatus further comprising a second support member configured to rotate about the pivot axis, wherein the second support member is operable to rotate about the pivot axis in a first direction toward the first support member to at least partially contact the electronic device and to rotate with the first support member in a second direction, opposite the first direction, to move the electronic device to the second orientation.

23. The apparatus of any of examples 13-22 wherein, in the first orientation, the electronic device is positioned on a first side of the pivot axis, and wherein, in the second orientation, the electronic device is positioned on a second side of the pivot axis, opposite the first side.

24. The apparatus of any of examples 13-23 wherein the support member is configured to rotate at least 90 degrees about the pivot axis to move the electronic device to the second orientation.

25. The apparatus of any of examples 13-24 wherein the support member is configured to rotate 180 degrees about the pivot axis to move the electronic device to the second orientation.

26. An apparatus for moving an electronic device in a kiosk, the apparatus comprising:
  - a support surface configured to receive the electronic device in a first orientation facing a first direction relative to the support surface, wherein the support surface includes a plurality of openings therein; and
  - a plurality of pushrods at least partially positioned below the support surface, wherein individual ones of the pushrods are aligned with corresponding ones of the openings in the support surface;
  - wherein the plurality of pushrods are operable to move upwardly through the corresponding openings to contact the electronic device and rotate a first side portion of the electronic device about a second side portion of the electronic device, opposite the first side portion, to thereby move the electronic device to a second orientation in which the electronic device faces a second direction, opposite the first direction, relative to the support surface.

27. The apparatus of example 26 wherein the plurality of pushrods are arranged in series with one another, and wherein a subset of the plurality of pushrods are operable to move upwardly in sequence to move the electronic device to the second orientation.

28. The apparatus of example 26 or example 27 wherein the plurality of pushrods include an end pushrod and a penultimate pushrod positioned inwardly from the end pushrod, wherein, when extended, the penultimate pushrod is configured to contact the second side portion of the electronic device to allow the first side portion of the electronic device to rotate about the second side portion.

29. The apparatus of example 28 wherein the penultimate pushrod is configured to contact a display screen of the electronic device when the electronic device is in an over-center orientation between the first orientation and the second orientation, and wherein the end pushrod is configured to contact the display screen of the electronic device when the electronic device rotates past the over-center orientation toward the second orientation.

30. The apparatus of any of examples 26-29 wherein the plurality of pushrods include at least one row of pushrods extending along a widthwise direction of the support surface.

31. The apparatus of any of examples 26-30 wherein the plurality of pushrods include at least one row of pushrods extending along a lengthwise direction of the support surface.

32. The apparatus of any of examples 26-31 wherein the plurality of pushrods include at least one first row of pushrods extending along a widthwise direction of the support surface and at least one second row of pushrods extending along a lengthwise direction of the support surface.

33. A kiosk for recycling an electronic device, the kiosk comprising:
  - a housing; and
  - an inspection area within the housing, wherein the inspection area includes
    - a support surface configured to support the electronic device;
    - a camera; and
    - a flipping apparatus configured to rotate the electronic device from a first orientation in which one of a front surface or a back surface of the electronic device is positioned within a field of view of the camera to a second orientation in which the other of the front surface or the back surface of the electronic device is positioned within the field of view of the camera, wherein the flipping apparatus includes a gripper operable to (i) engage a side portion of the electronic device at least partially between the front surface and the back surface and (ii) rotate the electronic device to the second orientation.

34. The kiosk of example 33 wherein the flipping apparatus is configured to rotate the electronic device about a horizontal axis.

35. The kiosk of example 33 or example 34 wherein, in the first orientation, the camera is configured to obtain one or more images of one of the front surface or the back surface of the electronic device, and wherein, in the second orientation, the camera is configured to obtain one or more images of the other of the front surface or the back surface of the electronic device.

36. The kiosk of any of examples 33-35 wherein the gripper is configured to move the electronic device away from the support surface before the electronic device is in the second orientation, and wherein the gripper is configured to lower the electronic device toward the support surface after the electronic device is in the second orientation.

37. The kiosk of any of examples 33-36 wherein the electronic device is a mobile phone.

38. The kiosk of any of examples 33-37 wherein the flipping apparatus is configured to rotate the electronic device at least 90 degrees about a horizontal axis.

39. The kiosk of any of examples 33-38 wherein the flipping apparatus is configured to rotate the electronic device 180 degrees about a horizontal axis.

40. A kiosk for recycling an electronic device, the kiosk comprising:
  - a housing; and
  - an inspection area within the housing, wherein the inspection area includes
    - a camera having a field of view; and
    - a support member configured to receive the electronic device in a first orientation in which one of a front surface or a back surface of the electronic device is positioned within the field of view of the camera, wherein the support member is configured to rotate about a pivot axis to move the electronic device from the first orientation toward a second orientation in which the other of the front surface or the back surface of the electronic device is positioned within the field of view of the camera.

41. The kiosk of example 40 wherein the pivot axis is a horizontal axis.

42. The kiosk of example 40 or example 41 wherein, in the first orientation, the camera is configured to obtain one or more images of one of the front surface or the back surface of the electronic device and wherein, in the second orientation, the camera is configured to obtain one or more images of the other of the front surface or the back surface of the electronic device.

43. The kiosk of any of examples 40-42 wherein the support member is configured to rotate at least 90 degrees about the pivot axis to move the electronic device to the second orientation.

44. The kiosk of any of examples 40-43 wherein the support member is configured to rotate 180 degrees about the pivot axis to move the electronic device to the second orientation.

45. An apparatus for moving an electronic device in a kiosk, the apparatus comprising:
a belt configured to support the electronic device in a first orientation in which the electronic device faces a first direction, and
a ramp member positioned toward a side of the belt,
wherein the belt is operably to move the electronic device toward and at least partially onto the ramp member, and
wherein the ramp member is configured to rotate the electronic device from the first orientation to a second orientation in which the electronic device faces a second direction, opposite the first direction.

46. An apparatus for moving an electronic device in a kiosk, the apparatus comprising:
a support surface configured to receive the electronic device in a first orientation facing a first direction relative to the support surface, wherein the support surface includes a plurality of openings therein; and
a plurality of air jet nozzles at least partially positioned below the support surface, wherein individual ones of the air jet nozzles are aligned with corresponding ones of the openings in the support surface;
wherein the plurality of air jet nozzles are operable to emit a jet of air through the corresponding openings to contact the electronic device and rotate a first side portion of the electronic device about a second side portion of the electronic device, opposite the first side portion, to thereby move the electronic device to a second orientation in which the electronic device faces a second direction, opposite the first direction, relative to the support surface.

47. A method for operating a kiosk, the method comprising:
receiving an electronic device on a support surface in an inspection area of the kiosk, wherein the electronic device is received in a first orientation in which a first surface of the electronic devices faces a first direction;
rotating the electronic device to a second orientation in which the first surface faces a second direction opposite the first direction, wherein rotating the electronic device includes
moving a gripper of the kiosk positioned within the inspection area toward a side portion of the electronic device;
engaging, via the gripper, the side portion of the electronic device;
moving, via the gripper, the electronic device upwardly and away from the support surface;
rotating, via the gripper, the electronic device from the first orientation toward the second orientation; and
moving, via the gripper, the electronic device downwardly and toward the support surface.

48. A method for operating a kiosk, the method comprising:
receiving an electronic device on a support member in an inspection area of the kiosk, wherein the electronic device is received in a first orientation in which a first surface of the electronic devices faces a first direction;
rotating the electronic device to a second orientation in which the first surface faces a second direction opposite the first direction, wherein rotating the electronic device includes rotating the support member about a horizontal pivot axis to move the electronic device from the first orientation to the second orientation.

49. An apparatus for moving an electronic device in a kiosk, as described and illustrated herein.

50. A kiosk, comprising:
a housing; and
an apparatus for moving an electronic device as described and illustrated herein.

51. A method for moving an electronic device in a kiosk, as described and illustrated herein.

Aspects of the present technology can be embodied in a special purpose computer or data processor that is specifically programmed, configured, or constructed to perform one or more of the computer-executable instructions explained in detail herein. While aspects of the present technology, such as certain functions, are described as being performed exclusively on a single device, the present technology can also be practiced in distributed environments where functions or modules are shared among disparate processing devices, which are linked through a communications network, such as a Local Area Network (LAN), Wide Area Network (WAN), or the Internet. In a distributed computing environment, program modules may be located in both local and remote memory storage devices.

Aspects of the present technology may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present technology may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

References throughout the foregoing description to features, advantages, or similar language do not imply that all of the features and advantages that may be realized with the present technology should be or are in any single embodiment of the present technology. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment. Reference throughout this specification to relative terms such as, for example, “generally,” “approximately,” and “about” are used herein to mean the stated value plus or minus 10%, unless the context clearly requires otherwise.

Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

Any patents and applications and other references noted above, including any that may be listed in accompanying filing papers, are incorporated herein by reference in their entirety, except for any subject matter disclaimers or disavowals, and except to the extent that the incorporated material is inconsistent with the express disclosure herein, in which case the language in this disclosure controls. Aspects of the present technology can be modified, if necessary, to employ the systems, functions, and concepts of the various references described above to provide yet further implementations of the present technology.

The above Detailed Description of examples and embodiments of the present technology is not intended to be exhaustive or to limit the present technology to the precise form disclosed above. While specific examples for the present technology are described above for illustrative purposes, various equivalent modifications are possible within the scope of the present technology, as those skilled in the relevant art will recognize. For example, while processes are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes are at times described as being performed in series, these processes may instead be performed or implemented in parallel or performed at different times.

The teachings of the present technology provided herein can be applied to other systems, not necessarily the system described above. The elements and acts of the various examples described above can be combined to provide further implementations of the present technology. Some alternative implementations of the present technology may include not only additional elements to those implementations noted above, but also may include fewer elements. Further any specific numbers noted herein are only examples: alternative implementations may employ differing values or ranges.

While the above description describes various embodiments of the present technology and the best mode contemplated, regardless how detailed the above text, the present technology can be practiced in many ways. Details of the system may vary considerably in its specific implementation, while still being encompassed by the present disclosure. As noted above, particular terminology used when describing certain features or aspects of the present technology should not be taken to imply that the terminology is being redefined herein to be restricted to any specific characteristics, features, or aspects of the present technology with which that terminology is associated. In general, the terms used in the following claims should not be construed to limit the present technology to the specific examples disclosed in the specification, unless the above Detailed Description section explicitly defines such terms. Accordingly, the actual scope of the present technology encompasses not only the disclosed examples, but also all equivalent ways of practicing or implementing the present technology under the claims.

From the foregoing, it will be appreciated that specific embodiments of the present technology have been described herein for purposes of illustration, but that various modifications may be made without deviating from the spirit and scope of the various embodiments of the present technology. Further, while various advantages associated with certain embodiments of the present technology have been described above in the context of those embodiments, other embodiments may also exhibit such advantages, and not all embodiments need necessarily exhibit such advantages to fall within the scope of the present technology. Accordingly, the present technology is not limited, except as by the appended claims.

Although certain aspects of the present technology are presented below in certain claim forms, the applicant contemplates the various aspects of the present technology in any number of claim forms. Accordingly, the applicant reserves the right to pursue additional claims after filing this application to pursue such additional claim forms, in either this application or in a continuing application.

We claim:

1. An apparatus for moving an electronic device in a kiosk, the apparatus comprising:

a first support member configured to (i) receive the electronic device in a first orientation in which the electronic device faces a first direction and to (ii) rotate about a pivot axis to move the electronic device from the first orientation toward a second orientation in which the electronic device faces a second direction, opposite the first direction; and a second support member configured to (i) rotate about the pivot axis in a first direction toward the first support member to at least partially contact the electronic device while the electronic device is in the first orientation and to (ii) rotate with the first support member in a second direction, opposite the first direction, to move the electronic device toward the second orientation.

2. The apparatus of claim 1 wherein the pivot axis is a horizontal axis.

3. The apparatus of claim 1, further comprising:

a drive shaft, and a motor operably coupled to the drive shaft, wherein the first support member is rotatably coupled to the drive shaft, and the motor is configured to rotate the drive shaft to cause the first support member to rotate about the pivot axis.

4. The apparatus of claim 1 wherein, in the first orientation, the electronic device is positioned on a first side of the pivot axis, and wherein, in the second orientation, the electronic device is positioned on a second side of the pivot axis, opposite the first side.

5. The apparatus of claim 1 wherein the first support member is configured to rotate at least 90 degrees about the pivot axis to move the electronic device to the second orientation.

6. The apparatus of claim 1 wherein the first support member is configured to rotate 180 degrees about the pivot axis to move the electronic device to the second orientation.

7. The apparatus of claim 1 wherein the first support member includes a first plate and wherein the second support member includes a second plate.

8. The apparatus of claim 1, further comprising:

an inspection tray, and a hinge member coupled to the inspection tray and defining the pivot axis, wherein the first support member and the second support member are operably coupled to the hinge member and configured to rotate about the hinge member and relative to the inspection tray.

9. An apparatus for moving an electronic device in a kiosk, the apparatus comprising:

a support surface configured to receive the electronic device in a first orientation in which the electronic device faces a first direction;

a hinge member coupled to or at least proximate the support surface and defining a pivot axis;

a support member pivotally coupled to the hinge member and configured to rotate about the pivot axis; and a pusher member movably coupled to the support surface, wherein the pusher member is configured to move toward the support member and push the electronic device at least partially onto the support member, and the support member is configured to rotate the electronic device about the hinge member and relative to the support surface to move the electronic device from the first orientation toward a second orientation in which the electronic device faces a second direction, opposite the first direction and in which the electronic device is supported on the support surface.

10. The apparatus of claim 9 wherein the pusher member includes a first surface configured to contact and push the electronic device toward the support member; and a second surface extending upwardly from the first surface at an incline away from the support surface and configured to receive the electronic device after the rotation of the support member about the pivot axis.

11. The apparatus of claim 9 wherein the hinge member is coupled to an edge portion of the support surface.

12. The apparatus of claim 9 wherein the pusher member is positioned on the support surface and configured to translate at least partially across the support surface to push the electronic device toward and/or onto the support member.

13. The apparatus of claim 9 wherein the pusher member is further configured to:

move in a first direction relative to the support surface from a first position to a second position and thereby push the electronic device toward and/or onto the support member, while in the second position, receive the electronic device in a third orientation different from the first orientation and the second orientation after the rotation of the support member, and move in a second direction opposite the first direction from the second position toward the first position to return the electronic device onto the support surface in the second orientation.

14. A kiosk for recycling an electronic device, the kiosk comprising:

a housing; and an inspection area within the housing, wherein the inspection area includes a camera having a field of view;

a first support member configured to (i) receive the electronic device in a first orientation in which one of a front surface or a back surface of the electronic device is positioned within the field of view of the camera and to (ii) rotate about a pivot axis to move the electronic device from the first orientation toward a second orientation in which the other of the front surface or the back surface of the electronic device is positioned within the field of view of the camera; and a second support member configured to (i) rotate about the pivot axis in a first direction toward the first support member to at least partially contact the electronic device while the electronic device is in the first orientation and to (ii) rotate with the first support member in a second direction, opposite the first direction, to move the electronic device toward the second orientation.

15. The kiosk of claim 14 wherein the pivot axis is a horizontal axis.

16. The kiosk of claim 14 wherein, in the first orientation, the camera is configured to obtain one or more images of one of the front surface or the back surface of the electronic device and wherein, in the second orientation, the camera is configured to obtain one or more images of the other of the front surface or the back surface of the electronic device.

17. The kiosk of claim 14 wherein the first support member is configured to rotate at least 90 degrees about the pivot axis to move the electronic device to the second orientation.

18. The kiosk of claim 14 wherein the first support member is configured to rotate 180 degrees about the pivot axis to move the electronic device to the second orientation.

19. The kiosk of claim 14 wherein, after rotating with the first support member in the second direction, the second support member is further configured to rotate in the first direction to allow the electronic device to be imaged by the camera while the electronic device is in the second orientation.

20. The kiosk of claim 14, wherein the inspection area further includes:

an inspection tray, and a hinge member coupled to the inspection tray and defining the pivot axis, wherein the first support member and the second support member are operably coupled to the hinge member and configured to rotate about the hinge member and relative to the inspection tray.

* * * * *